(12) United States Patent
Eshelman et al.

(10) Patent No.: US 11,837,819 B2
(45) Date of Patent: Dec. 5, 2023

(54) RECEPTACLE HEAD FOR POWER EXTENSION CORD

(71) Applicant: 360 Electrical, L.L.C., Salt Lake City, UT (US)

(72) Inventors: Brandon Eshelman, Salt Lake City, UT (US); Cameron Bigler, Lehi, UT (US)

(73) Assignee: 360 Electrical, L.L.C., Salt Lake City, UT (US)

( * ) Notice: Subject to any disclaimer, the term of this patent is extended or adjusted under 35 U.S.C. 154(b) by 44 days.

(21) Appl. No.: 17/489,788

(22) Filed: Sep. 30, 2021

(65) Prior Publication Data

US 2022/0109268 A1   Apr. 7, 2022

Related U.S. Application Data

(60) Provisional application No. 63/086,471, filed on Oct. 1, 2020.

(51) Int. Cl.
| | |
|---|---|
| *H01R 13/58* | (2006.01) |
| *H01R 13/639* | (2006.01) |
| *H01R 13/633* | (2006.01) |
| *H01R 13/73* | (2006.01) |
| *H01R 13/447* | (2006.01) |
| *H01R 31/06* | (2006.01) |

(52) U.S. Cl.
CPC ..... *H01R 13/5845* (2013.01); *H01R 13/5816* (2013.01); *H01R 13/6335* (2013.01); *H01R 13/6392* (2013.01); *H01R 13/73* (2013.01); *H01R 13/447* (2013.01); *H01R 31/06* (2013.01)

(58) Field of Classification Search
CPC ............ H01R 13/5845; H01R 13/5816; H01R 13/6335; H01R 13/6392; H01R 13/73; H01R 13/447; H01R 31/06; H01R 25/003; H02G 11/00
See application file for complete search history.

(56) References Cited

U.S. PATENT DOCUMENTS

| | | | | |
|---|---|---|---|---|
| D164,338 S | * | 8/1951 | Tyler | ........................ D13/137.2 |
| D233,385 S | | 10/1974 | Friedman | |
| D242,720 S | | 12/1976 | Loforese | |

(Continued)

FOREIGN PATENT DOCUMENTS

| | | | | |
|---|---|---|---|---|
| CN | 206076632 U | * | 4/2017 | |
| DE | 10037179 A1 | * | 11/2002 | ........... H01R 13/508 |
| WO | WO-2014107742 A1 | * | 7/2014 | ........... H01R 13/514 |

OTHER PUBLICATIONS

Machine Translation of DE-10037179-A1, (Nov. 2002) (Year: 2023).*

(Continued)

*Primary Examiner* — Travis S Chambers
(74) *Attorney, Agent, or Firm* — Lauff Law PLLC

(57) ABSTRACT

A power extension cord comprises a body, a cavity extending completely through the body, and a gap disposed along a perimeter of the body that extends through to the cavity, such that the cavity is accessible from the exterior of the receptacle head through the gap. One or more receptacles are disposed along the exterior of the body. Preferably, a gate may be provided, the gate having an open position in which the cavity is accessible through the gap and a closed position in which the gate blocks the gap and restricts access to cavity.

23 Claims, 83 Drawing Sheets

(56) References Cited

U.S. PATENT DOCUMENTS

| | | |
|---|---|---|
| D251,293 S | 3/1979 | Trueblood |
| D270,629 S | 9/1983 | Drew |
| D276,225 S | 11/1984 | Powel |
| D320,992 S | 10/1991 | Jondelius |
| D325,723 S | 4/1992 | Gary et al. |
| D367,262 S | 2/1996 | Lux |
| D373,566 S | 9/1996 | Rak et al. |
| D376,348 S | 12/1996 | Hedrick |
| D378,586 S | 3/1997 | Hedrick |
| 5,628,641 A | 5/1997 | Hahn |
| D397,086 S | 8/1998 | Lin |
| D400,505 S | 11/1998 | Yu |
| D402,962 S | 12/1998 | Hedrick |
| D405,222 S | 2/1999 | Gilbert, Jr. et al. |
| D409,980 S | 5/1999 | Byrne |
| D412,488 S | 8/1999 | Lien |
| D416,233 S | 11/1999 | Tsai |
| D425,863 S | 5/2000 | Yu |
| 6,089,886 A | 7/2000 | Mareno |
| 6,091,611 A | 7/2000 | Lanni |
| D432,499 S | 10/2000 | Stekelenburg |
| D435,515 S | 12/2000 | Stekelenburg |
| D435,516 S | 12/2000 | Stekelenburg |
| D436,923 S | 1/2001 | Stekelenburg |
| D443,590 S | 6/2001 | Vende |
| 6,315,617 B1 | 11/2001 | Al-Sabah |
| D459,307 S | 6/2002 | Nieto |
| D466,867 S | 12/2002 | Krobusek |
| D469,062 S | 1/2003 | Nieto et al. |
| D469,064 S | 1/2003 | Nieto |
| D469,403 S | 1/2003 | Nieto |
| D481,009 S | 10/2003 | Stekelenburg |
| D481,357 S | 10/2003 | Stekelenburg |
| D482,326 S | 11/2003 | Stekelenburg |
| D483,331 S | 12/2003 | Adachi et al. |
| D487,726 S * | 3/2004 | Okuda .................. D13/156 |
| D489,685 S | 5/2004 | Yu |
| D490,777 S | 6/2004 | Yu |
| D493,426 S | 7/2004 | Strayer |
| D495,297 S | 8/2004 | Hriscu et al. |
| D510,562 S | 10/2005 | Lodato et al. |
| D520,448 S | 5/2006 | Lodato et al. |
| D533,836 S | 12/2006 | Young |
| D533,837 S | 12/2006 | Wang |
| D534,126 S | 12/2006 | Chan |
| D549,651 S | 8/2007 | Mancari et al. |
| D555,105 S | 11/2007 | Victor |
| D562,240 S | 2/2008 | Lee |
| D566,654 S | 4/2008 | Ivanova et al. |
| 7,371,121 B1 * | 5/2008 | Lee ................. H01R 25/003 |
| | | 439/650 |
| D573,947 S | 7/2008 | Kishimoto et al. |
| D577,678 S | 9/2008 | Ball et al. |
| D577,679 S * | 9/2008 | Lee ...................... D13/139.7 |
| D579,413 S | 10/2008 | Ball et al. |
| D582,399 S | 12/2008 | Venier et al. |
| D586,743 S | 2/2009 | Guccione et al. |
| D594,823 S | 6/2009 | Ho'o et al. |
| D612,333 S | 3/2010 | Wu |
| D614,134 S | 4/2010 | Chen et al. |
| D618,617 S | 6/2010 | Lee |
| 7,862,385 B2 | 1/2011 | Lee |
| D634,315 S | 3/2011 | Nousiainen |
| D635,515 S | 4/2011 | Atwell et al. |
| D636,728 S | 4/2011 | Terleski et al. |
| D640,199 S | 6/2011 | Wilson |
| D642,529 S | 8/2011 | Su et al. |
| 7,988,494 B2 * | 8/2011 | Lee .................. H01R 13/713 |
| | | 439/652 |
| D646,674 S | 10/2011 | Liao |
| D651,977 S | 1/2012 | Lee |
| D652,836 S | 1/2012 | Voorhees |
| D653,215 S | 1/2012 | Lam |
| D660,306 S | 5/2012 | Voorhees |
| D662,056 S | 6/2012 | Lee et al. |
| D667,792 S | 9/2012 | Angel et al. |
| D667,795 S | 9/2012 | Zien et al. |
| D670,248 S | 11/2012 | Chen |
| D673,912 S | 1/2013 | Benedetti |
| D685,741 S | 7/2013 | Byrne et al. |
| D686,629 S | 7/2013 | Trinh et al. |
| D686,993 S | 7/2013 | Millar-sax et al. |
| D692,829 S | 11/2013 | Dobler |
| D693,306 S | 11/2013 | Chuang et al. |
| D693,768 S | 11/2013 | Alesi et al. |
| D693,770 S | 11/2013 | Miller |
| 8,712,486 B2 | 4/2014 | Sorias et al. |
| D705,211 S | 5/2014 | Huang |
| D705,730 S | 5/2014 | Kretzschmar et al. |
| D707,662 S | 6/2014 | Okita |
| D709,066 S | 7/2014 | Byun |
| D712,394 S | 9/2014 | Booth et al. |
| D712,837 S | 9/2014 | Chuang et al. |
| D718,714 S | 12/2014 | Si |
| D718,715 S | 12/2014 | Si |
| D726,651 S | 4/2015 | Lin |
| D734,268 S | 7/2015 | Parbatani et al. |
| D736,710 S | 8/2015 | Lin |
| D739,355 S | 9/2015 | D'aubeterre |
| D739,821 S | 9/2015 | Byrne et al. |
| D745,495 S | 12/2015 | Fereday et al. |
| D747,722 S | 1/2016 | Webb |
| D750,022 S | 2/2016 | Lin |
| D753,064 S | 4/2016 | Yu |
| D753,643 S | 4/2016 | Kim et al. |
| D755,127 S | 5/2016 | Wong |
| D756,915 S | 5/2016 | Yang |
| D756,916 S | 5/2016 | Yang |
| D765,064 S | 8/2016 | Wengreen |
| D769,194 S | 10/2016 | Greig et al. |
| D775,077 S | 12/2016 | Xu |
| D775,081 S | 12/2016 | Xu |
| D775,534 S | 1/2017 | Turksu et al. |
| D775,589 S | 1/2017 | Soffer et al. |
| D776,064 S | 1/2017 | Insalaco |
| D777,167 S | 1/2017 | Wengreen |
| D777,672 S | 1/2017 | Park et al. |
| D777,674 S | 1/2017 | Mininger et al. |
| 9,544,005 B2 | 1/2017 | Wei |
| D778,828 S | 2/2017 | Morgan |
| 9,573,532 B2 | 2/2017 | Riddiford et al. |
| D784,263 S | 4/2017 | Xu |
| D786,797 S | 5/2017 | Hsu |
| D788,707 S | 6/2017 | Griepenstroh et al. |
| D789,891 S | 6/2017 | Eshelman et al. |
| D790,458 S | 6/2017 | He et al. |
| D790,459 S * | 6/2017 | Eshelman .................. D13/110 |
| D790,464 S | 6/2017 | He et al. |
| D790,528 S | 6/2017 | Lindloff |
| D791,700 S | 7/2017 | Loewen |
| D792,345 S | 7/2017 | Loewen |
| D795,812 S | 8/2017 | Huang |
| 9,742,885 B2 | 8/2017 | Rostami |
| D796,442 S | 9/2017 | Xu |
| D796,443 S | 9/2017 | Xu |
| D796,444 S | 9/2017 | Xu |
| D796,445 S | 9/2017 | Xu |
| D797,675 S | 9/2017 | Xu |
| D797,676 S | 9/2017 | Xu |
| D799,423 S | 10/2017 | Eliyahu |
| D801,276 S | 10/2017 | Lin |
| D802,529 S | 11/2017 | Andersson |
| D807,828 S | 1/2018 | Xu |
| D807,831 S | 1/2018 | Xu |
| D810,017 S | 2/2018 | Short |
| D811,334 S | 2/2018 | Weng et al. |
| D816,037 S | 4/2018 | Byrne et al. |
| D816,038 S | 4/2018 | Lu |
| D816,039 S | 4/2018 | Lu |
| D817,887 S | 5/2018 | Yu |
| 9,977,462 B2 | 5/2018 | Sorias et al. |
| D821,978 S | 7/2018 | Yu |
| D823,805 S | 7/2018 | Xu |
| D823,841 S | 7/2018 | Marini |

(56) References Cited

U.S. PATENT DOCUMENTS

| | | | |
|---|---|---|---|
| 10,027,149 | B2 | 7/2018 | Warren |
| 10,034,398 | B2 | 7/2018 | Kurian et al. |
| D826,162 | S | 8/2018 | Byrne et al. |
| 10,050,397 | B1 | 8/2018 | Hetzroni et al. |
| D828,304 | S | 9/2018 | Chen |
| D832,215 | S | 10/2018 | Xu |
| D834,519 | S | 11/2018 | Faul |
| D835,043 | S | 12/2018 | Liao et al. |
| D836,542 | S | 12/2018 | Xu |
| D837,736 | S | 1/2019 | Liao et al. |
| D844,566 | S | 4/2019 | Yu |
| D845,900 | S | 4/2019 | Liu |
| D845,902 | S | 4/2019 | Xu |
| D846,500 | S | 4/2019 | Xu |
| D847,789 | S | 5/2019 | Virhiä et al. |
| D848,412 | S | 5/2019 | Greve et al. |
| D848,948 | S | 5/2019 | Wei |
| D849,687 | S | 5/2019 | Dai |
| D851,597 | S | 6/2019 | Ding |
| D851,598 | S | 6/2019 | Liang |
| D852,138 | S | 6/2019 | Wen et al. |
| D852,139 | S | 6/2019 | Wen et al. |
| D852,140 | S | 6/2019 | Chen |
| D852,749 | S | 7/2019 | Wang |
| 10,367,317 | B1 | 7/2019 | Rahner et al. |
| D856,344 | S | 8/2019 | Wengreen |
| D856,934 | S | 8/2019 | Levy et al. |
| D856,937 | S | 8/2019 | Rupert |
| D862,419 | S | 10/2019 | Eshelman et al. |
| D892,767 | S | 8/2020 | Sandberg |
| D920,233 | S * | 5/2021 | Chen .......................... D13/108 |
| D920,920 | S * | 6/2021 | Yu .............................. D13/139.7 |
| D929,942 | S * | 9/2021 | Lin ............................ D13/137.2 |
| 2006/0171145 | A1 | 8/2006 | Ford et al. |
| 2006/0234561 | A1 * | 10/2006 | Tanaka .................. H01R 25/003 439/652 |
| 2010/0132970 | A1 * | 6/2010 | Axland ................ H01R 25/006 174/53 |
| 2012/0001488 | A1 | 1/2012 | Puschnigg et al. |
| 2012/0028505 | A1 * | 2/2012 | Weber .................... H01R 35/04 439/638 |
| 2012/0100741 | A1 * | 4/2012 | Moore ............... H01R 13/6392 439/341 |
| 2015/0072555 | A1 | 3/2015 | Riddiford et al. |
| 2015/0230351 | A1 | 8/2015 | Yeo |
| 2016/0380446 | A1 | 12/2016 | Loewen |
| 2017/0324260 | A1 | 11/2017 | Rostami |
| 2019/0116678 | A1 | 4/2019 | Eshelman et al. |
| 2019/0181595 | A1 * | 6/2019 | Jensen .................. F21V 23/023 |
| 2022/0109268 | A1 | 4/2022 | Eshelman et al. |

OTHER PUBLICATIONS

Machine Translation of CN-206076632-U, (Apr. 2017) (Year: 2023).*

U.S. Patent and Trademark Office, Notice of References Cited, dated Sep. 8, 2022, Design U.S. Appl. No. 29/753,758.

"HBN Outdoor Smart Plug, Wi-Fi Heavy Duty Outlet with 3 Independent Outlets, Compatible with Alexa and Google Assistant, IP44 Waterproof, Voice & Remote Control Outlet, No Hub Required, ETL", first available Dec. 31, 2019. Amazon.com [https://www.amazon.com/dp/B083C613X7] (Year: 2019).

"BN-Link Heavy Duty Dual Outlet Outdoor Smart WiFi Plug Timer Outlet Switch, Compatible with Alexa and Google Assistant 2.4 GHz Network only", first available Jan. 6, 2020. Amazon.com [https://www.amazon.com/dp/B083JMX98Z] (Year: 2020).

"G-Homa Outdoor Smart Plug Waterproof, Bluetooth & Wi-Fi 15A Plugs with 2 Sockets, Smart Outlet Work with Alexa and Google Home, No Hub Required, FCC&CSA Certified, 2.4GHz WiFi Only", first available Jun. 11, 2021. Amazon.com [https://www.amazon.com/dp/B0972VYQHK] (Year: 2021).

"GHome Smart Outdoor Smart Plug, Wi-Fi Smart Outlet Compatible with Alexa and Google Assistant, Remote Control Timer Schedule IP64 Weatherproof Light Plug, No Hub Required, Black, (WP7-B)", first available Mar. 10, 2022. Amazon.com [https://www.amazon.com/dp/B09V7GJS6Q] (Year: 2022).

* cited by examiner

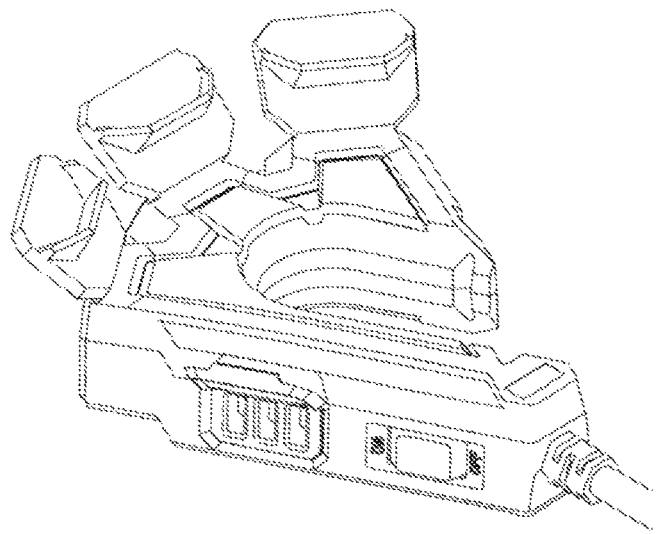
FIG. 5
FIG. 6
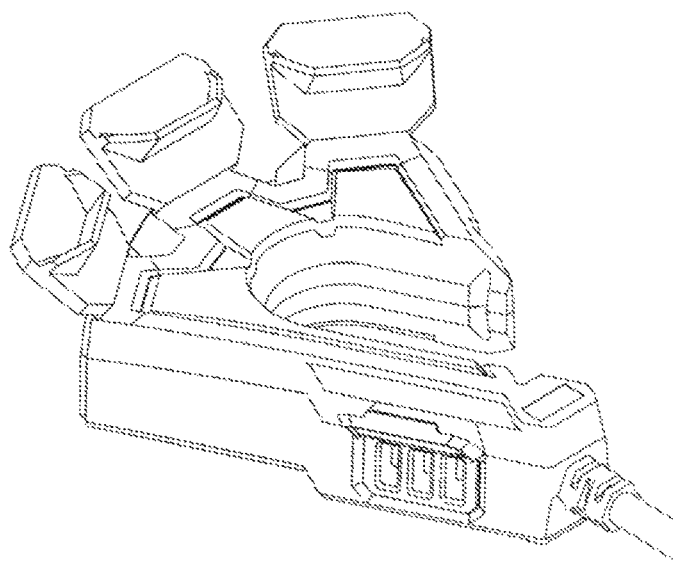
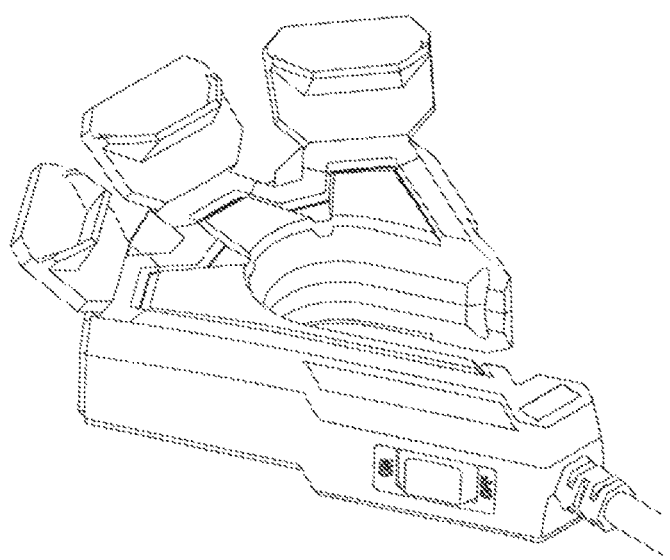
FIG. 7

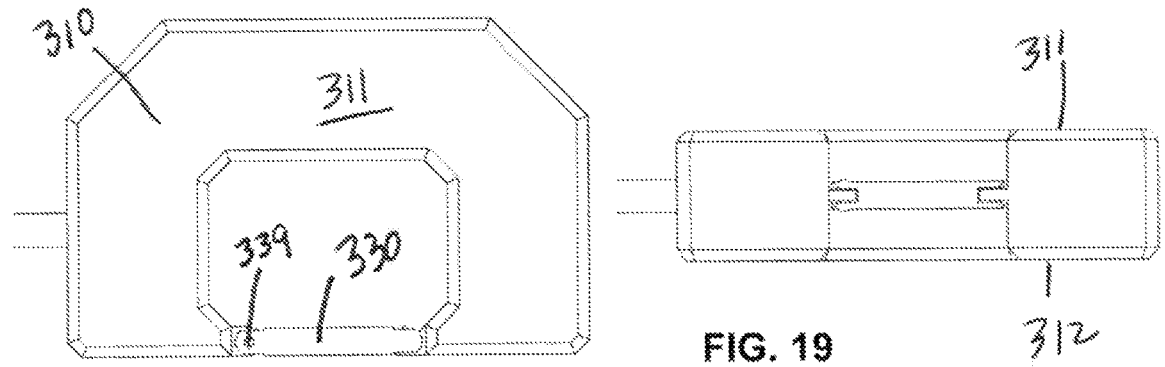
FIG. 18
FIG. 19
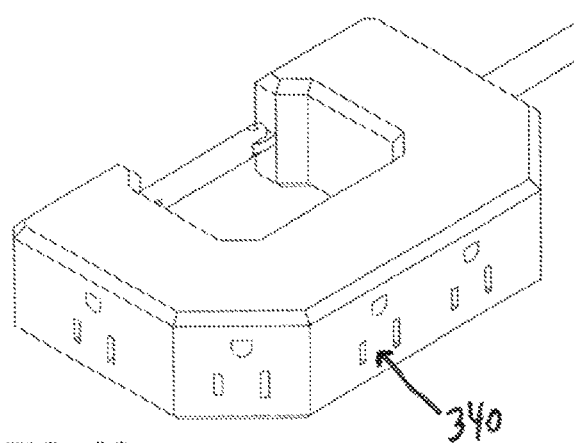
FIG. 20
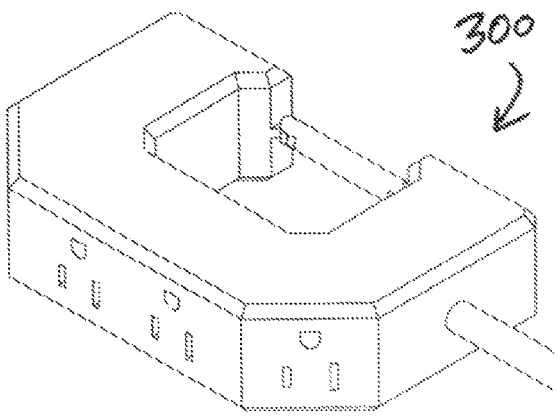
FIG. 21
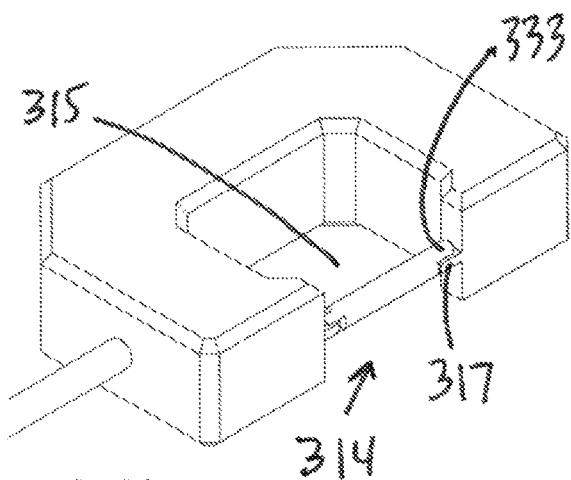
FIG. 22
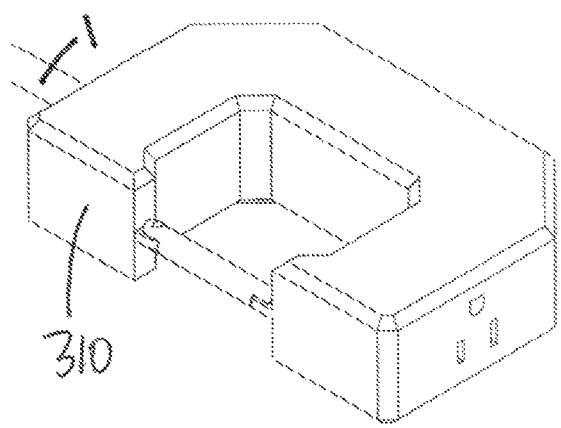
FIG. 23

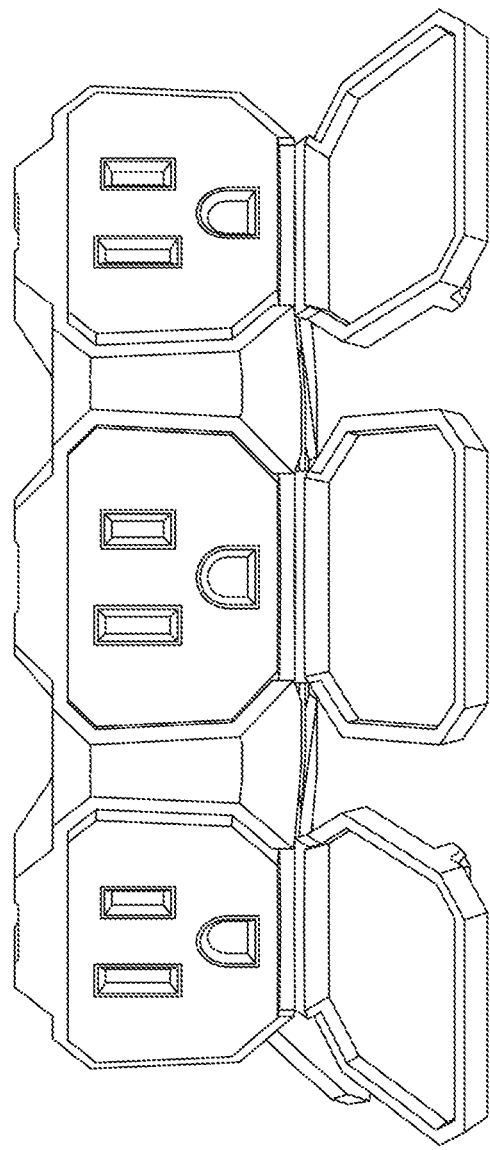 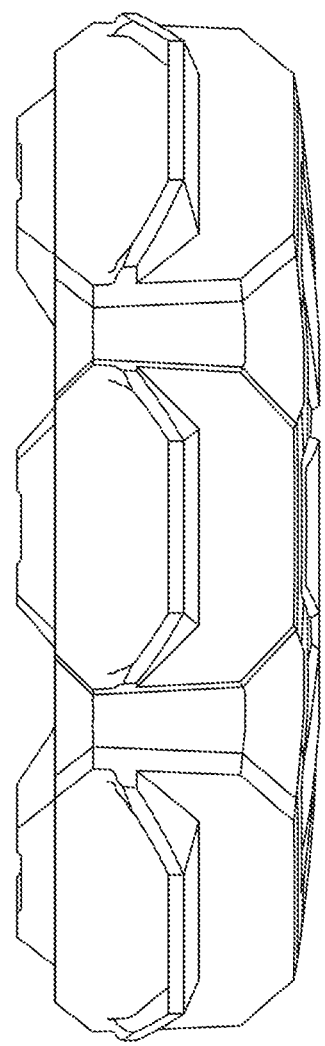
FIG. 36A
FIG. 36B

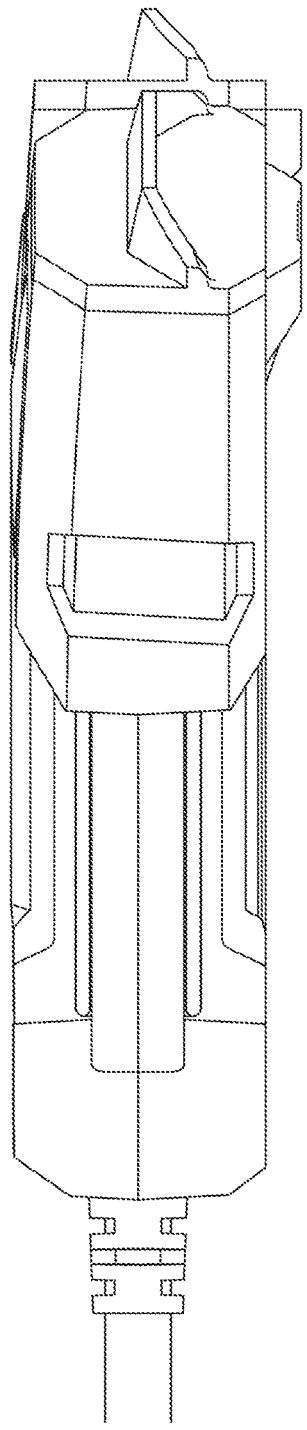
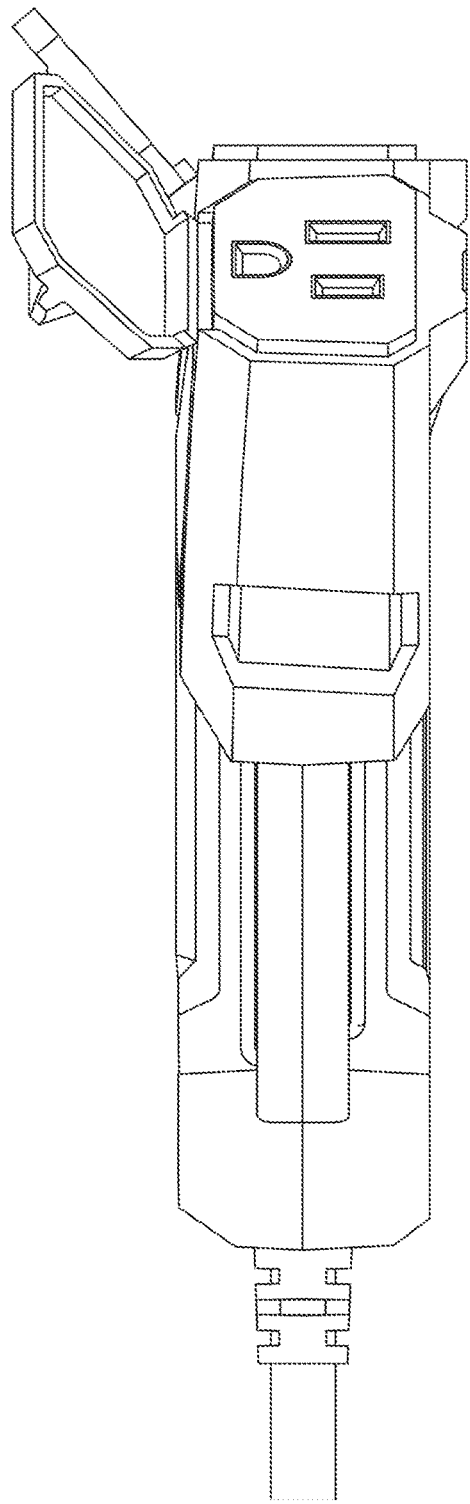
FIG. 80A
FIG. 80B

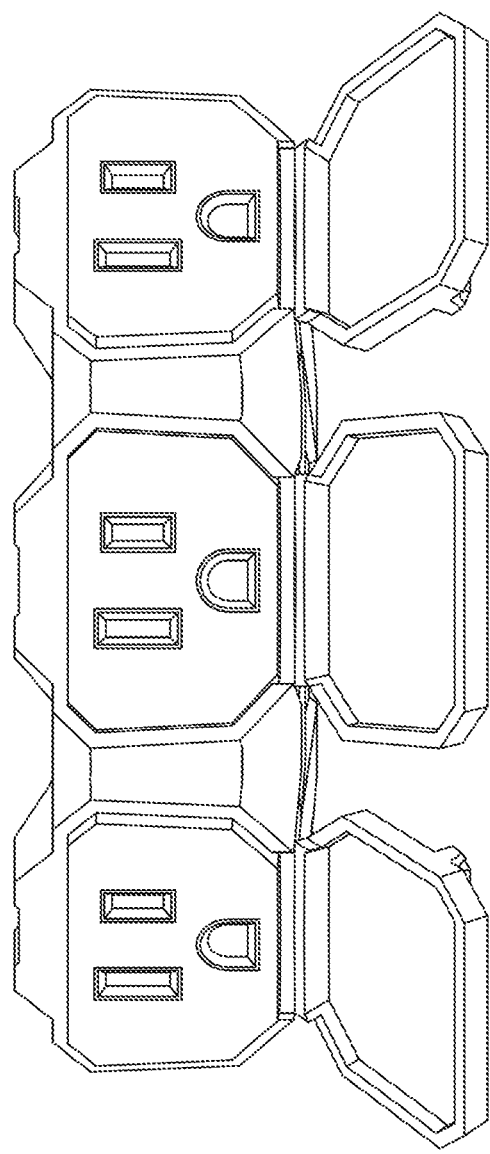
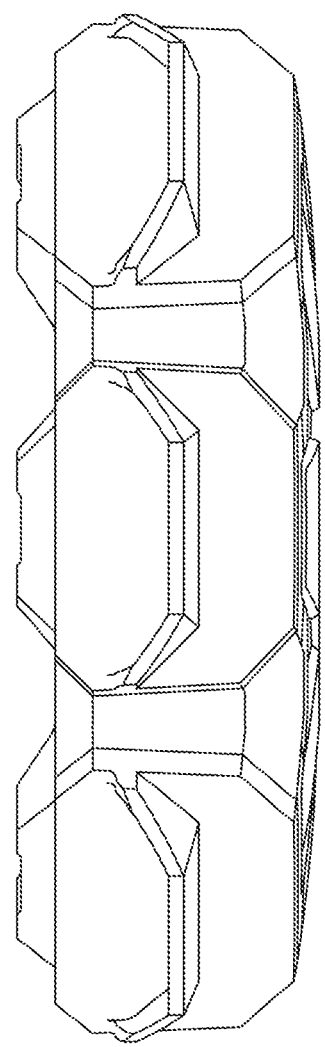
FIG. 84A
FIG. 84B

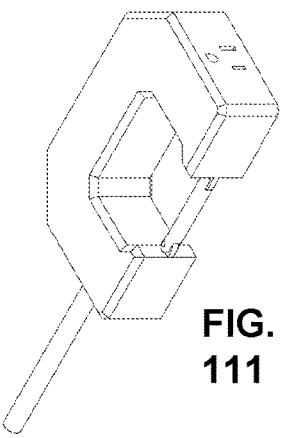
FIG.
111
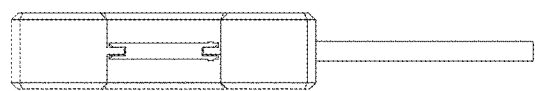
FIG.
112
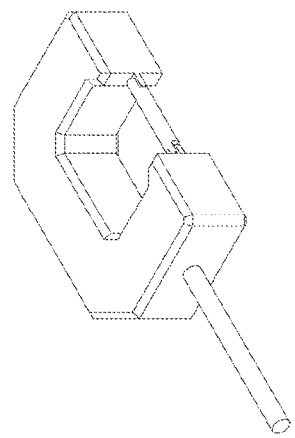
FIG.
113
FIG.
114
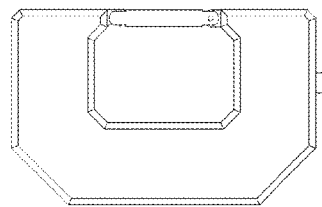
FIG.
115
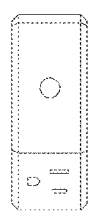
FIG.
116
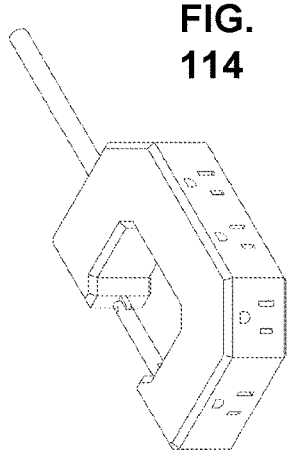
FIG.
117
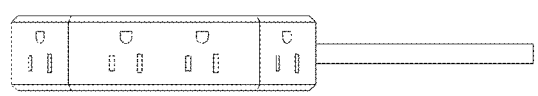
FIG.
118
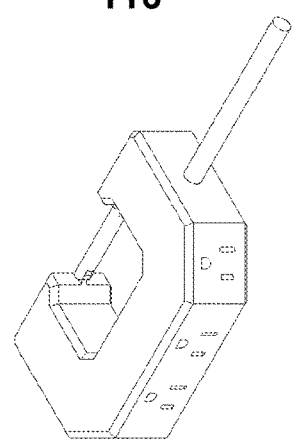
FIG.
119

FIG.
120
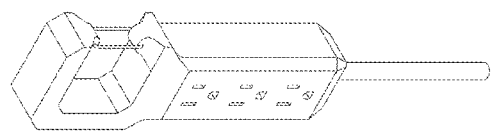
FIG.
121
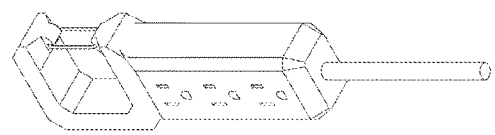
FIG.
122
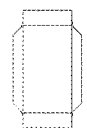
FIG.
123
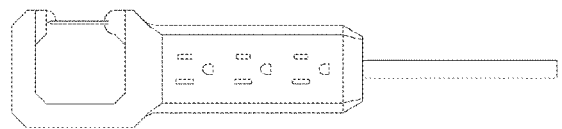
FIG.
124
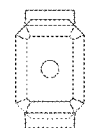
FIG.
125
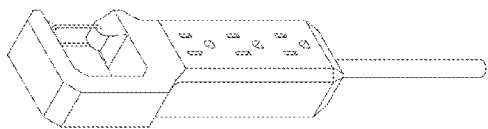
FIG.
126
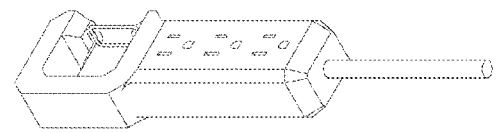
FIG.
127
FIG.
128

RECEPTACLE HEAD FOR POWER EXTENSION CORD

CROSS-REFERENCE TO RELATED APPLICATIONS

This application claims the benefit under 35 U.S.C. § 119(e) of U.S. Provisional Patent Application No. 63/086,471 filed Oct. 1, 2020, which is incorporated herein by reference.

BACKGROUND

Generally, power extension cords comprise a plug, a cord, and one or more receptacles disposed at the end of the cord opposite the plug. For most power extension cords, when an electrical device is plugged into a receptacle on the end of the power extension cord, the plug of the electrical device and the power extension cord receptacle are unrestrained. When unrestrained, electrical device plug in power extension cord receptacle may exert an unwanted tug or pulling on the electrical device, or may flop around on the ground or floor exposed to unwanted debris, dirt, or other materials.

BRIEF SUMMARY OF THE DISCLOSURE

This disclosure describes a new and nonobvious receptacle head for a power extension cord comprising a body, a cavity extending completely through the body, and a gap disposed along a perimeter of the body that extends through to the cavity, such that the cavity is accessible from the exterior of the receptacle head through the gap. One or more receptacles are disposed along the exterior of the body. Preferably, a gate may be provided, the gate having an open position in which the cavity is accessible through the gap and a closed position in which the gate blocks the gap and restricts access to cavity.

BRIEF DESCRIPTION OF THE SEVERAL VIEWS OF THE DRAWING

FIG. 5 is a perspective view of a preferred embodiment.
FIG. 6 is a perspective view of a second embodiment.
FIG. 7 is a perspective view of a third embodiment.
FIG. 18 is a top view of a fifth embodiment.
FIG. 19 is a side view of a fifth embodiment.
FIG. 20 is a perspective view of a fifth embodiment.
FIG. 21 is a perspective view of a fifth embodiment.
FIG. 22 is a perspective view of a fifth embodiment.
FIG. 23 is a perspective view of a fifth embodiment.
FIG. 36A is a front view of a preferred embodiment depicted with a gate and doors open.
FIG. 36B is a front view of a preferred embodiment depicted with a gate and doors closed.

FIG. 80A is a side view of a third embodiment depicted with a gate and doors closed.
FIG. 80B is a side view of a third embodiment depicted with a gate and doors open.
FIG. 84A is a front view of a third embodiment depicted with a gate and doors open.
FIG. 84B is a front view of a third embodiment depicted with a gate and doors closed.
FIG. 111 is a perspective view of a fifth embodiment.
FIG. 112 is a side view of a fifth embodiment.
FIG. 113 is a perspective view of a fifth embodiment.
FIG. 114 is a front view of a fifth embodiment.
FIG. 115 is a top view of a fifth embodiment.
FIG. 116 is a back view of a fifth embodiment.
FIG. 117 is a perspective view of a fifth embodiment.
FIG. 118 is a side view of a fifth embodiment.
FIG. 119 is a perspective view of a fifth embodiment.
FIG. 120 is a side view of a sixth embodiment.
FIG. 121 is a perspective view of a sixth embodiment.
FIG. 122 is a perspective view of a sixth embodiment.
FIG. 123 is a front view of a sixth embodiment.
FIG. 124 is a top view of a sixth embodiment.
FIG. 125 is a back view of a sixth embodiment.
FIG. 126 is a perspective view of a sixth embodiment.
FIG. 127 is a perspective view of a sixth embodiment.

FIG. 12B is a side view of a sixth embodiment.

DESCRIPTION OF VARIOUS EMBODIMENTS

Figure 1:
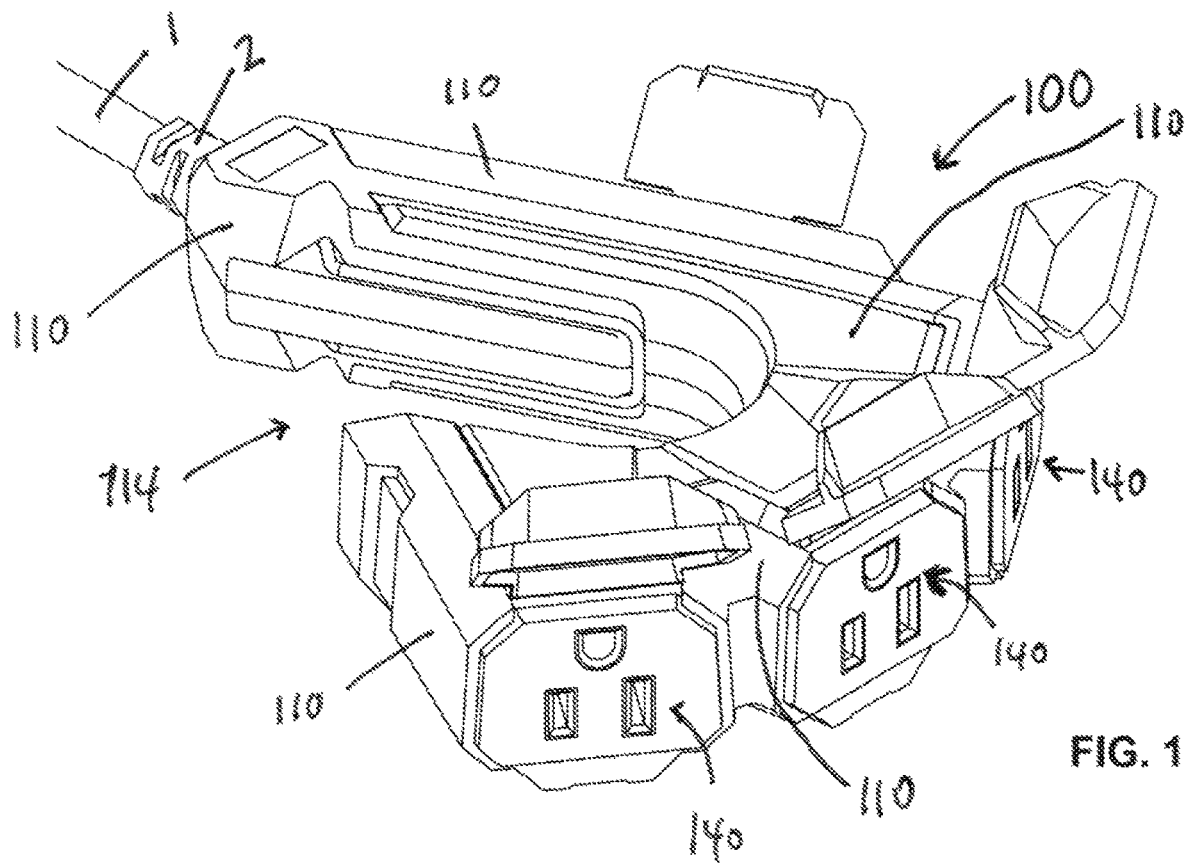
FIG. 1 is a perspective view of a preferred embodiment.
Figure 2:
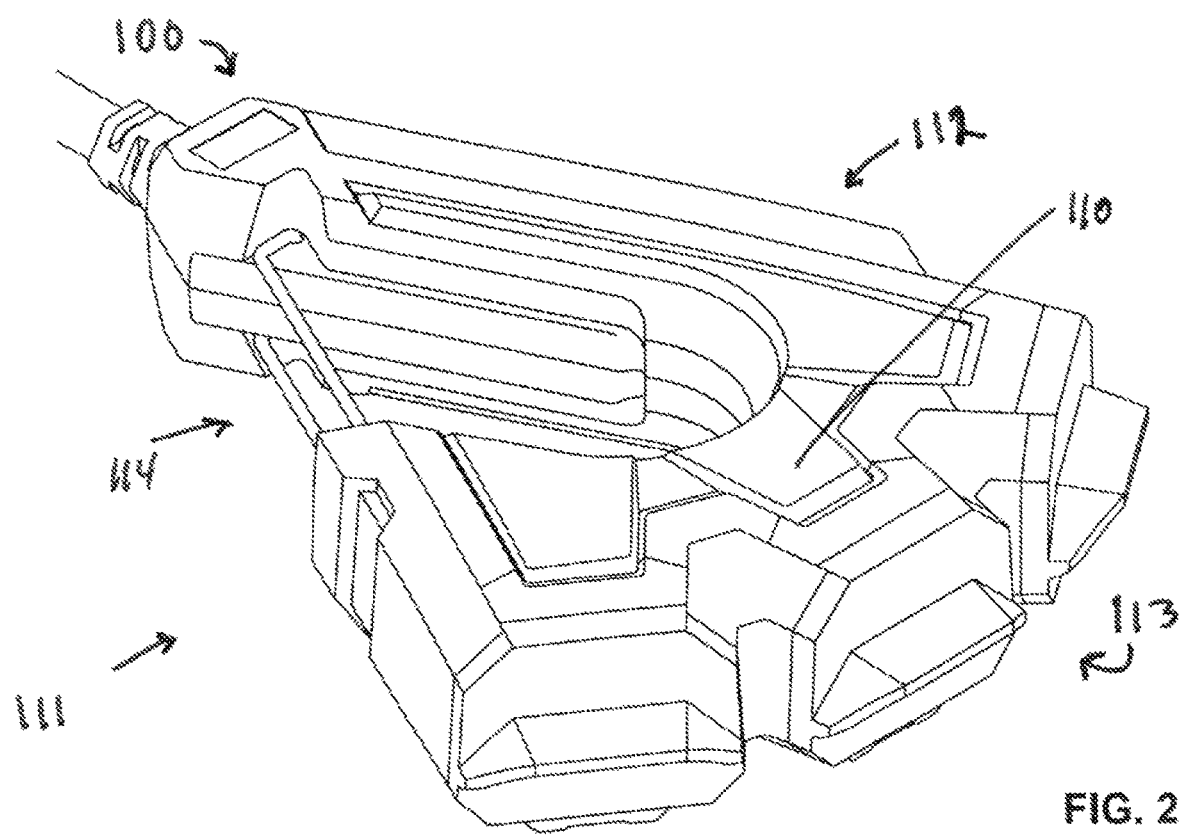
FIG. 2 is a perspective view of a preferred embodiment.

As used in this disclosure, the term "power plug" refers to a part of a power extension cord that is connected to an electrical supply, the term "receptacle head" refers to a part of a power extension cord that comprises one or more receptacles configured to supply electrical power received through a power plug, and the term "cord" refers to the assembly of electrical conductors connecting a power plug to a receptacle head. Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. References herein to orientations, surfaces, or other directions or structures as "upper," "top," "lower," "bottom," or having a "height," "width," or "length," and directional references such as "horizontal" and "vertical," are generally arbitrary and for convenience only with respect to the drawings, and those of skill in the art will recognize after appreciating this disclosure that such designations appropriately may be reoriented in particular embodiments. The terminology used herein is for the purpose of describing particular embodiments only and is not intended to be limiting. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

In describing various embodiments, it will be understood that a number of structures and steps are disclosed. Each of these has individual benefits and each can also be used in conjunction with one or more, or in some cases all, of the other disclosed structures and steps. Accordingly, for the sake of clarity, this description will refrain from repeating every possible combination of the individual structures and steps in an unnecessary fashion. Nevertheless, the specification and claims should be read with the understanding that such combinations are entirely within the scope of the disclosure and the claims. Those of skill in the art will recognize after appreciating this disclosure that the steps of the various methods, processes, and other techniques disclosed herein need not be performed in any particular order, unless otherwise expressly stated or logically necessary to satisfy expressly stated conditions.

The present disclosure is to be considered as an exemplification of various embodiments, and is not intended to limit the scope of the claims or the disclosure to the specific embodiments illustrated by the figures or description below. After appreciating this disclosure those skilled in the art will recognize that the invention may be embodied in a variety of different forms and that various changes, substitutions, and alterations can be made without departing from the spirit and scope of the invention. FIGS. 1-5 and 8-11 illustrate a currently preferred embodiment.

FIGS. 1-5 and 8-11 depict a first embodiment of a receptacle head. In this embodiment, receptacle head 100 comprises body 110 having a generally triangular shape, with power cord 1 attached to a vertex of generally triangularly shaped body 110 by strain relief 2. Body 110 comprises a "cavity" or "hole," identified in the drawings by reference 115, which extends completely through body 110. First side 111 of generally triangularly shaped body 110 comprises gap 114 that extends through to cavity 115, such that cavity 115 is accessible from the exterior of the receptacle head through gap 114 along first side 111 when gap 114 is unobstructed. Configuring the receptacle head with a cavity accessible from the exterior of the receptacle head through a gap in the receptacle head enables the power extension cord when in use to be hung on, held, or supported by a supporting structure, for example a ladder rung, a scaffold bar or strut, a stationary tool handle, a workpiece, a rod, a wire, a pipe, a doorknob, or any similar type structure that will fit within the cavity.

Figure 3:
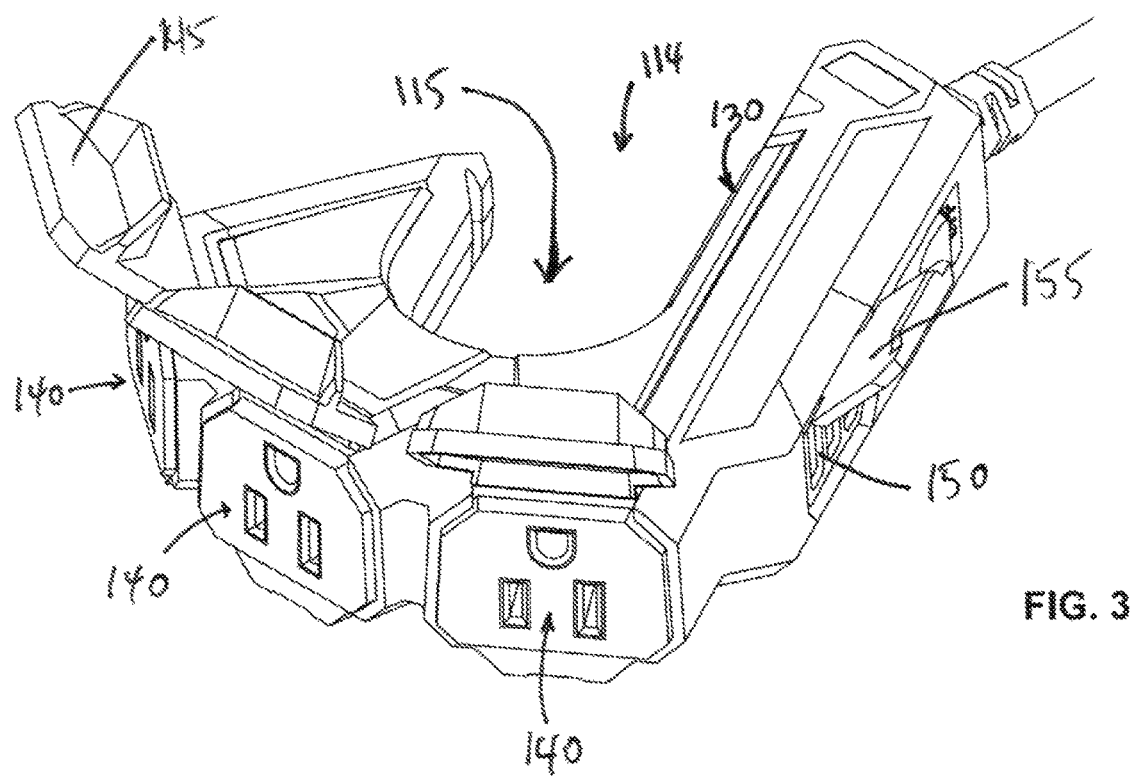
FIG. 3 is a perspective view of a preferred embodiment.
Figure 4:
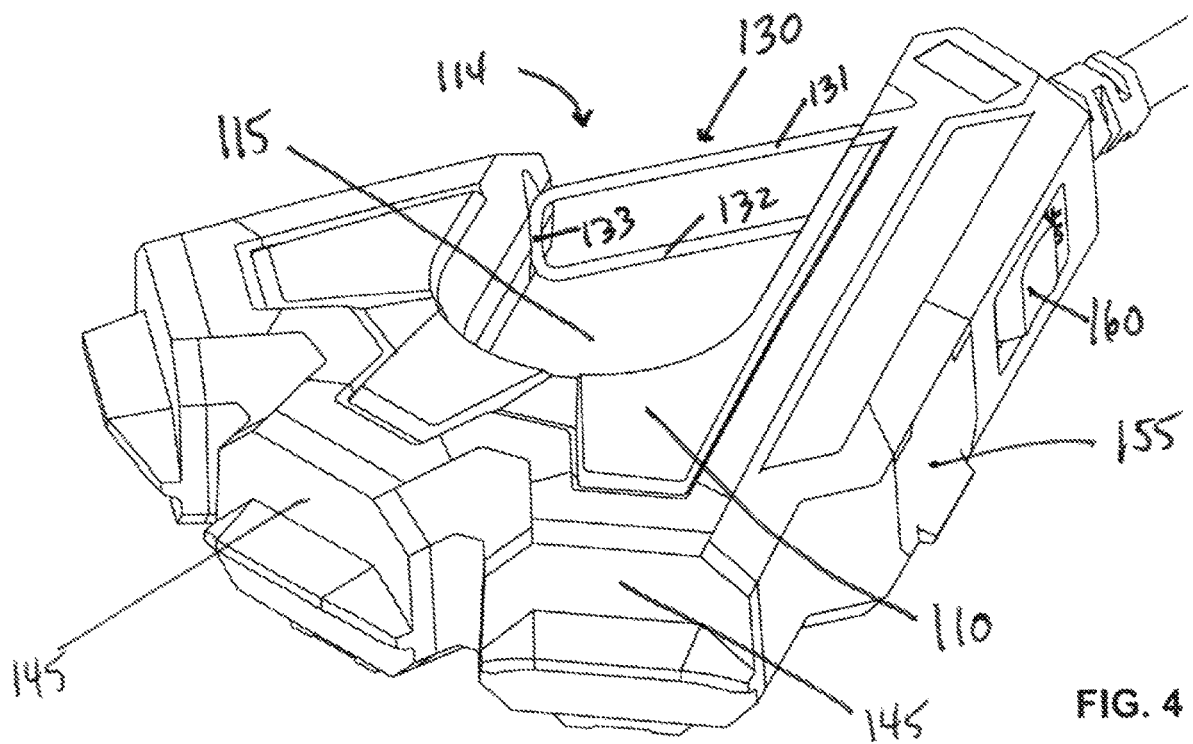
FIG. 4 is a perspective view of a preferred embodiment.
Figure 8:
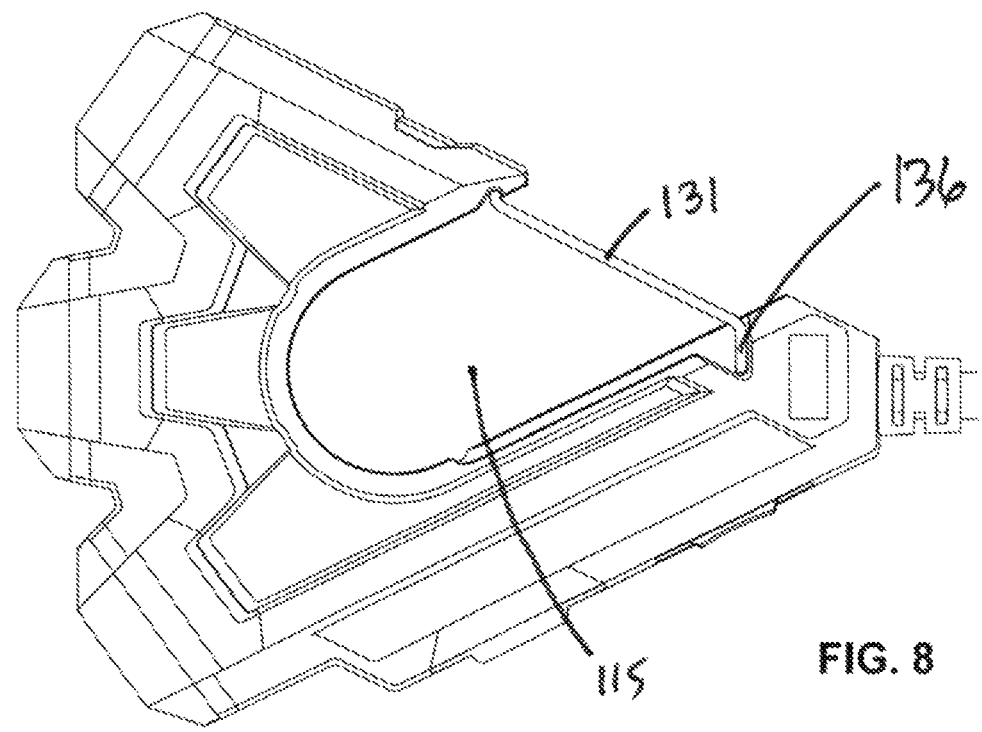
FIG. 8 is a top view of a preferred embodiment.
Figure 9:
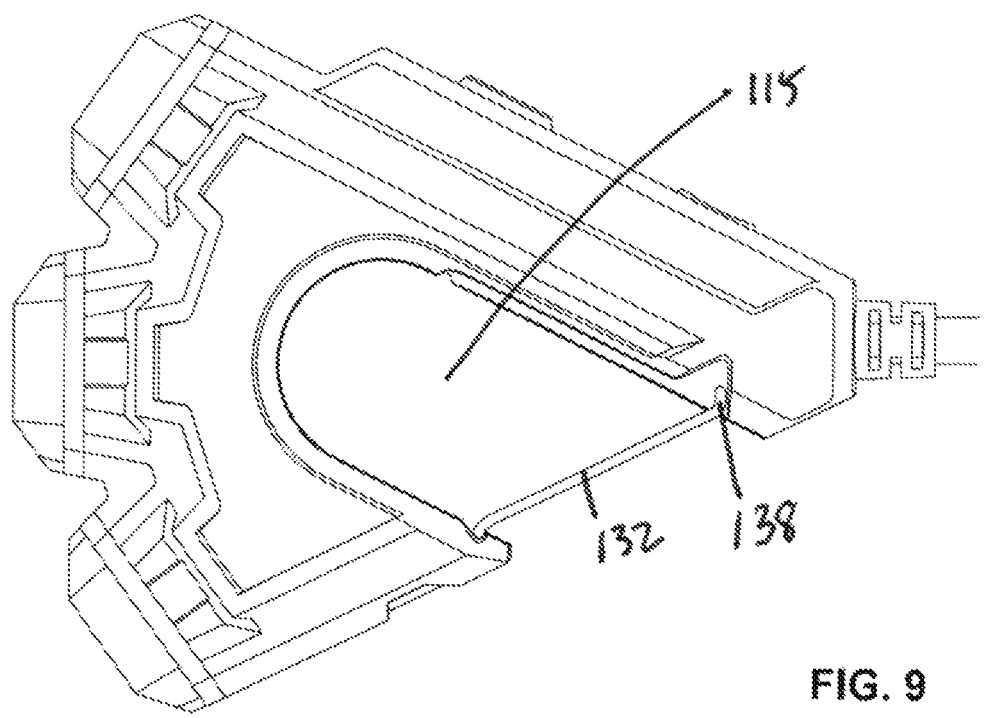
FIG. 9 is a bottom view of a preferred embodiment.
Figure 10:
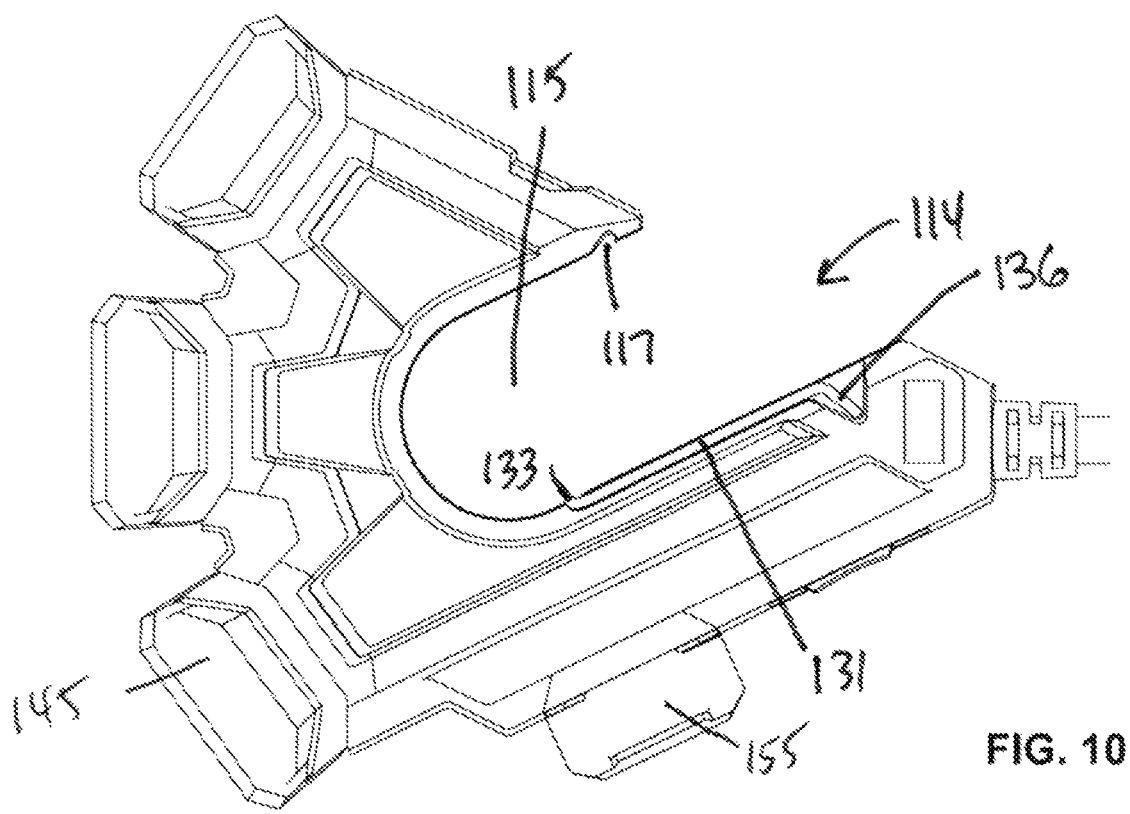
FIG. 10 is a top view of a preferred embodiment.
Figure 11:
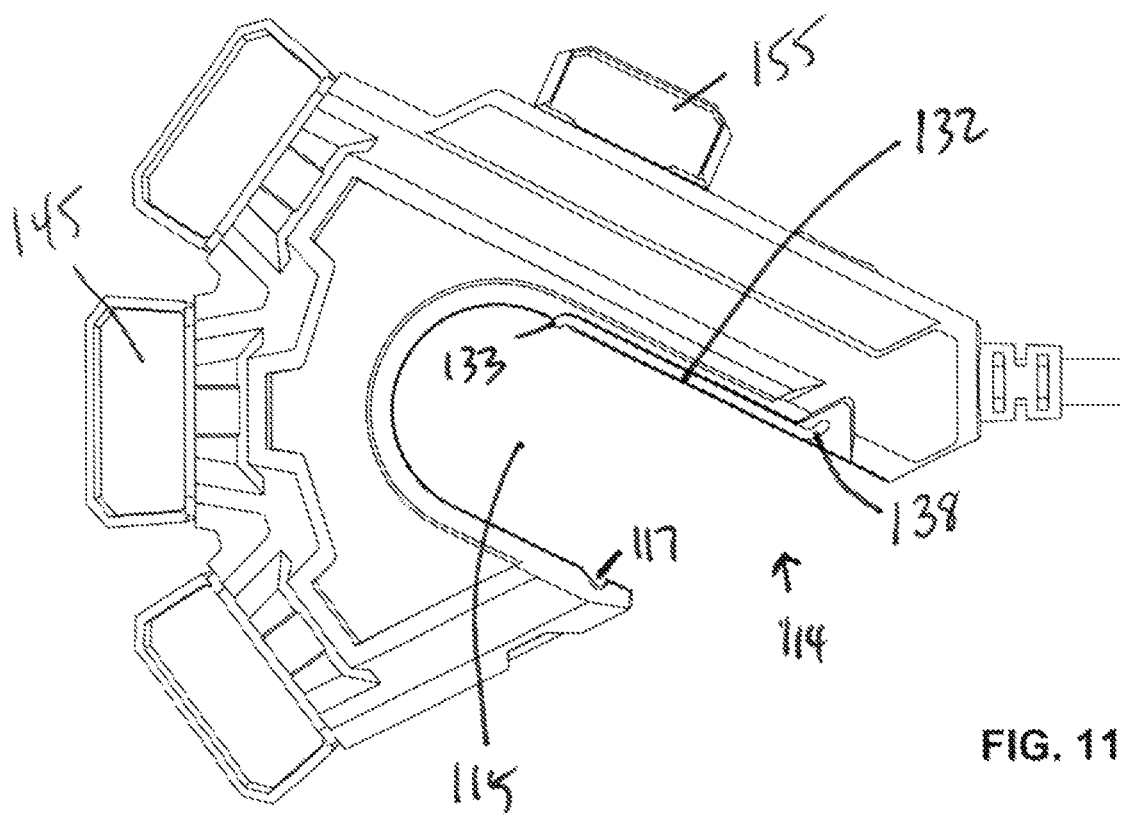
FIG. 11 is a bottom view of a preferred embodiment.
Figure 12:
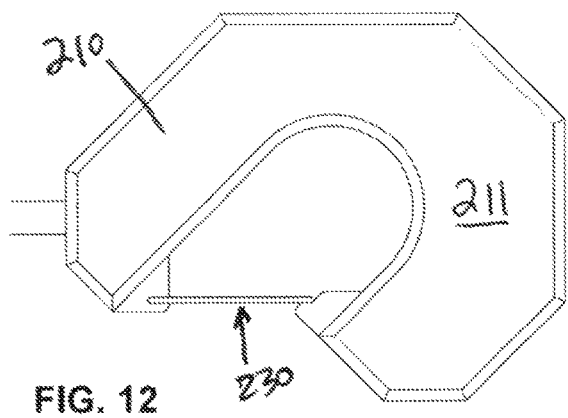
FIG. 12 is a top view of a fourth embodiment.
Figure 13:
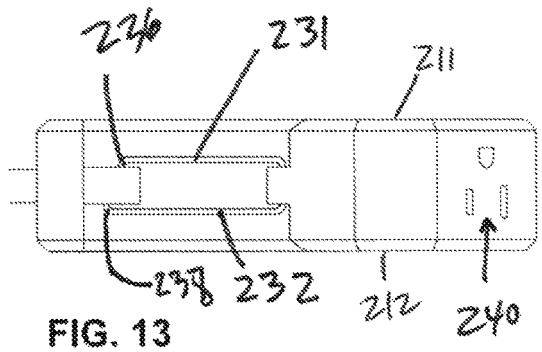
FIG. 13 is a side view of a fourth embodiment.
Figure 14:
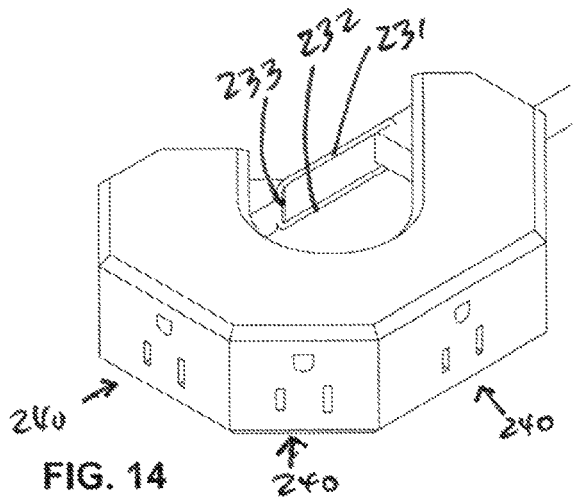
FIG. 14 is a perspective view of a fourth embodiment.
Figure 15:
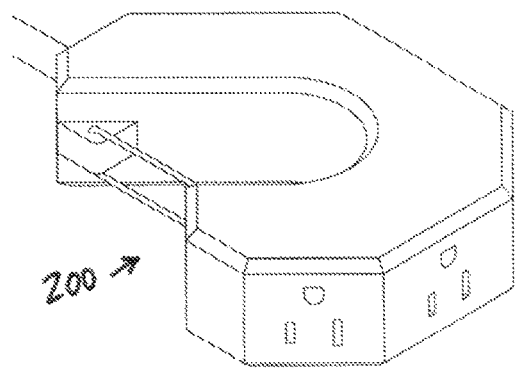
FIG. 15 is a perspective view of a fourth embodiment.
Figure 16:
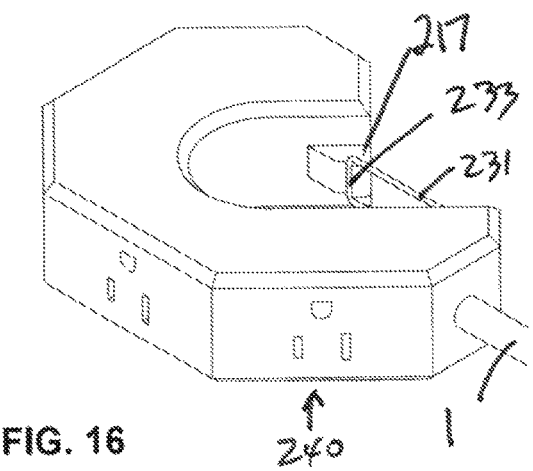
FIG. 16 is a perspective view of a fourth embodiment.
Figure 17:
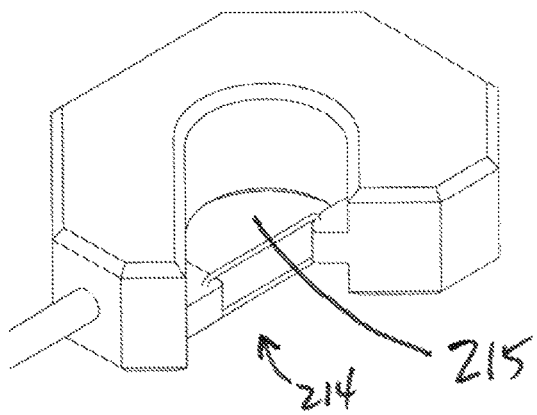
FIG. 17 is a perspective view of a fourth embodiment.
Figure 24:
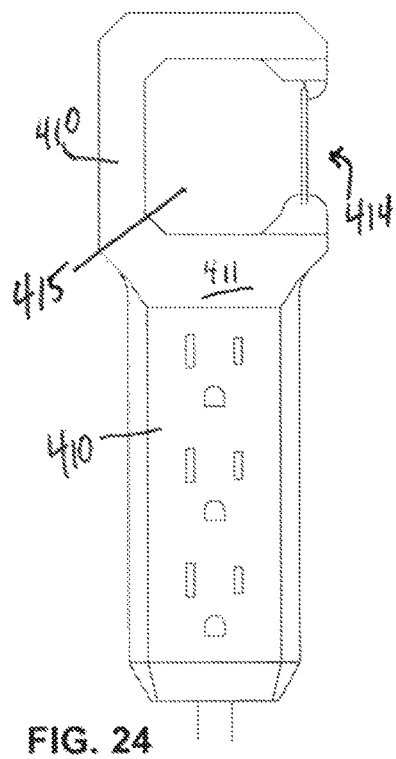
FIG. 24 is a top view of a sixth embodiment.
Figure 25:
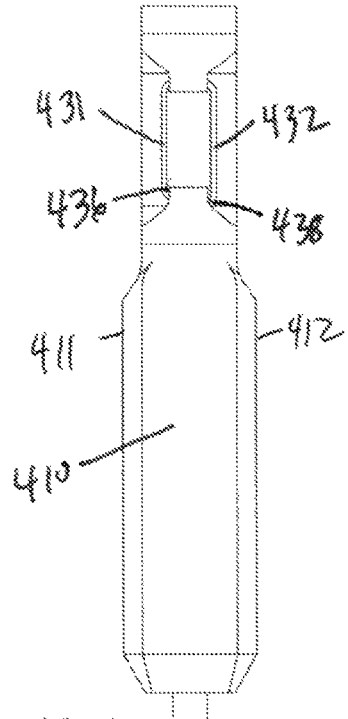
FIG. 25 is a side view of a sixth embodiment.
Figure 26:
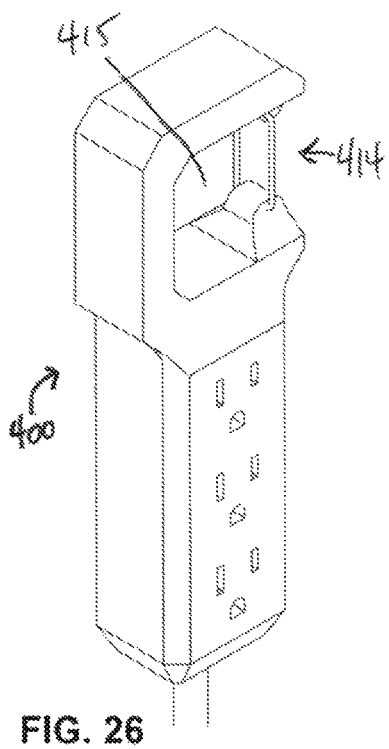
FIG. 26 is a perspective view of a sixth embodiment.
Figure 27:
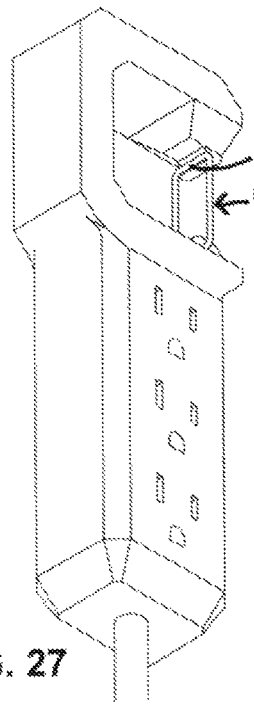
FIG. 27 is a perspective view of a sixth embodiment.
Figure 28:
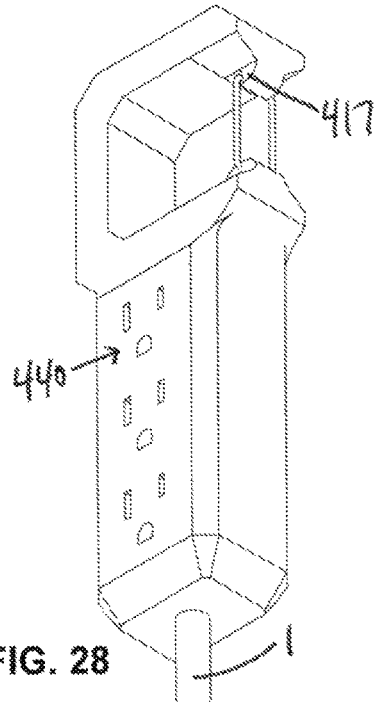
FIG. 28 is a perspective view of a sixth embodiment.
Figure 29:
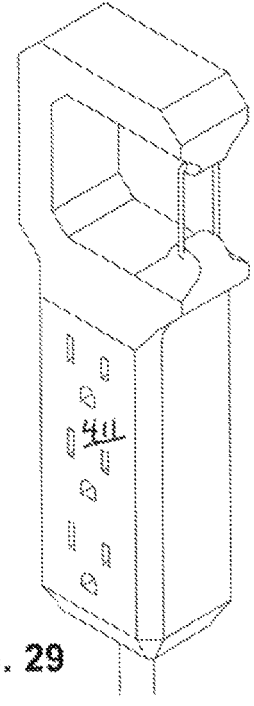
FIG. 29 is a perspective view of a sixth embodiment.
Figure 30:
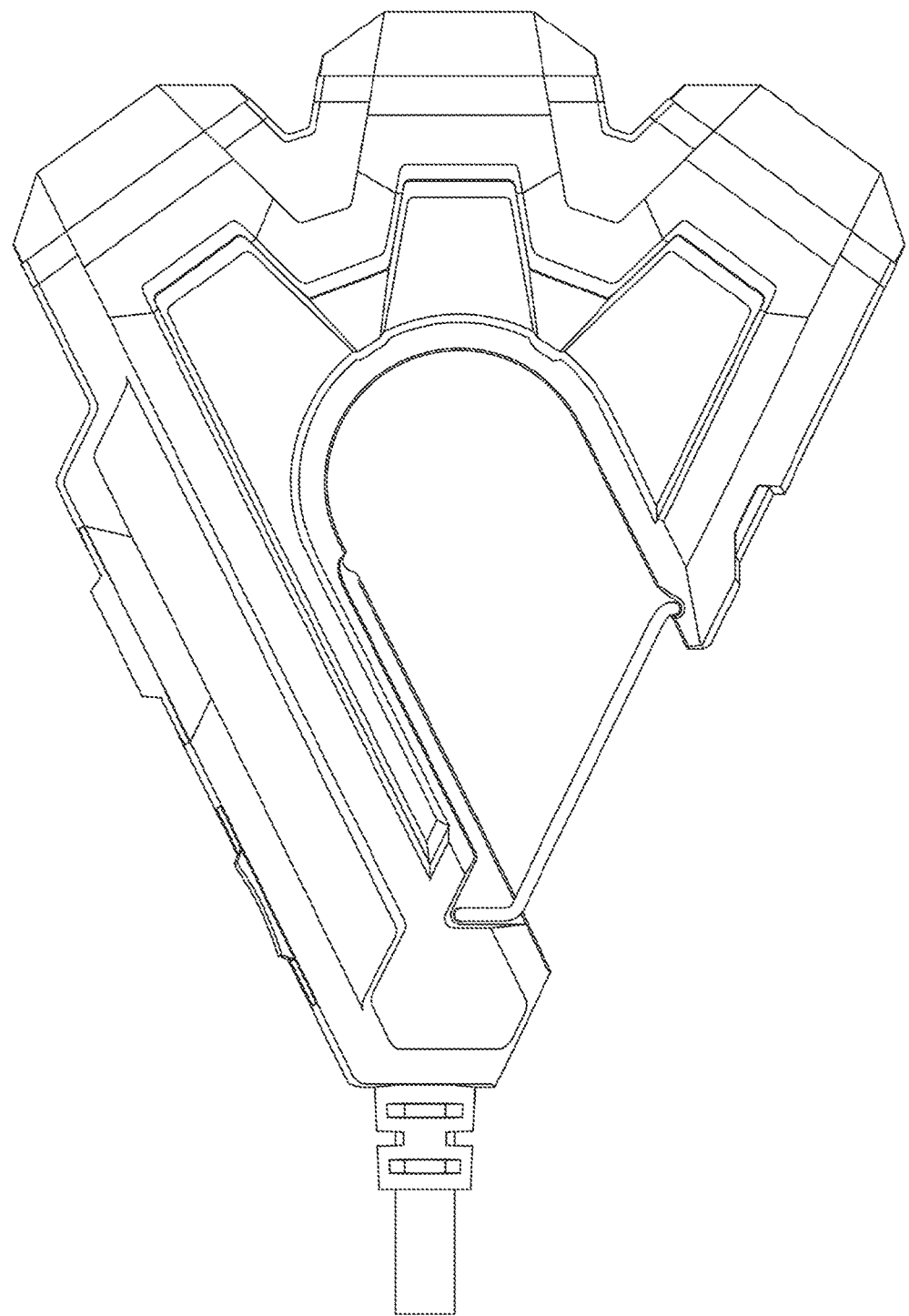
FIG. 30 is a top view of a preferred embodiment depicted with a gate and doors closed.
Figure 31:
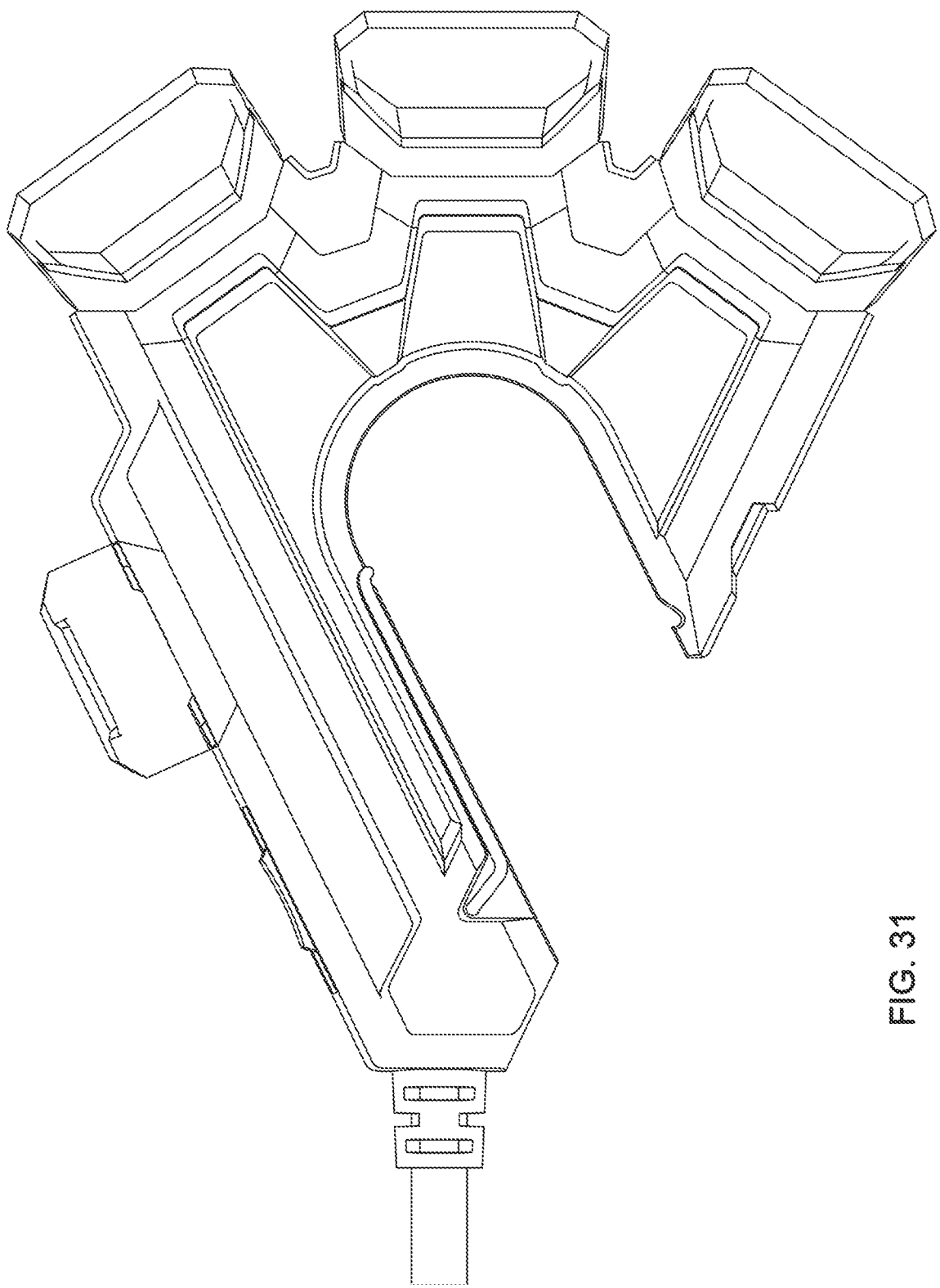
FIG. 31 is a top view of a preferred embodiment depicted with a gate and doors open.
Figure 32A:
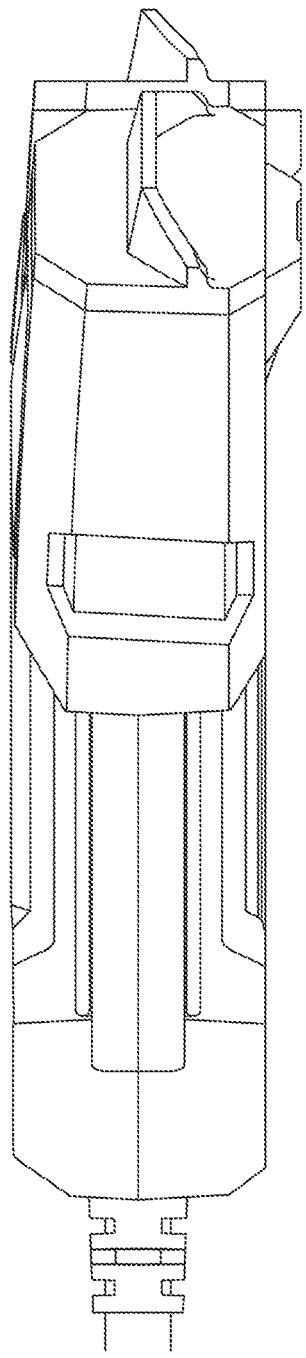
FIG. 32A is a side view of a preferred embodiment depicted with a gate and doors closed.
Figure 32B:
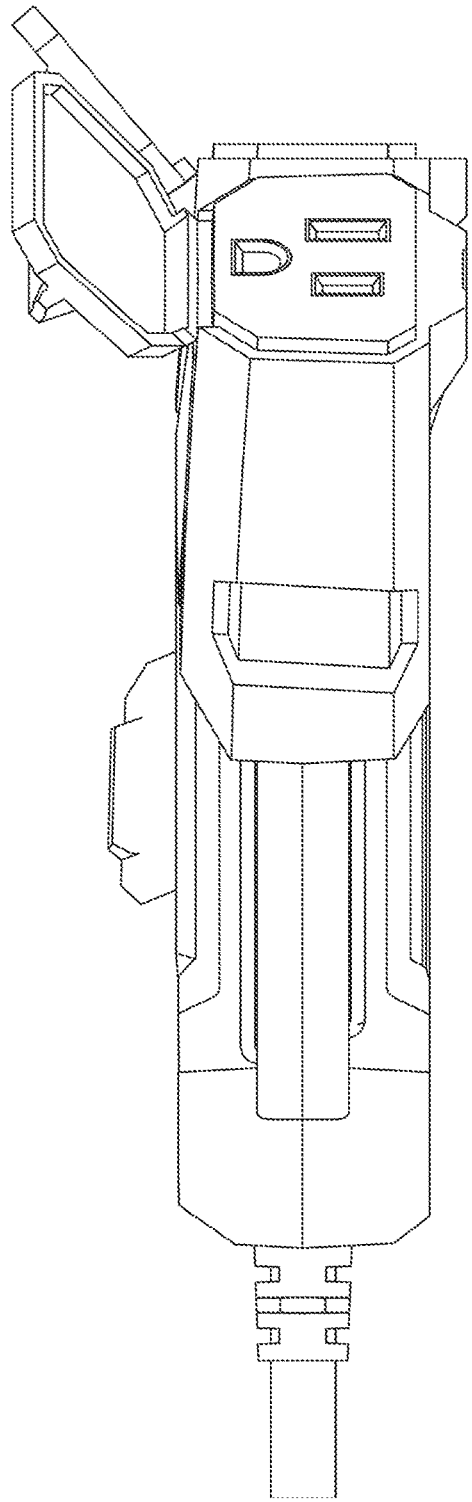
FIG. 32B is a side view of a preferred embodiment depicted with a gate and doors open.
Figure 33:
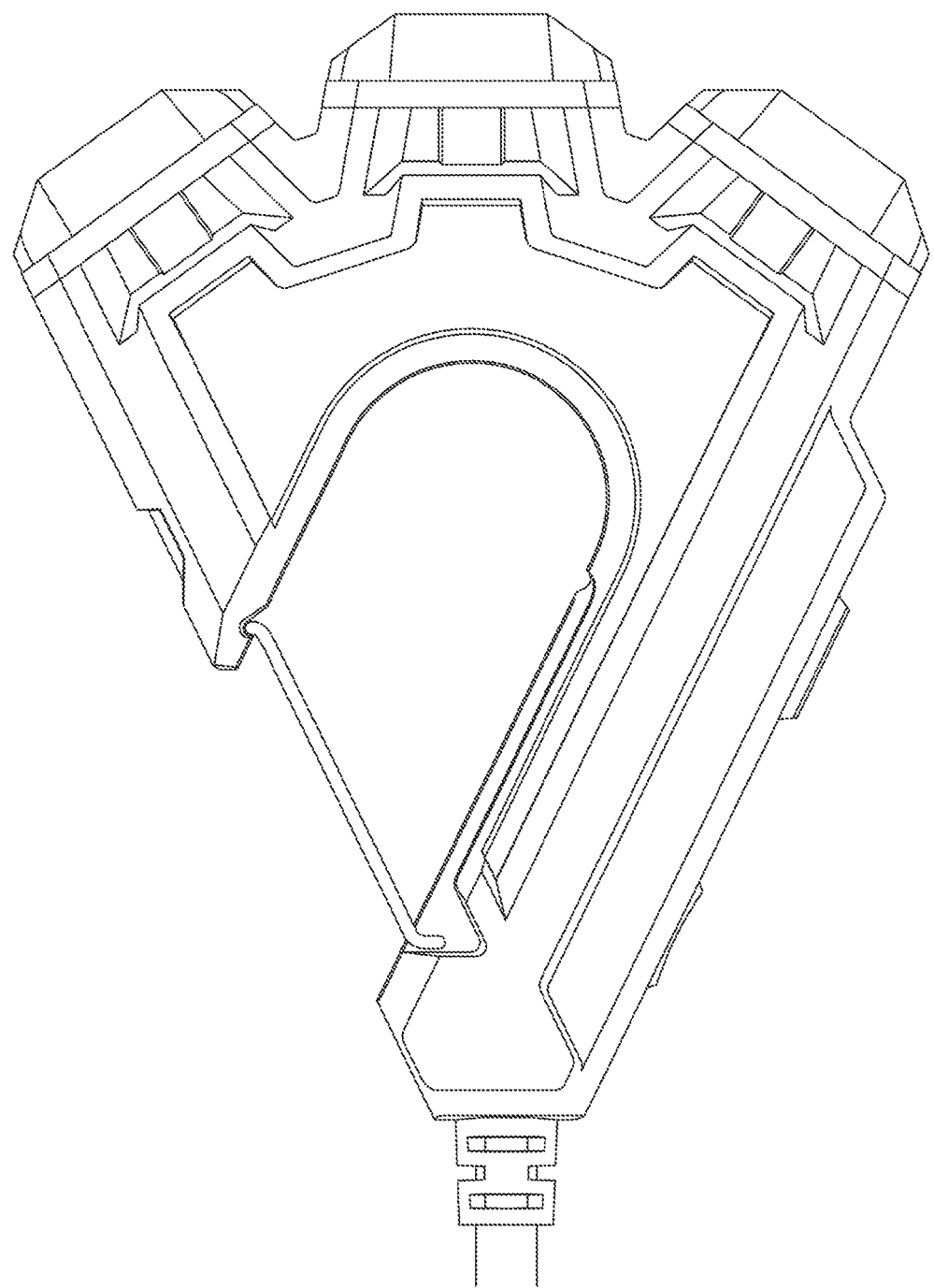
FIG. 33 is a bottom view of a preferred embodiment depicted with a gate and doors closed.
Figure 34:
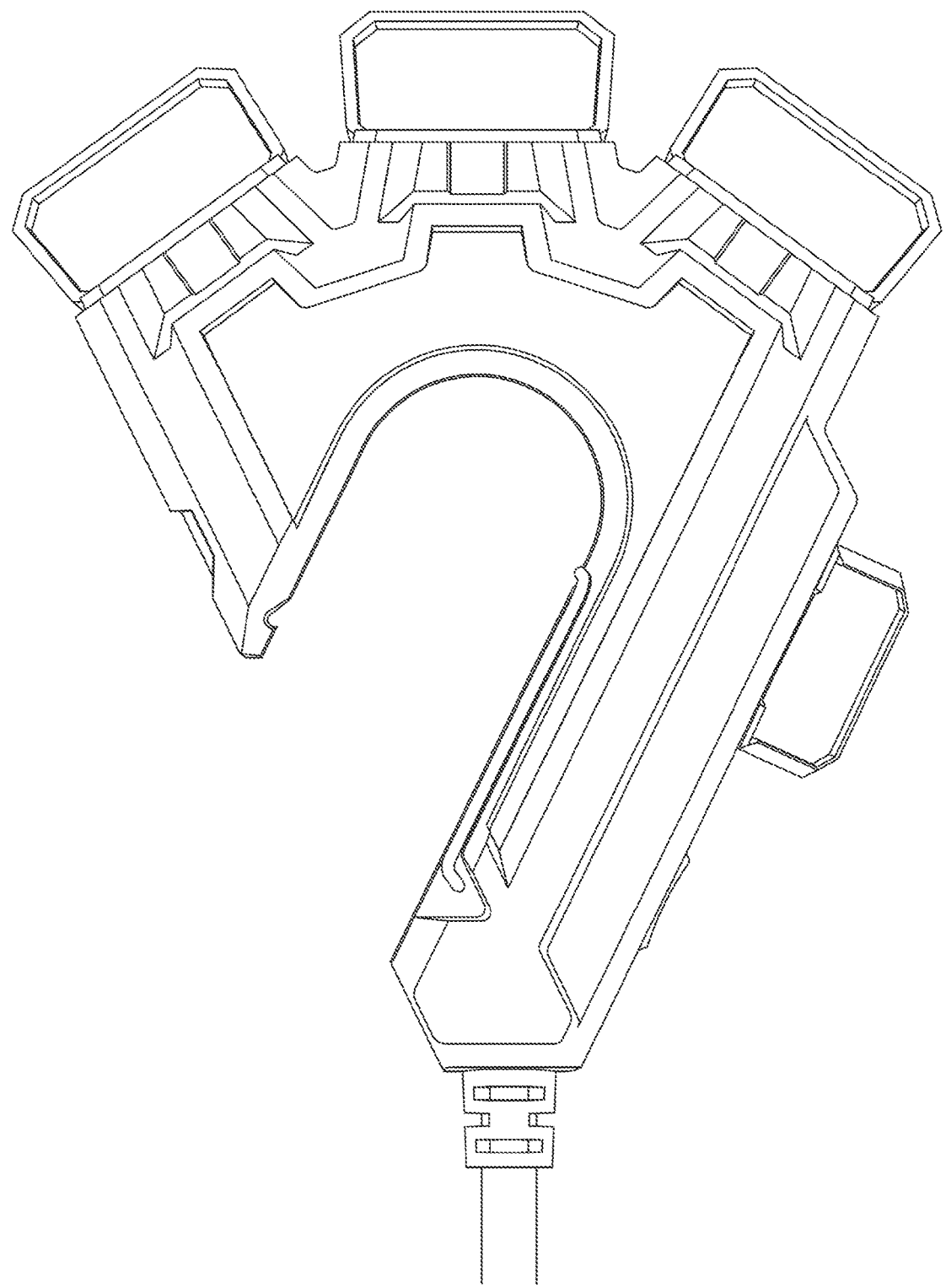
FIG. 34 is a bottom view of a preferred embodiment depicted with a gate and doors open.
Figure 35A:
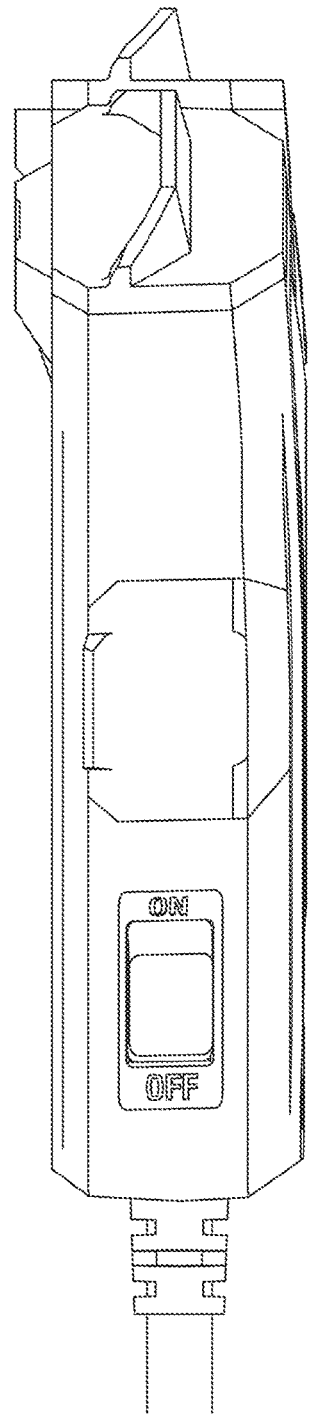
FIG. 35A is a side view of a preferred embodiment depicted with a gate and doors closed.
Figure 35B:
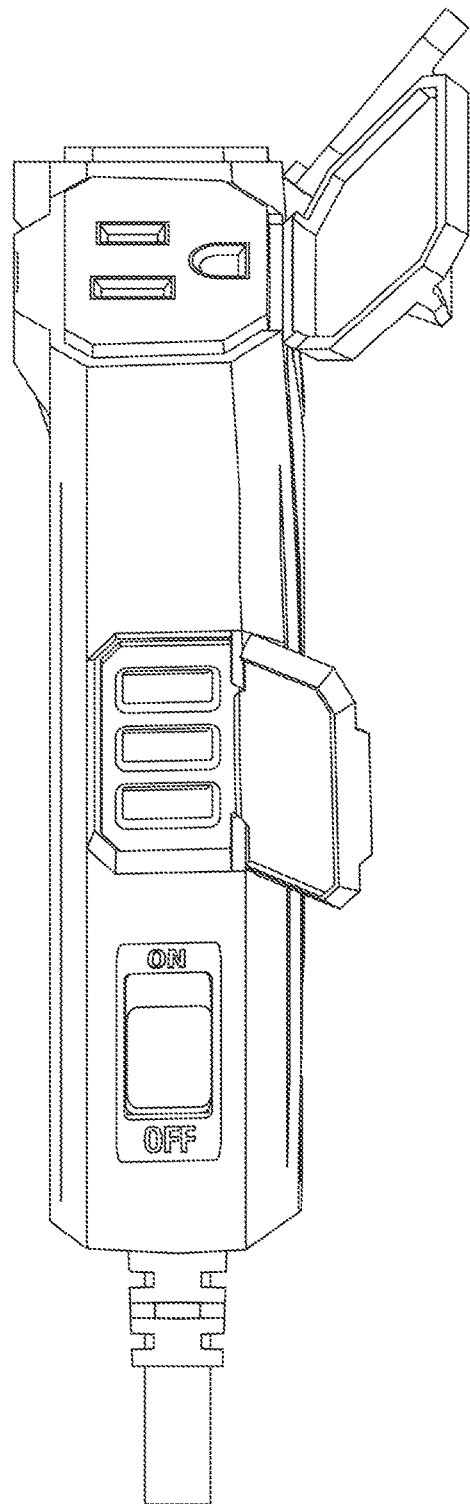
FIG. 35B is a side view of a preferred embodiment depicted with a gate and doors open.
Figure 37A:
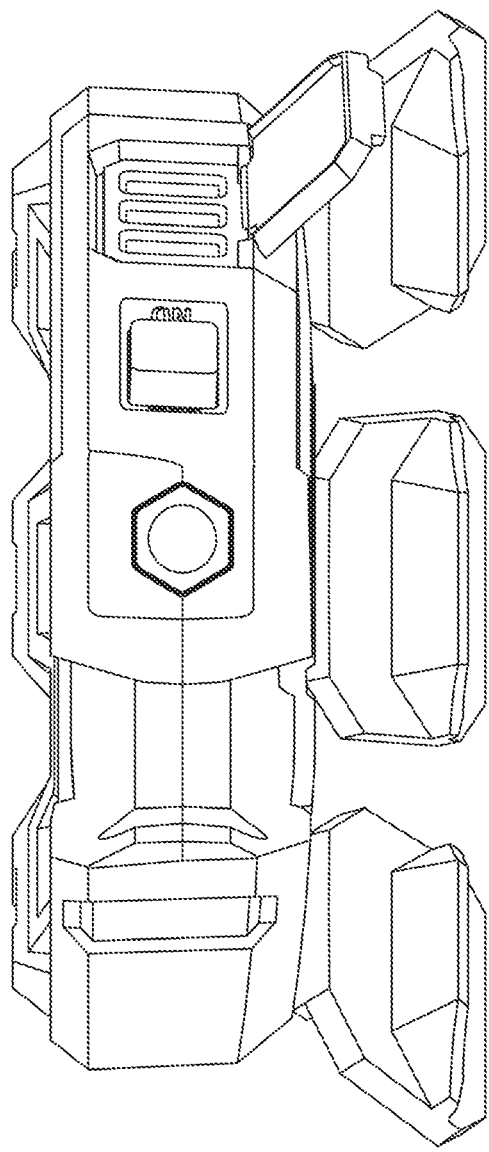
FIG. 37A is a back view of a preferred embodiment depicted with a gate and doors open.
Figure 37B:
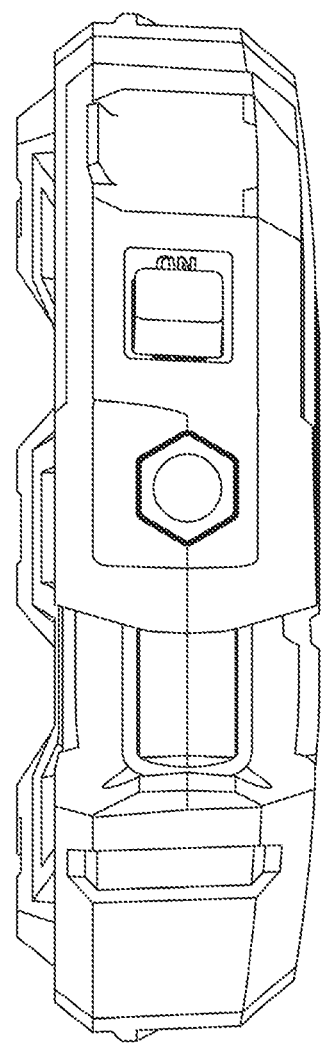
FIG. 37B is a back view of a preferred embodiment depicted with a gate and doors closed.
Figure 38:
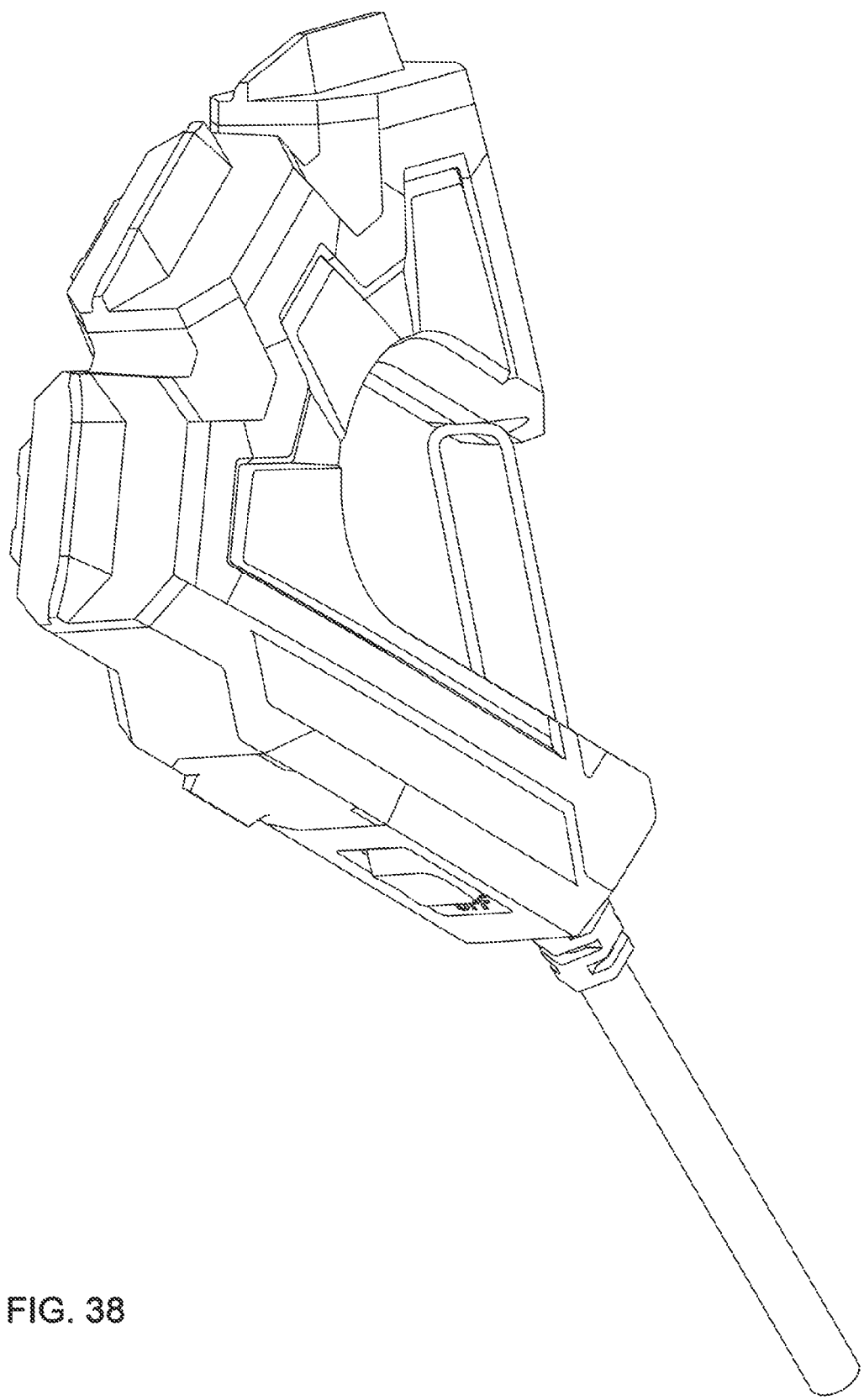
FIG. 38 is a perspective view of a preferred embodiment depicted with a gate and doors closed.
Figure 39:
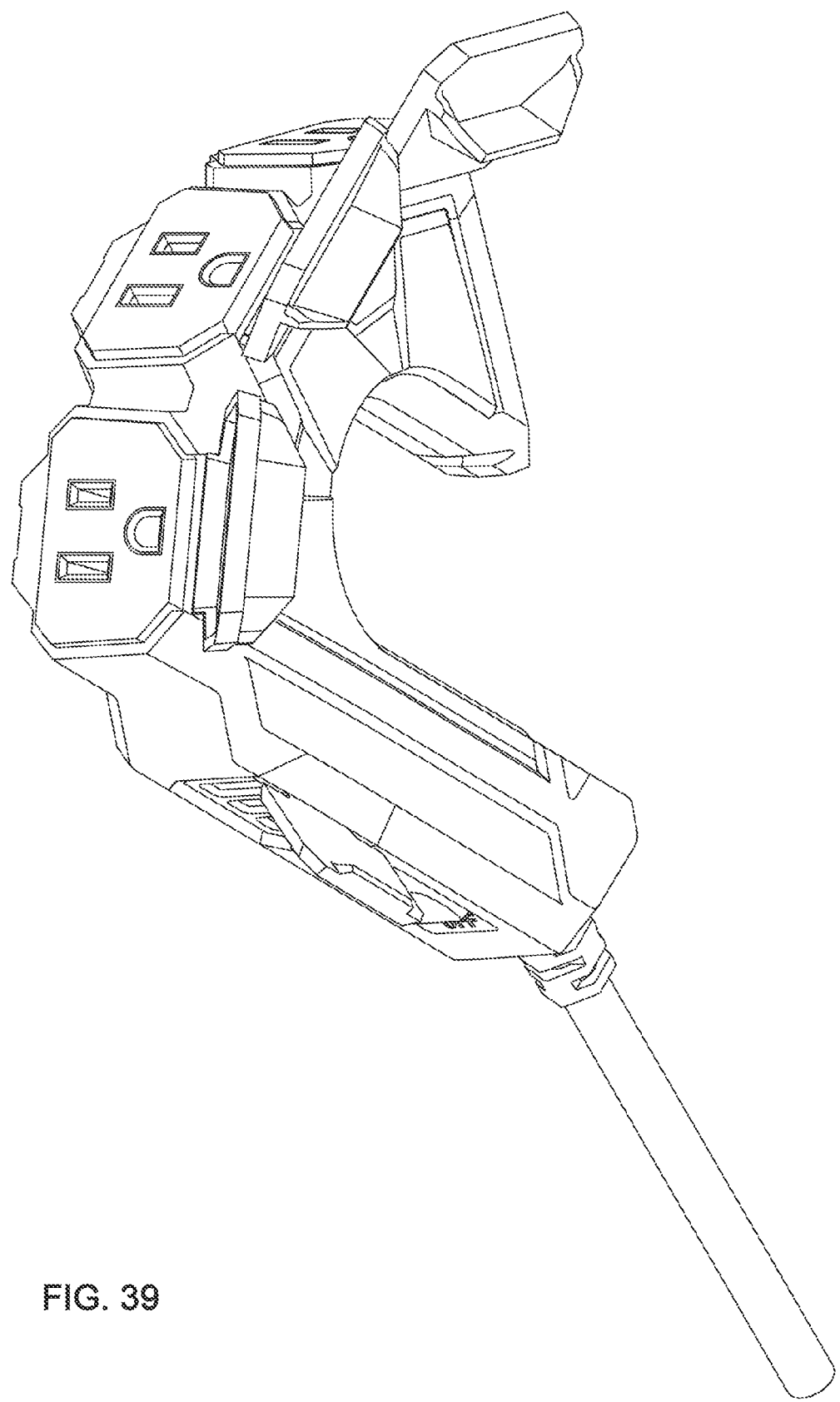
FIG. 39 is a perspective view of a preferred embodiment depicted with a gate and doors open.
Figure 40:
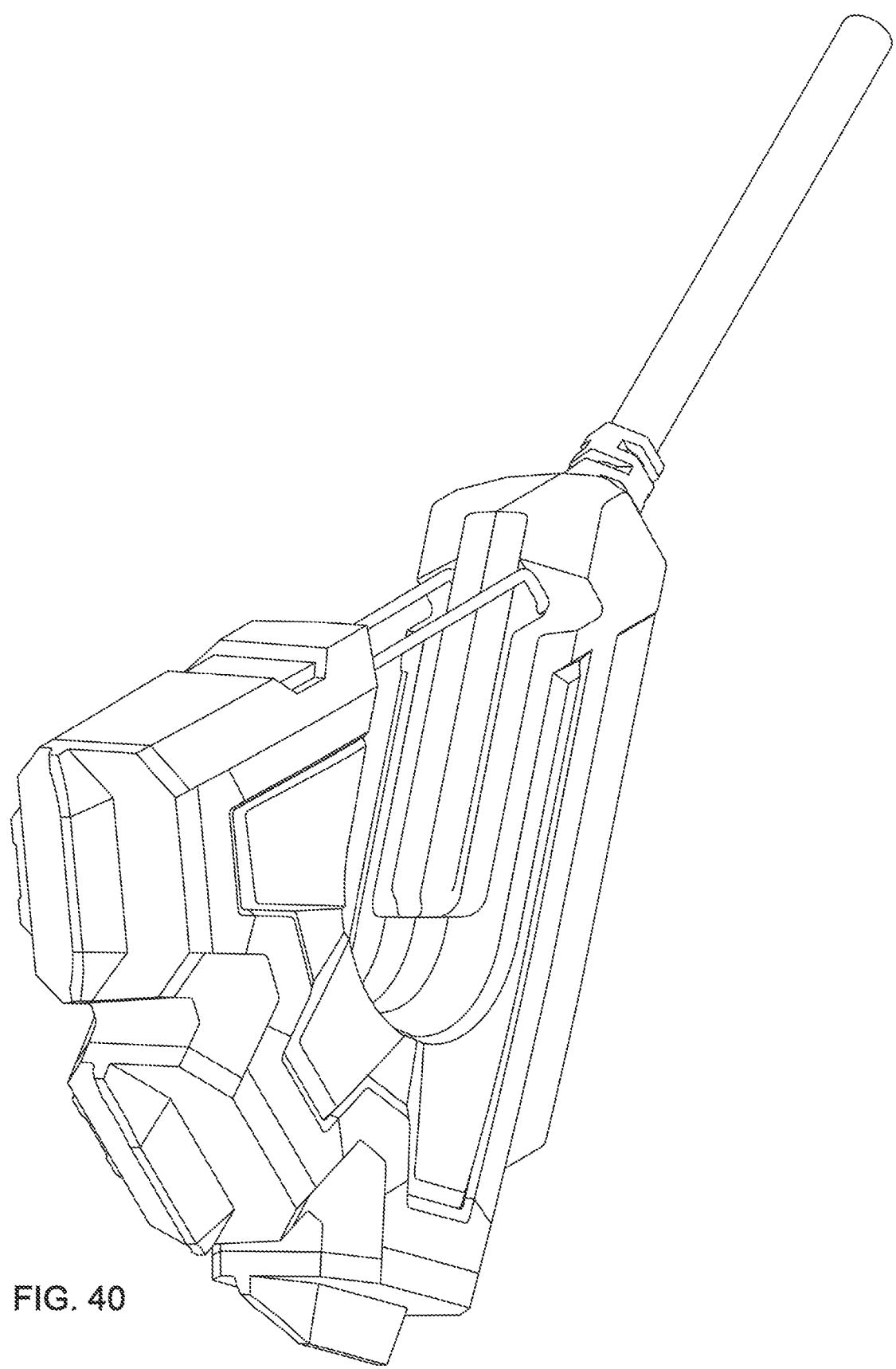
FIG. 40 is a perspective view of a preferred embodiment depicted with a gate and doors closed.
Figure 41:
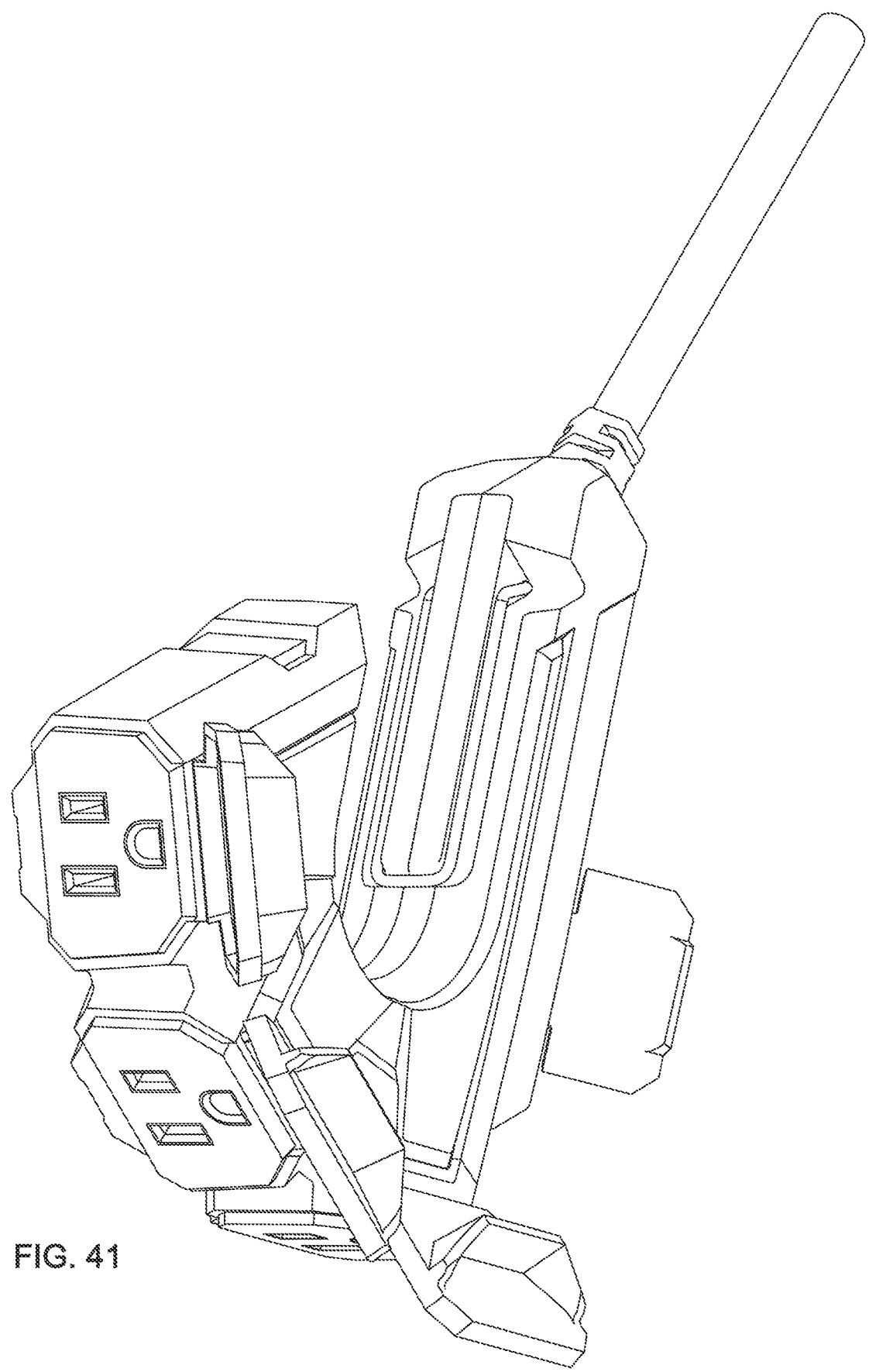
FIG. 41 is a perspective view of a preferred embodiment depicted with a gate and doors open.
Figure 42:
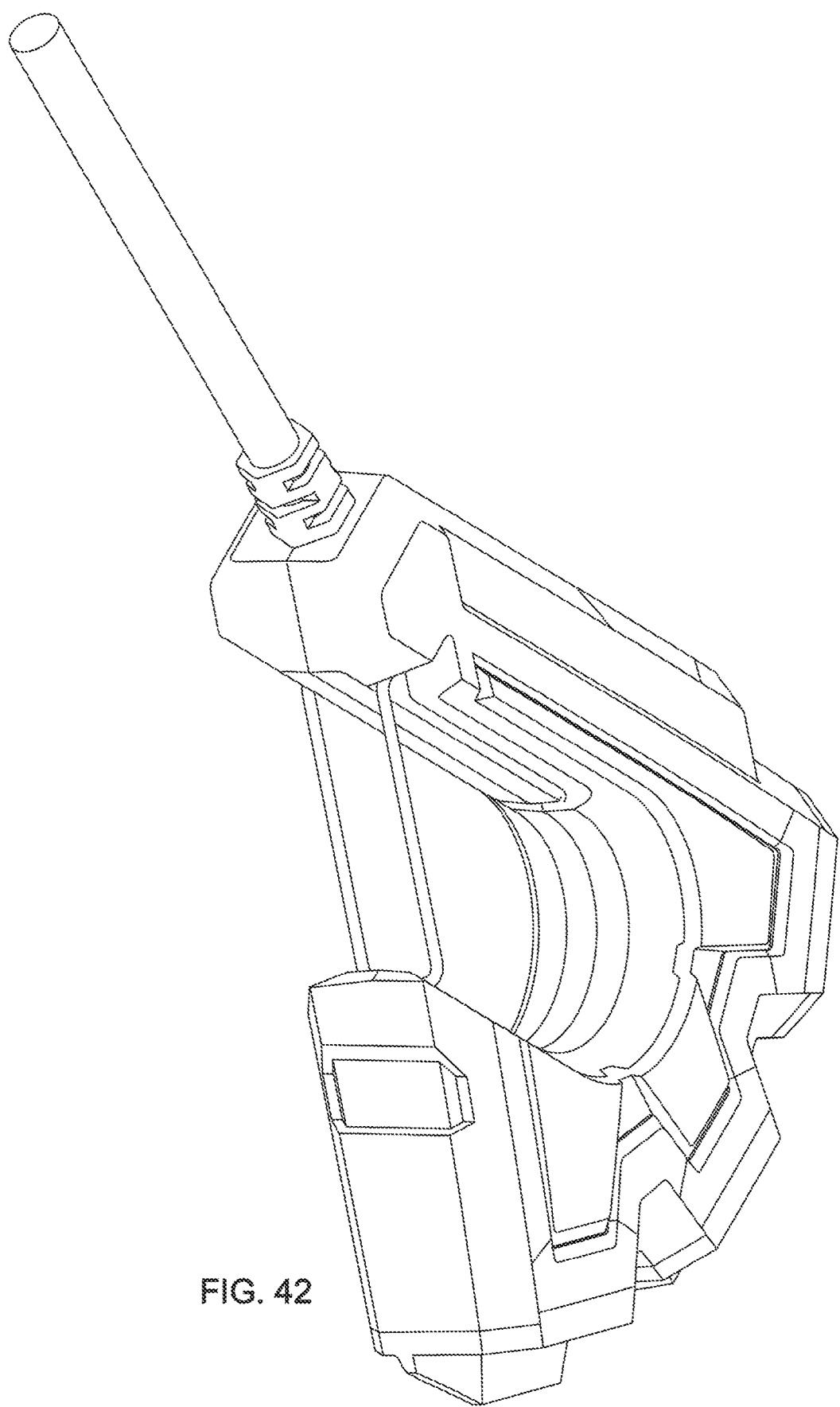
FIG. 42 is a perspective view of a preferred embodiment depicted with a gate and doors closed.
Figure 43:
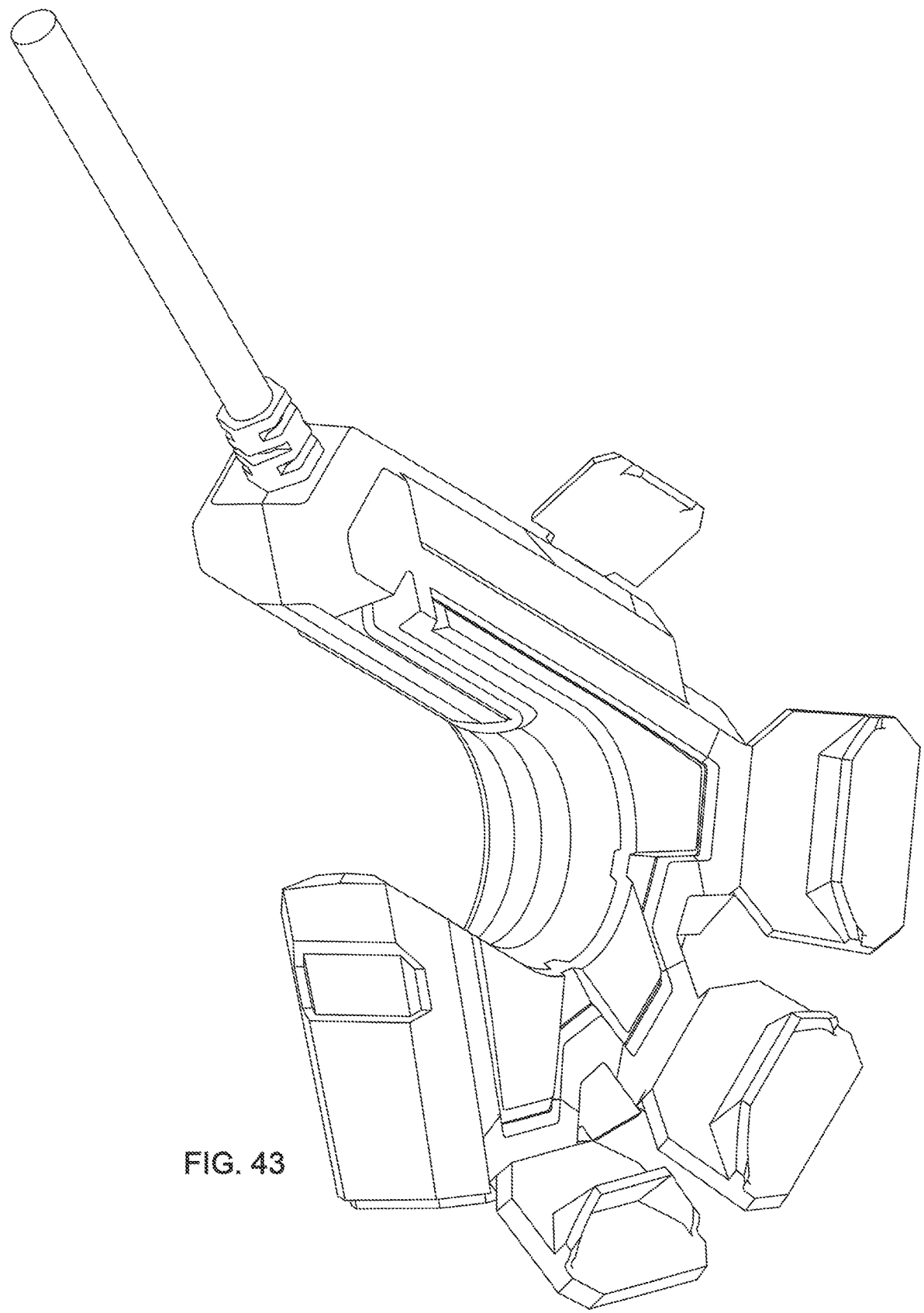
FIG. 43 is a perspective view of a preferred embodiment depicted with a gate and doors open.
Figure 44:
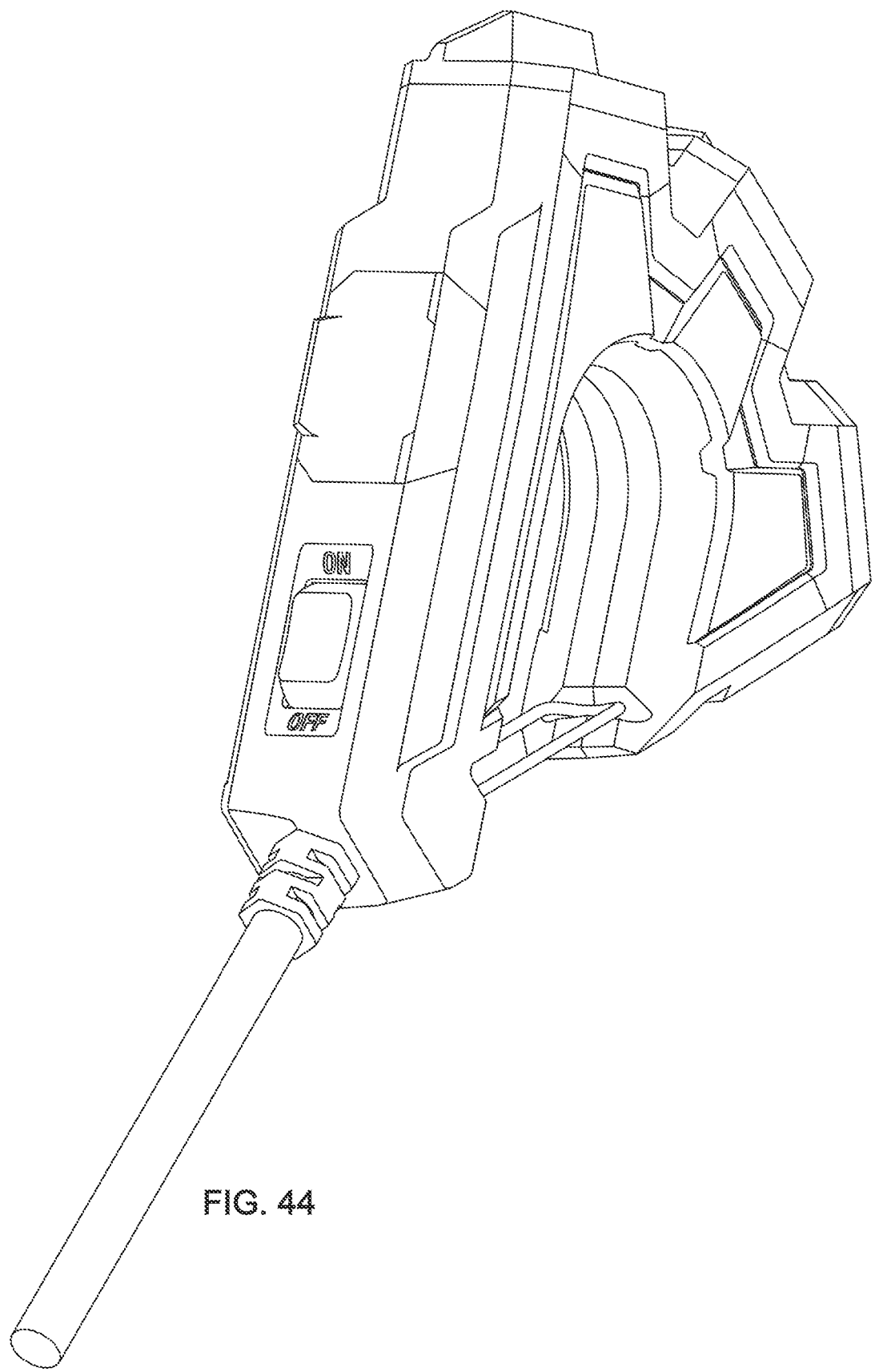
FIG. 44 is a perspective view of a preferred embodiment depicted with a gate and doors closed.
Figure 45:
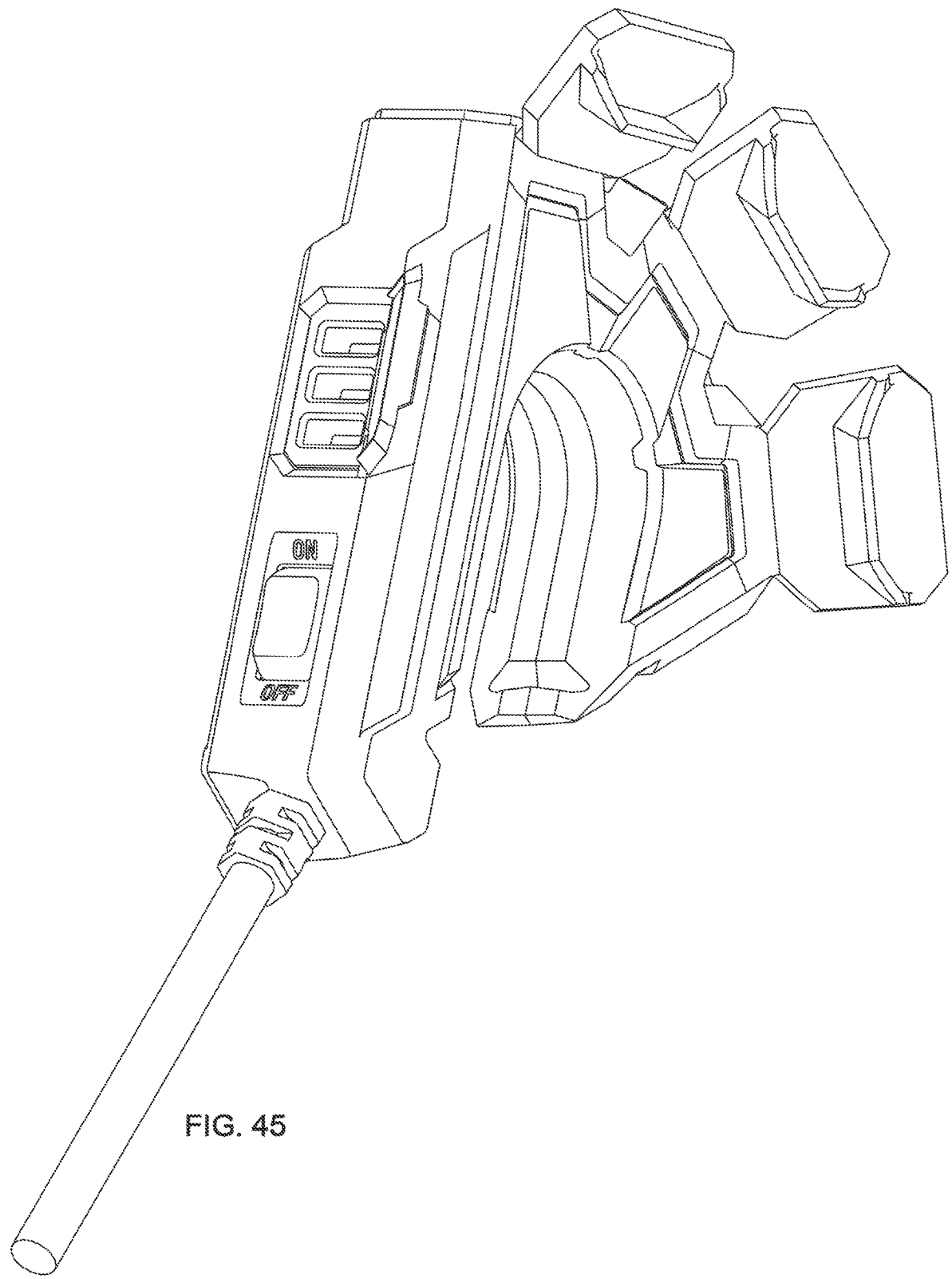
FIG. 45 is a perspective view of a preferred embodiment depicted with a gate and doors open.
Figure 46:
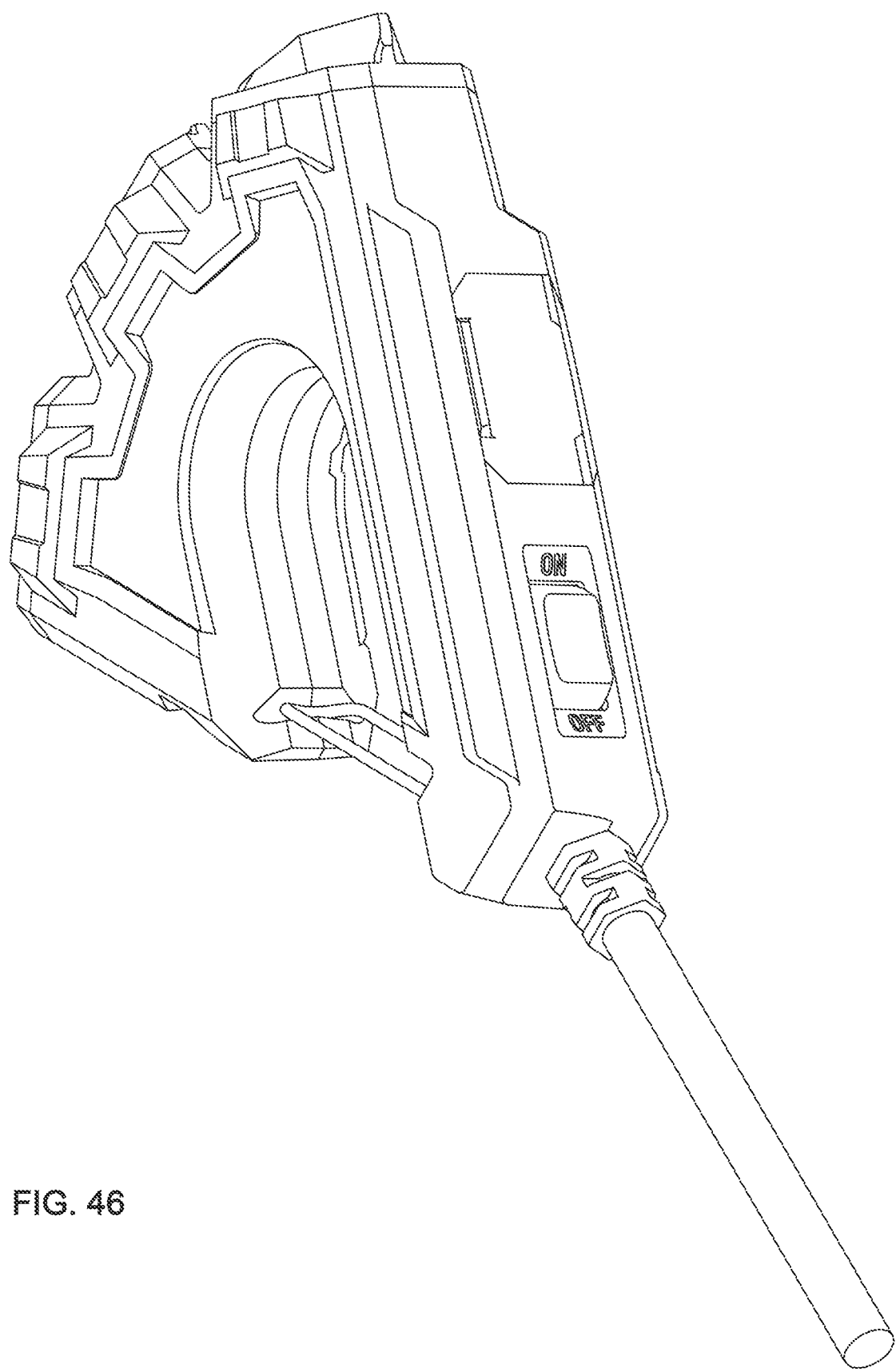
FIG. 46 is a perspective view of a preferred embodiment depicted with a gate and doors closed.
Figure 47:
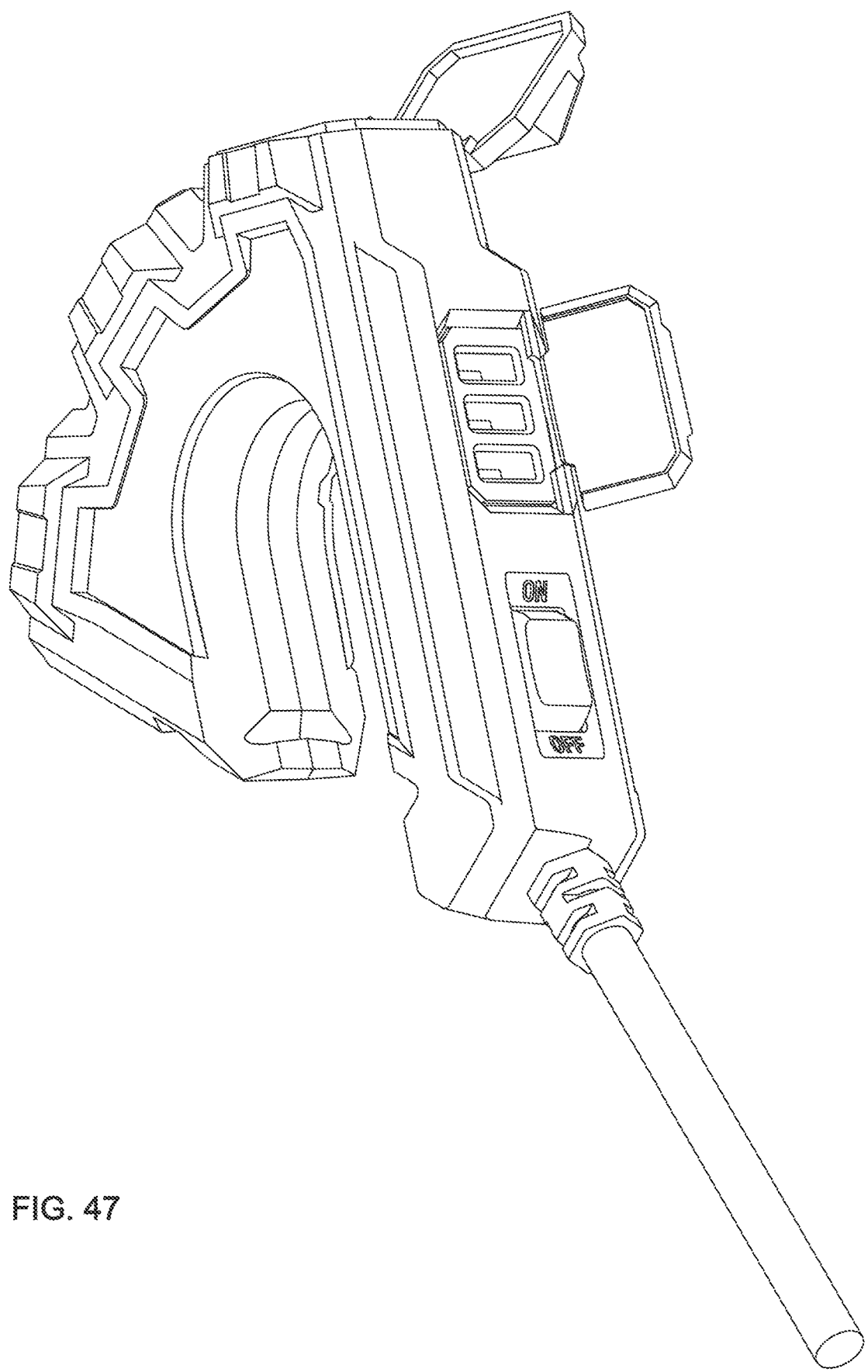
FIG. 47 is a perspective view of a preferred embodiment depicted with a gate and doors open.
Figure 48:
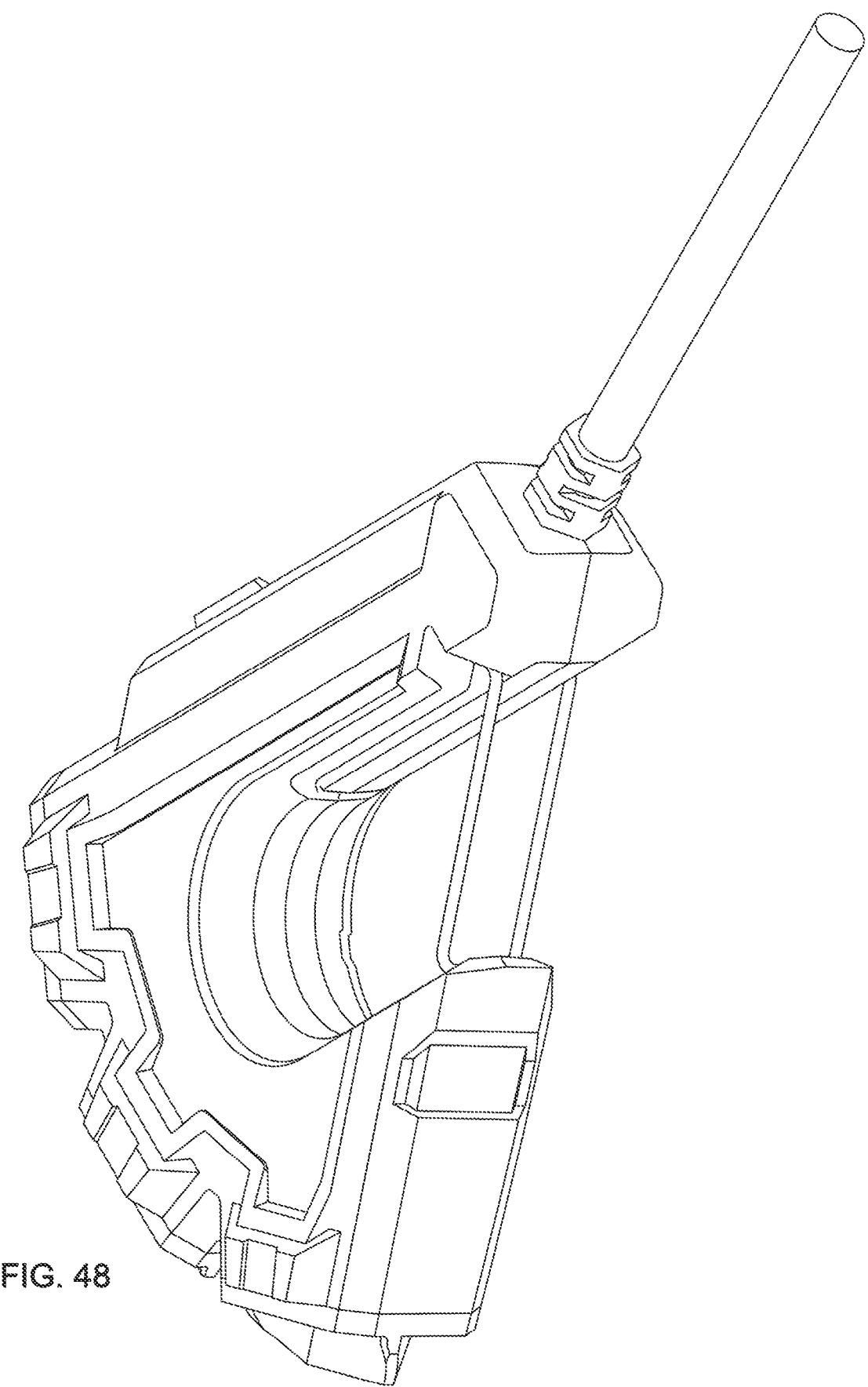
FIG. 48 is a perspective view of a preferred embodiment depicted with a gate and doors closed.
Figure 49:
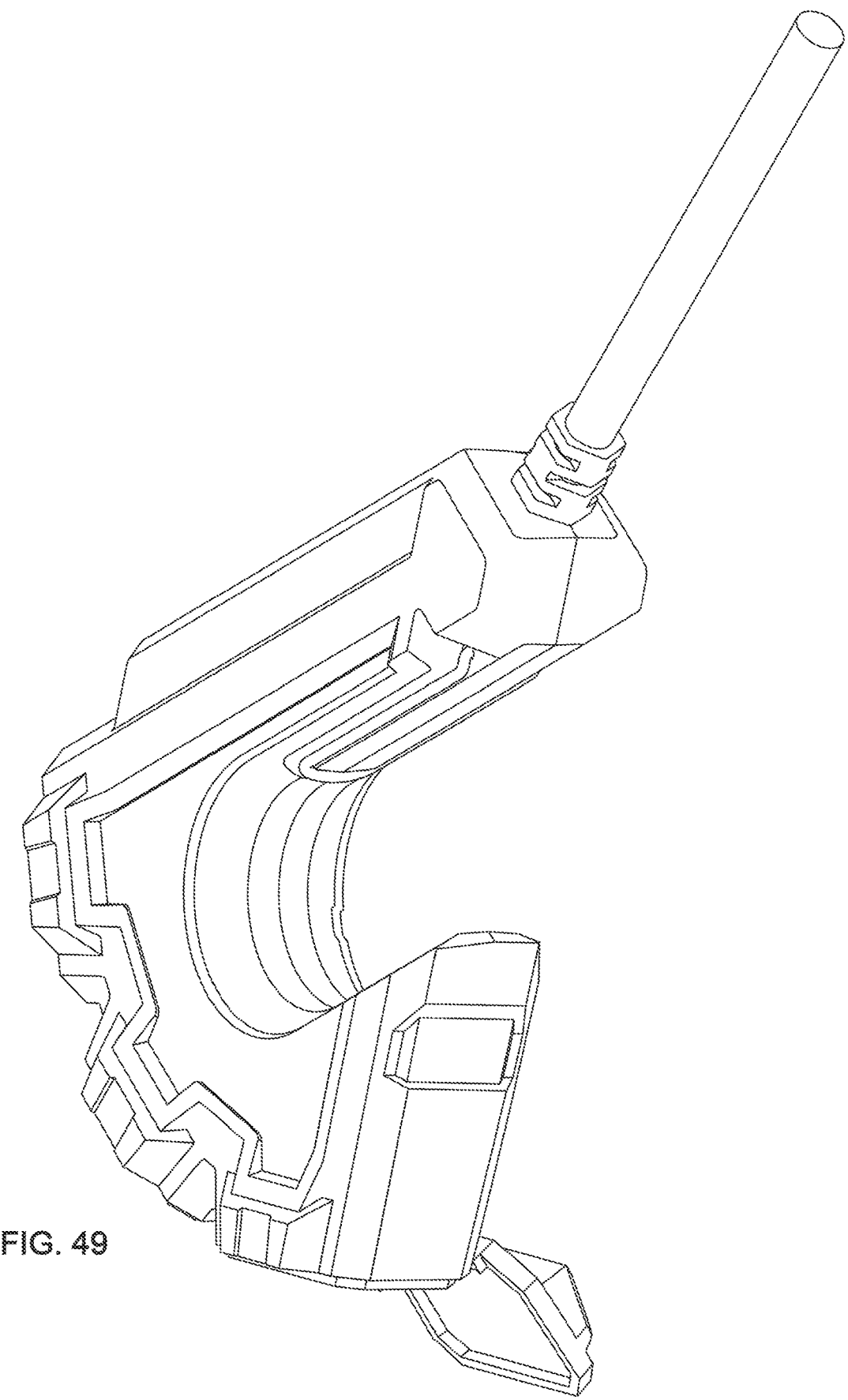
FIG. 49 is a perspective view of a preferred embodiment depicted with a gate and doors open.
Figure 50:
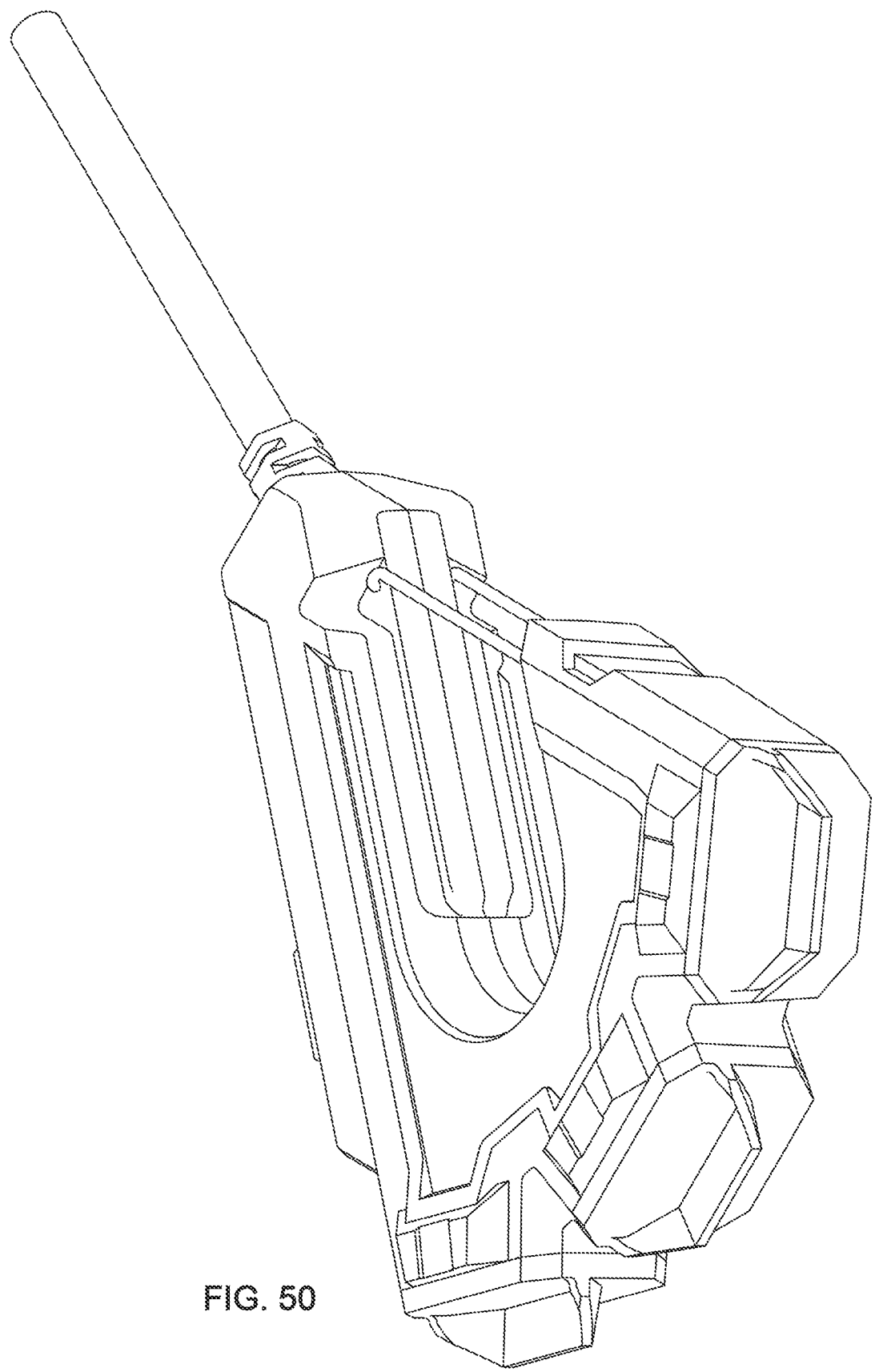
FIG. 50 is a perspective view of a preferred embodiment depicted with a gate and doors closed.
Figure 51:
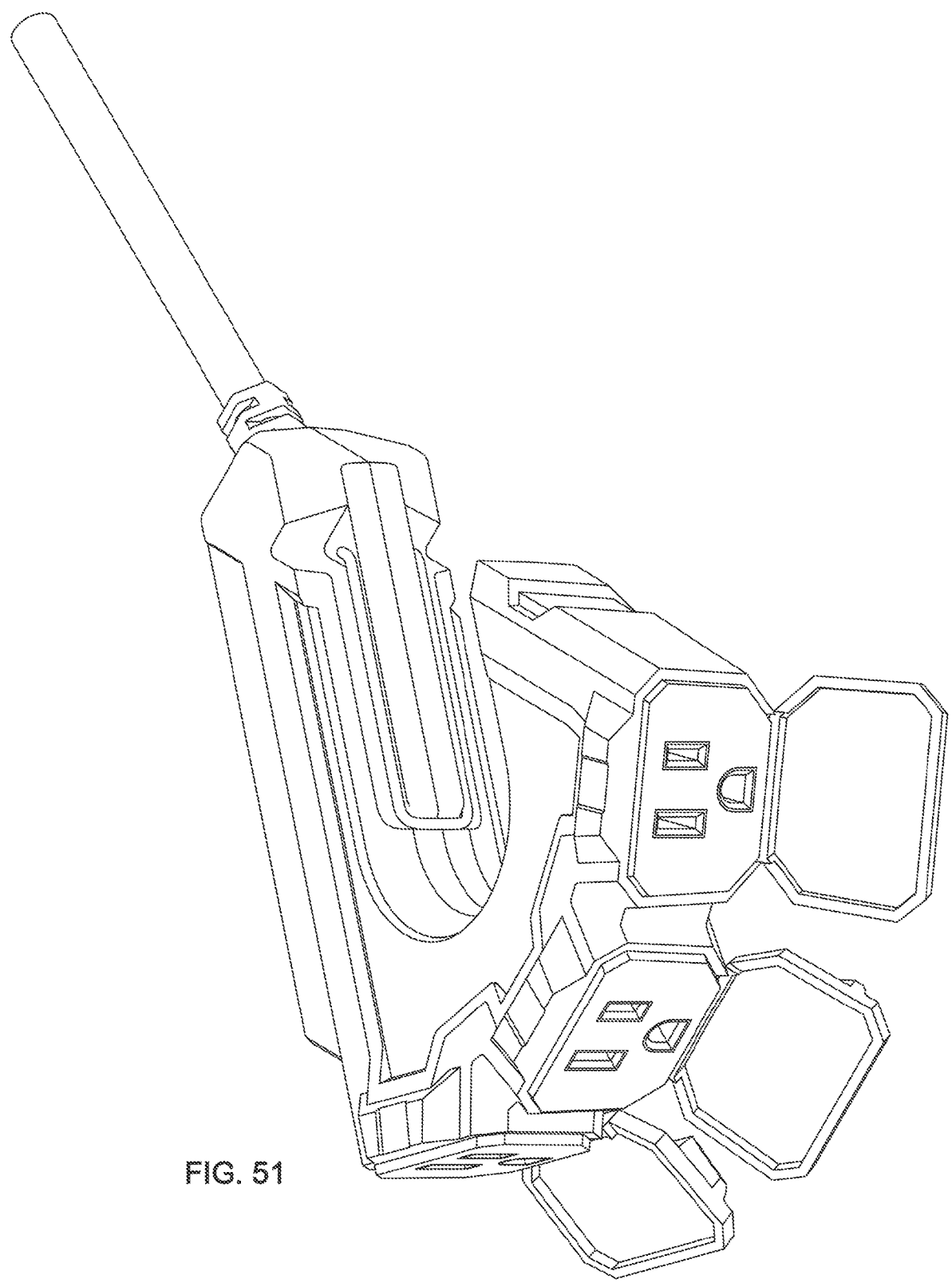
FIG. 51 is a perspective view of a preferred embodiment depicted with a gate and doors open.
Figure 52:
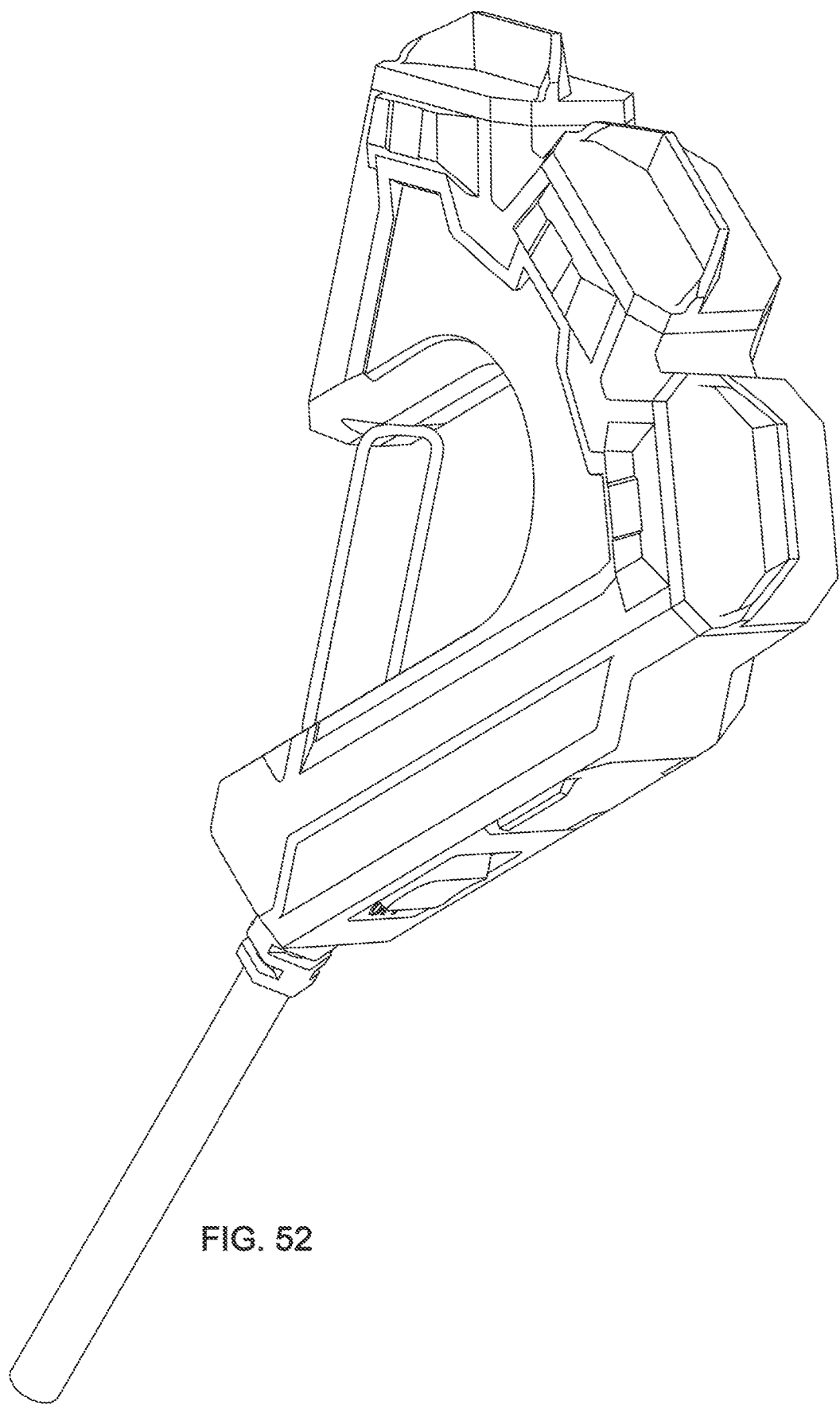
FIG. 52 is a perspective view of a preferred embodiment depicted with a gate and doors closed.
Figure 53:
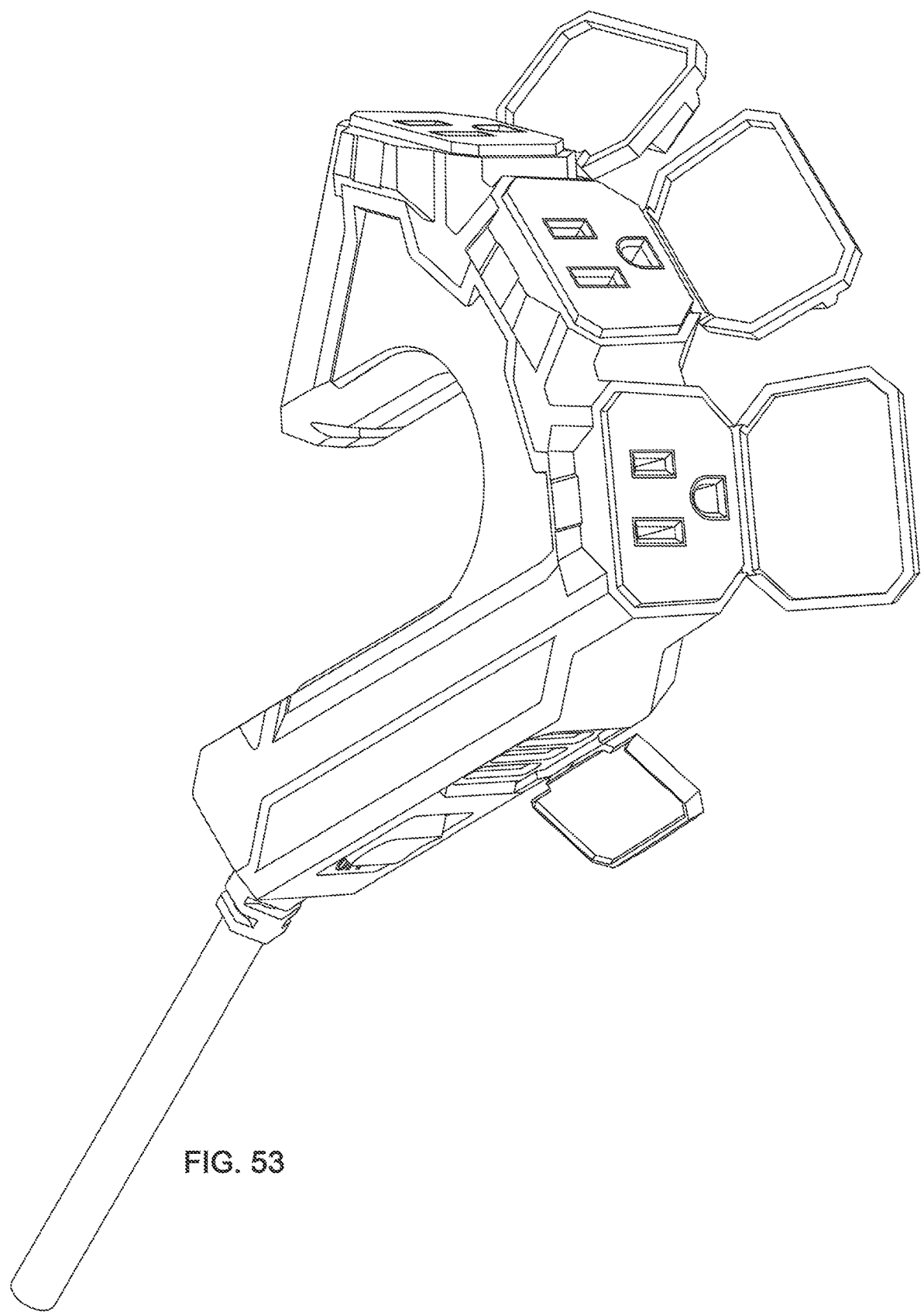
FIG. 53 is a perspective view of a preferred embodiment depicted with a gate and doors open.
Figure 54:
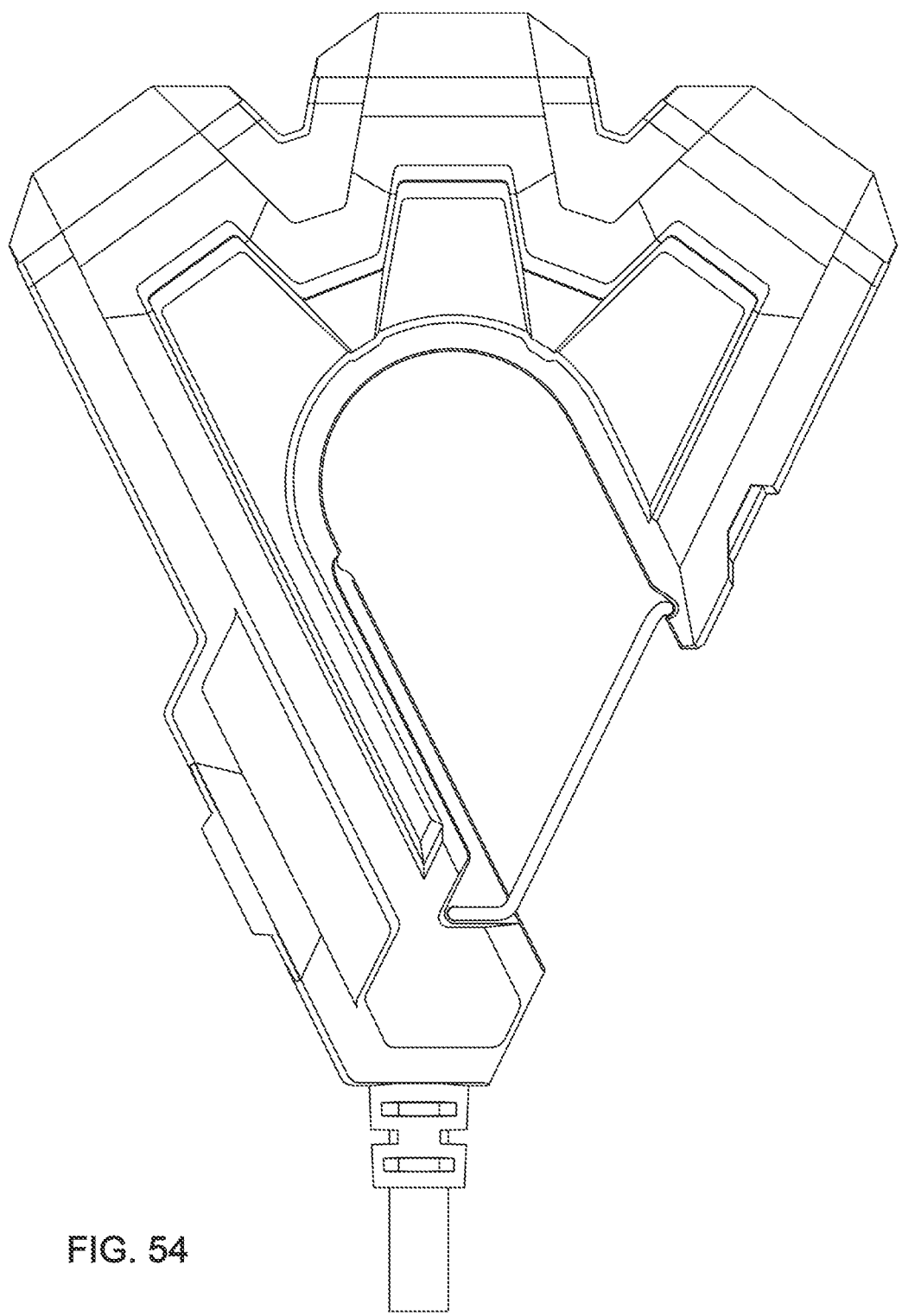
FIG. 54 is a top view of a second embodiment depicted with a gate and doors closed.
Figure 55:
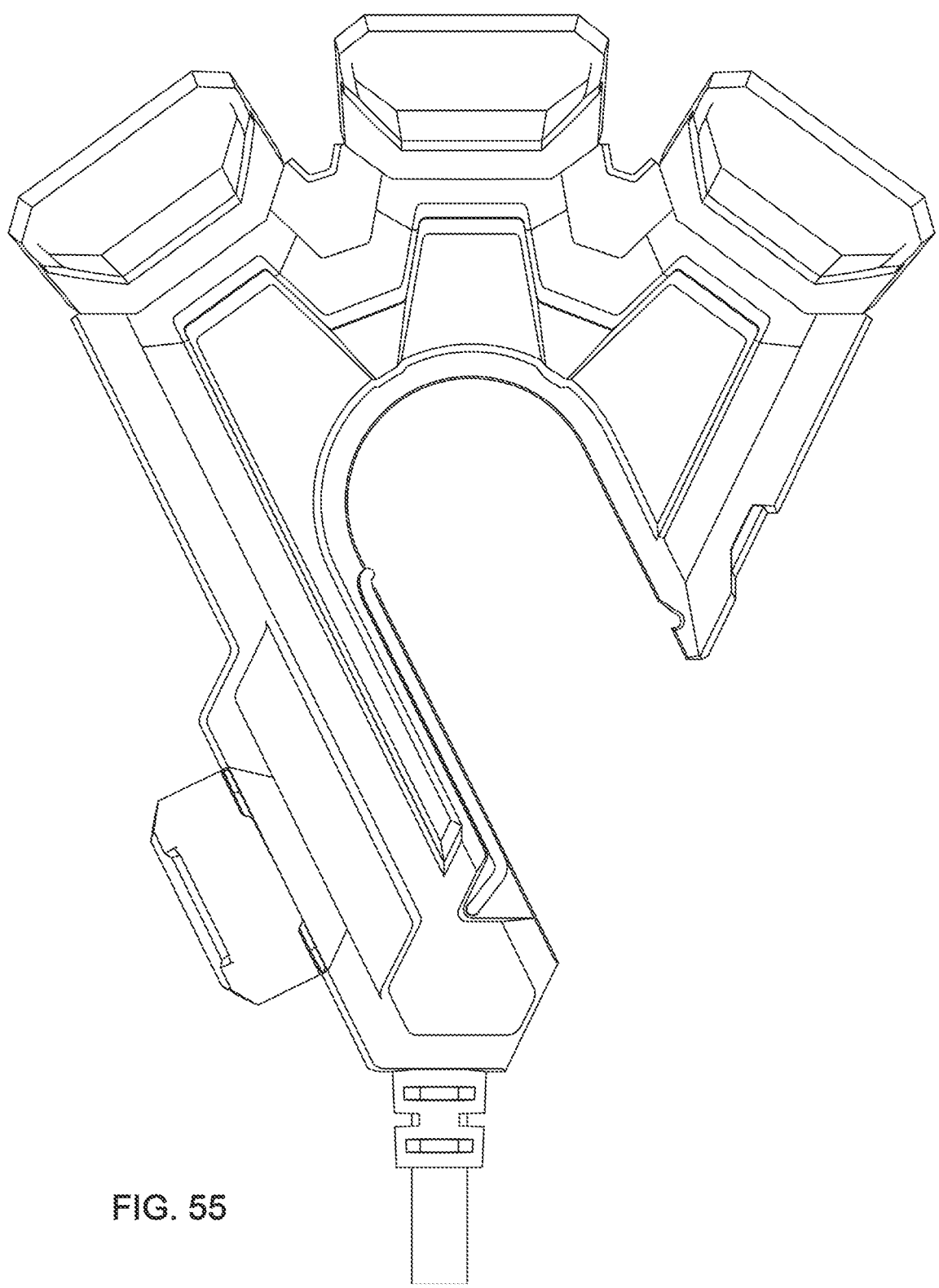
FIG. 55 is a top view of a second embodiment depicted with a gate and doors open.
Figure 56A:
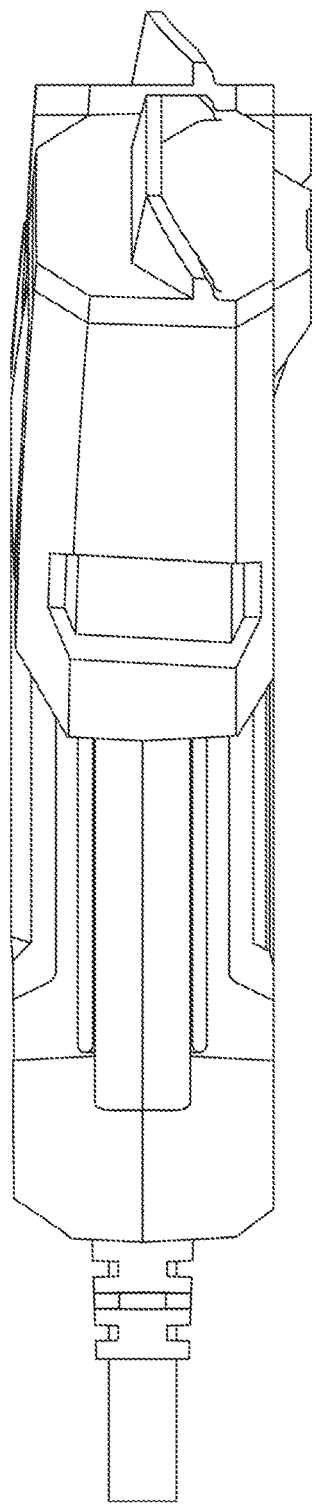
FIG. 56A is a side view of a second embodiment depicted with a gate and doors closed.
Figure 56B:
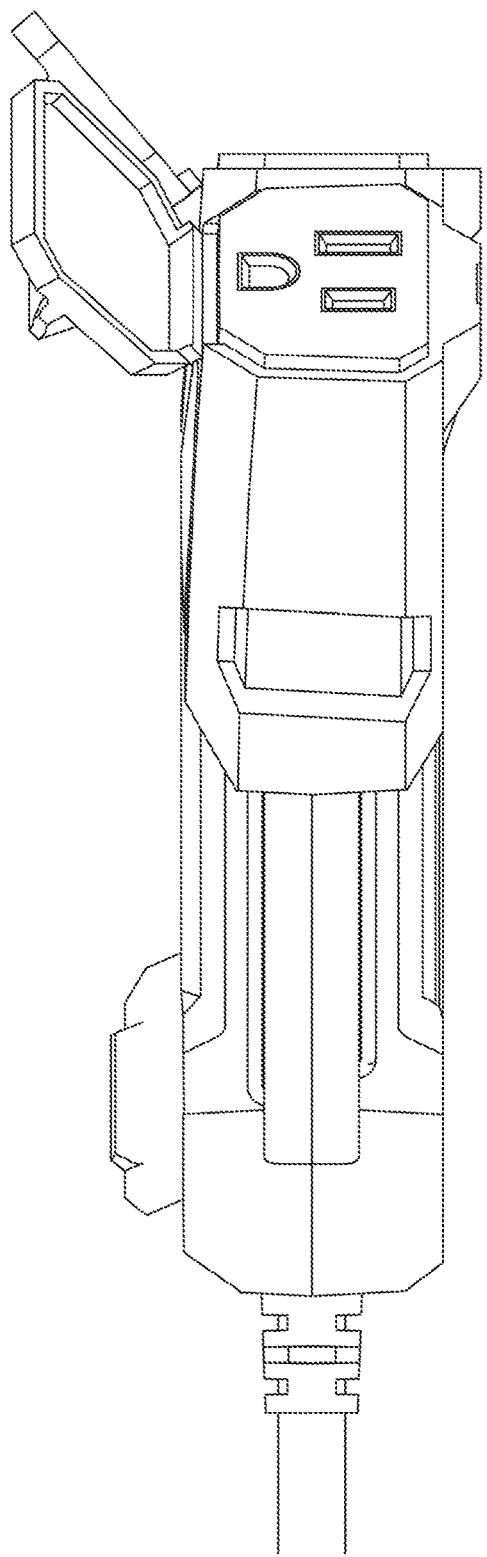
FIG. 56B is a side view of a second embodiment depicted with a gate and doors open.
Figure 57:
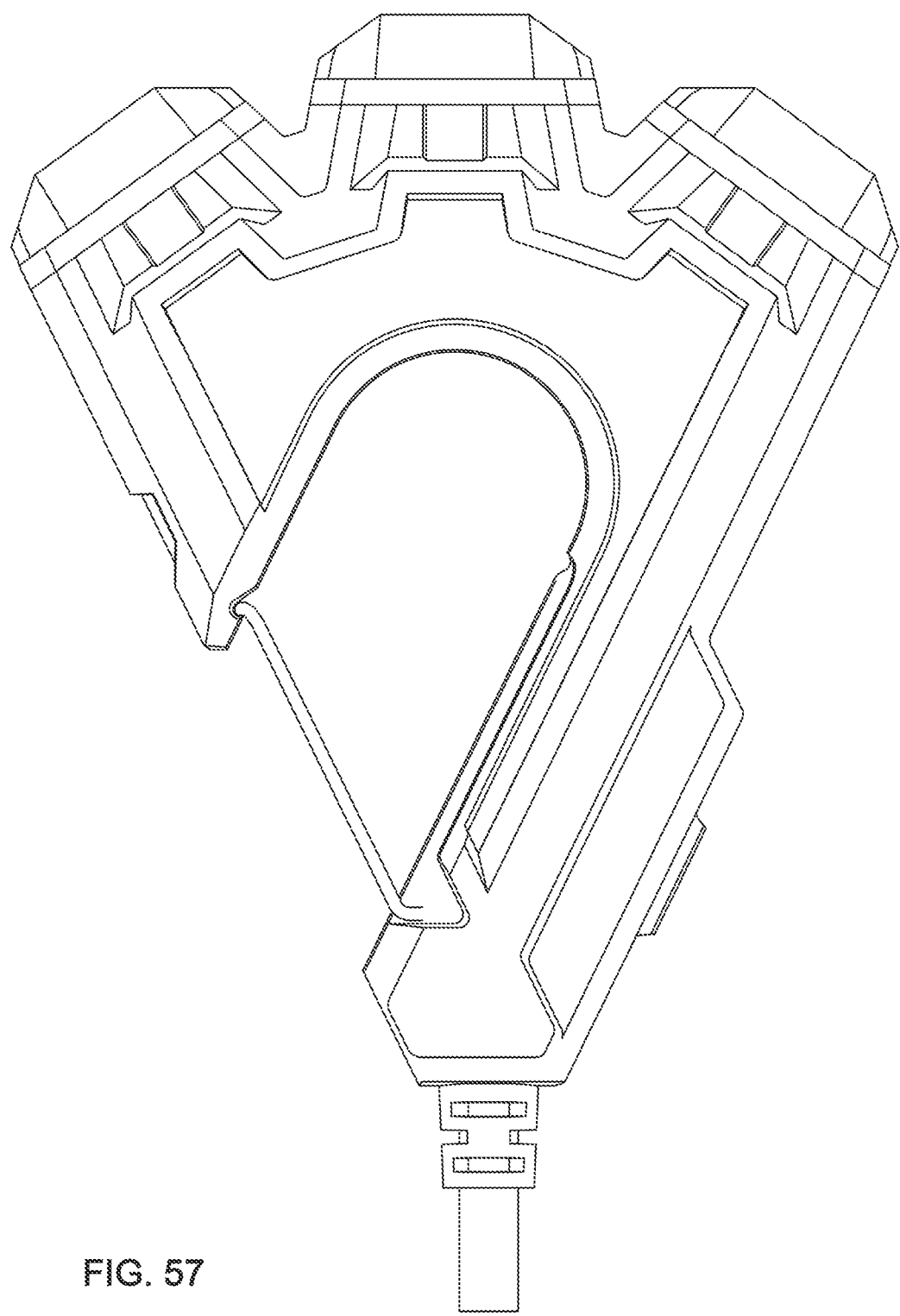
FIG. 57 is a bottom view of a second embodiment depicted with a gate and doors closed.
Figure 58:
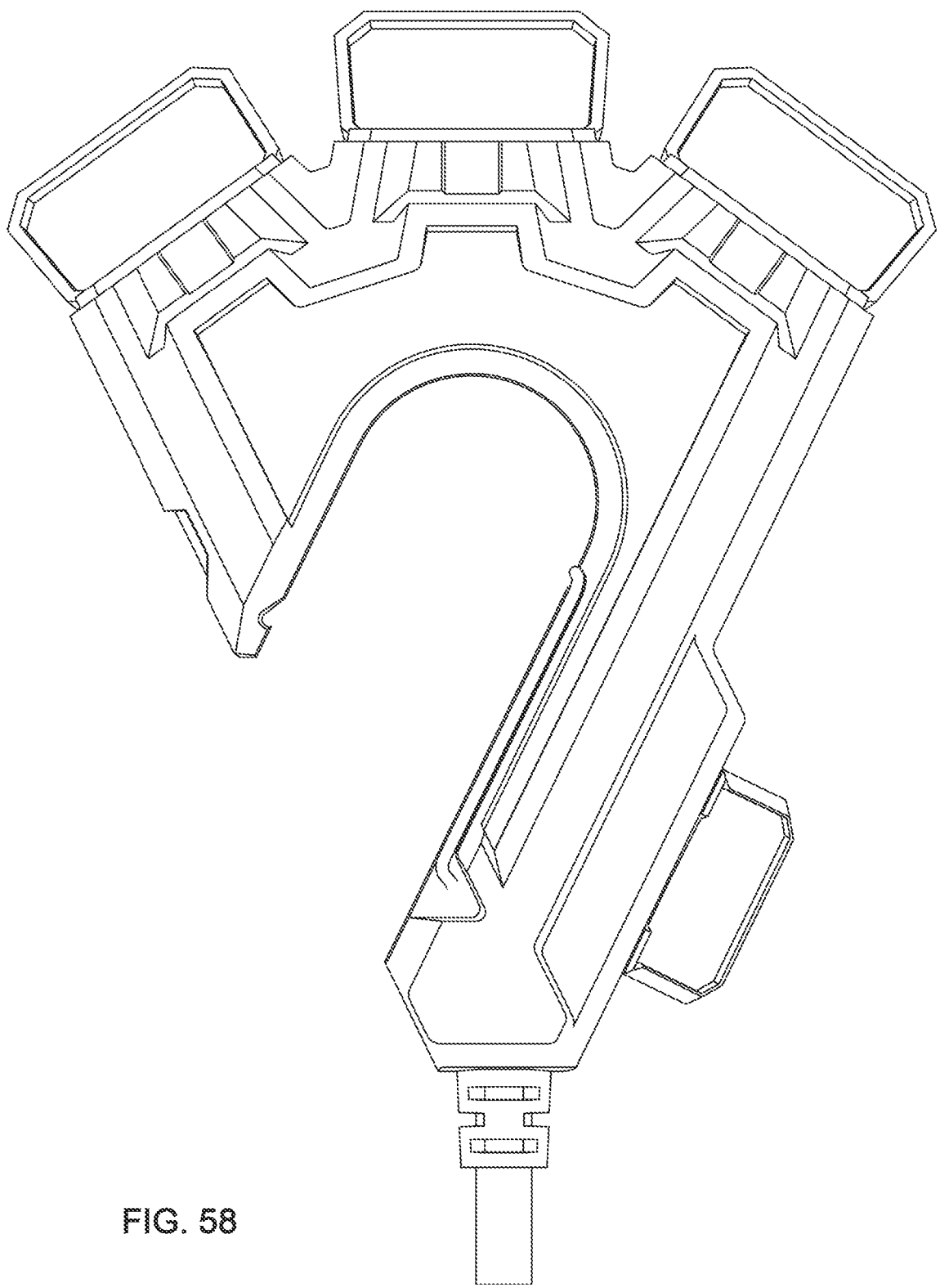
FIG. 58 is a bottom view of a second embodiment depicted with a gate and doors open.
Figure 59A:
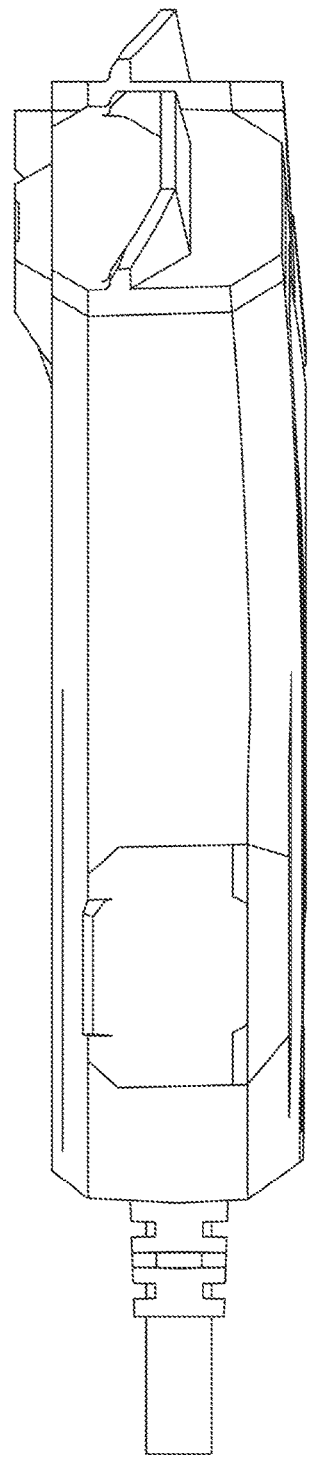
FIG. 59A is a side view of a second embodiment depicted with a gate and doors closed.
Figure 59B:
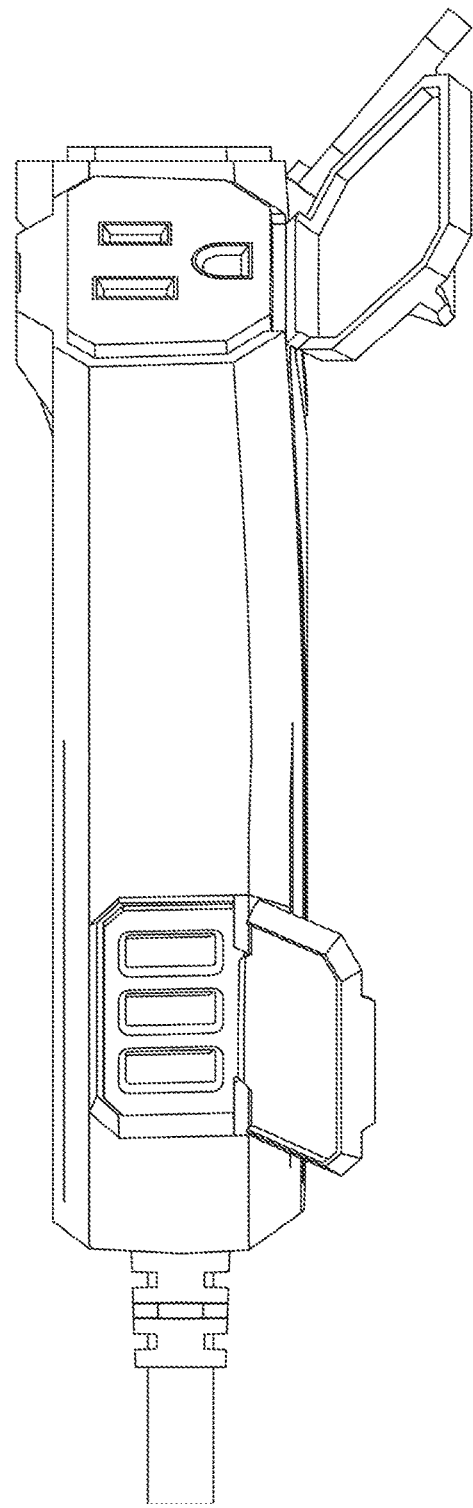
FIG. 59B is a side view of a second embodiment depicted with a gate and doors open.
Figure 60A:
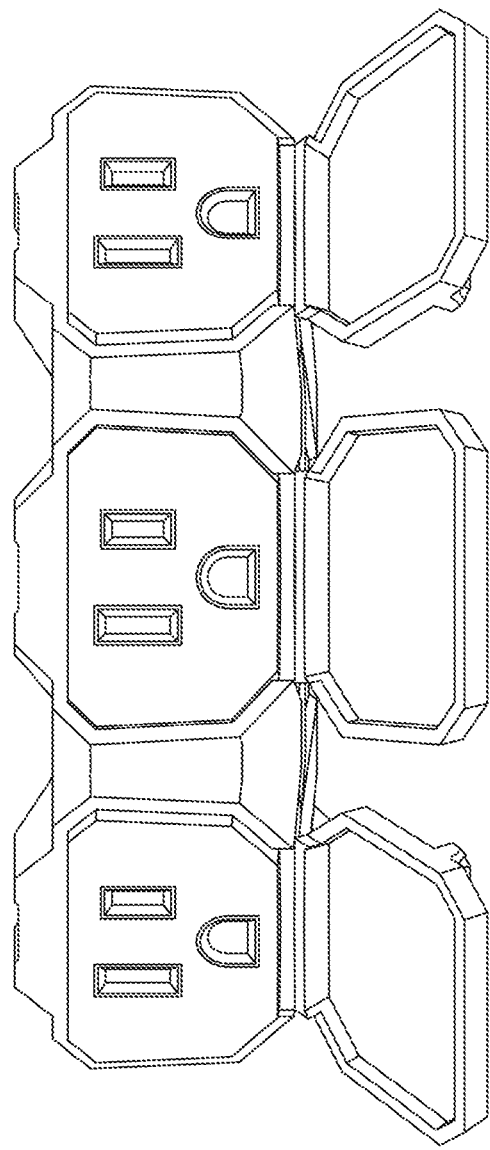
FIG. 60A is a front view of a second embodiment depicted with a gate and doors open.
Figure 60B:
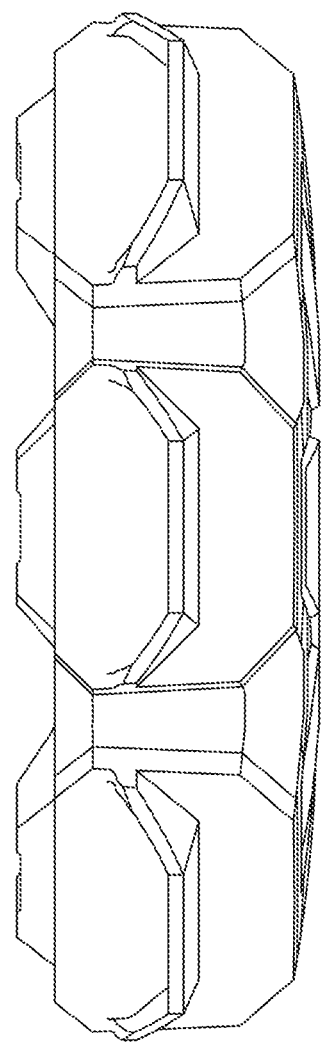
FIG. 60B is a front view of a second embodiment depicted with a gate and doors closed.
Figure 61A:
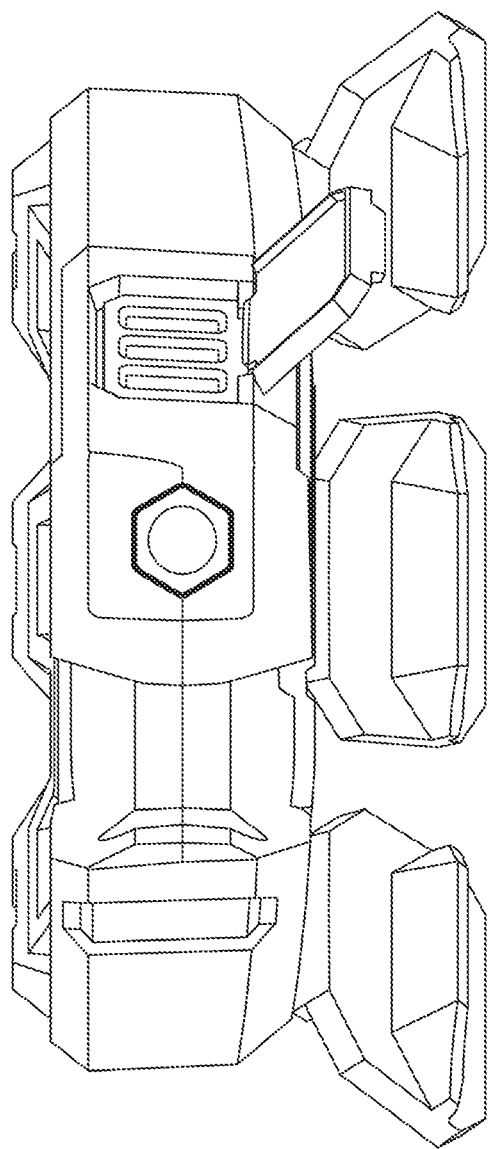
FIG. 61A is a back view of a second embodiment depicted with a gate and doors open.
Figure 61B:
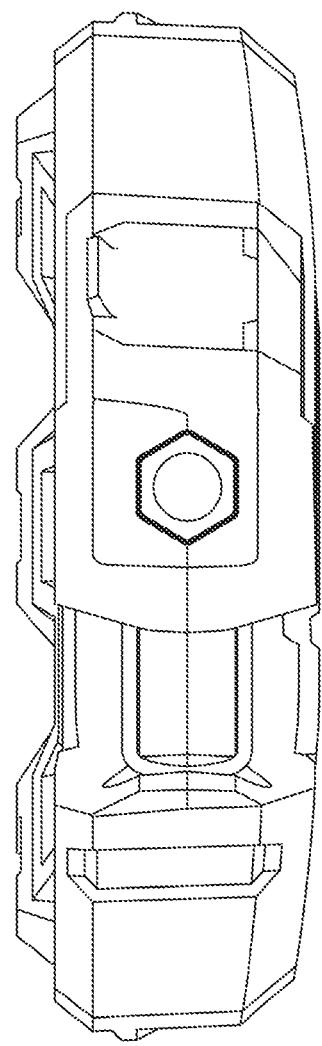
FIG. 61B is a back view of a second embodiment depicted with a gate and doors closed.
Figure 62:
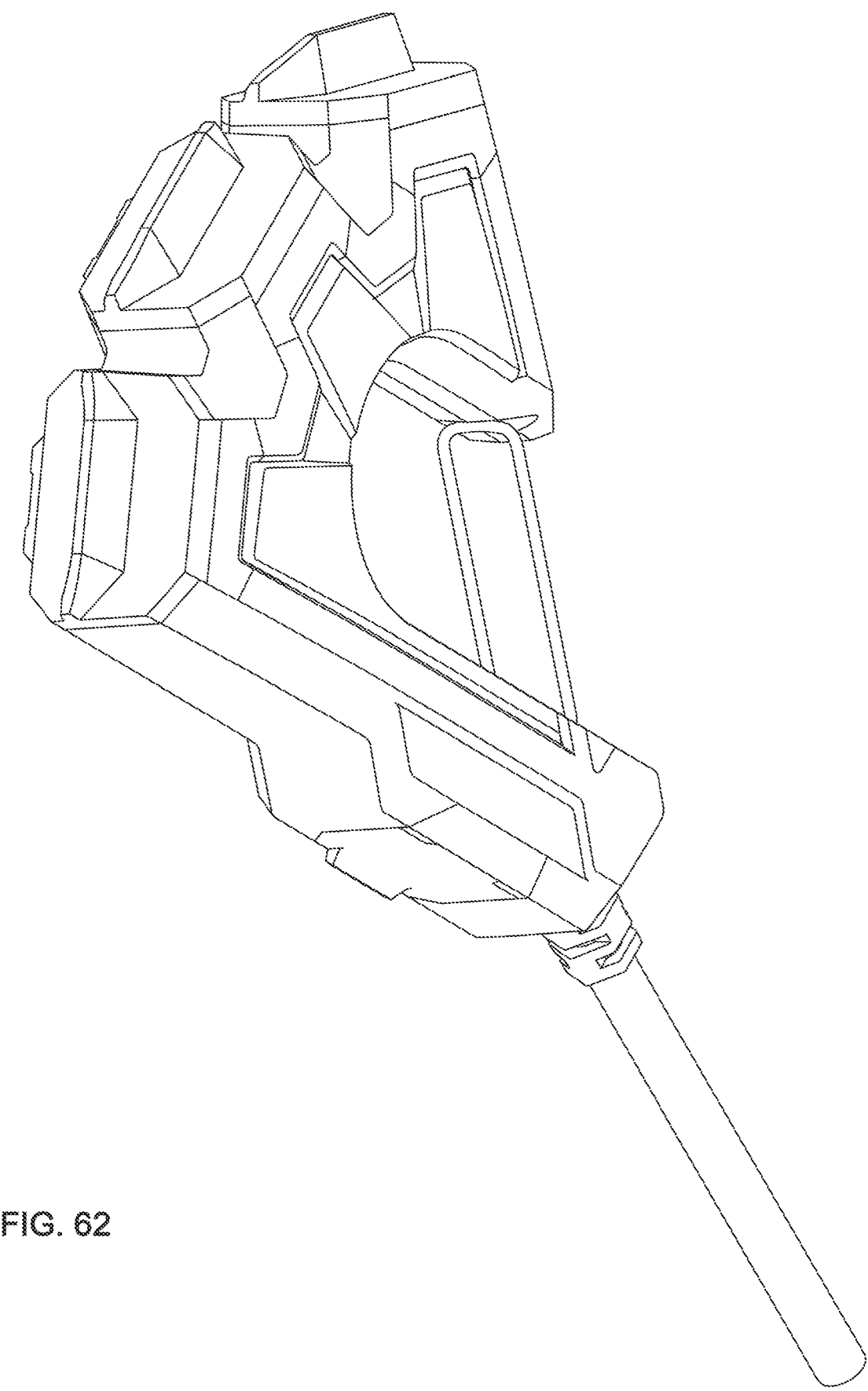
FIG. 62 is a perspective view of a second embodiment depicted with a gate and doors closed.
Figure 63:
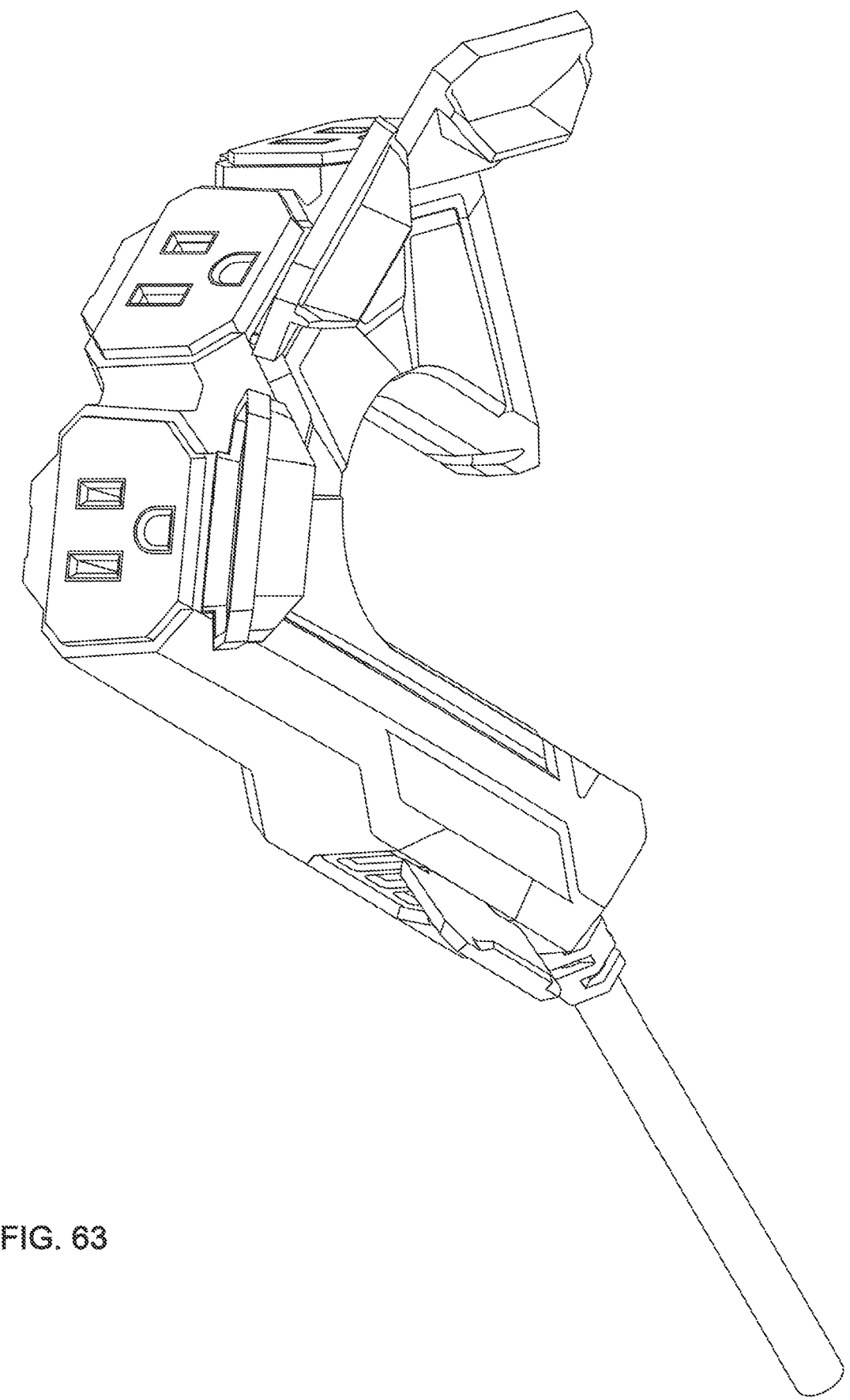
FIG. 63 is a perspective view of a second embodiment depicted with a gate and doors open.
Figure 64:
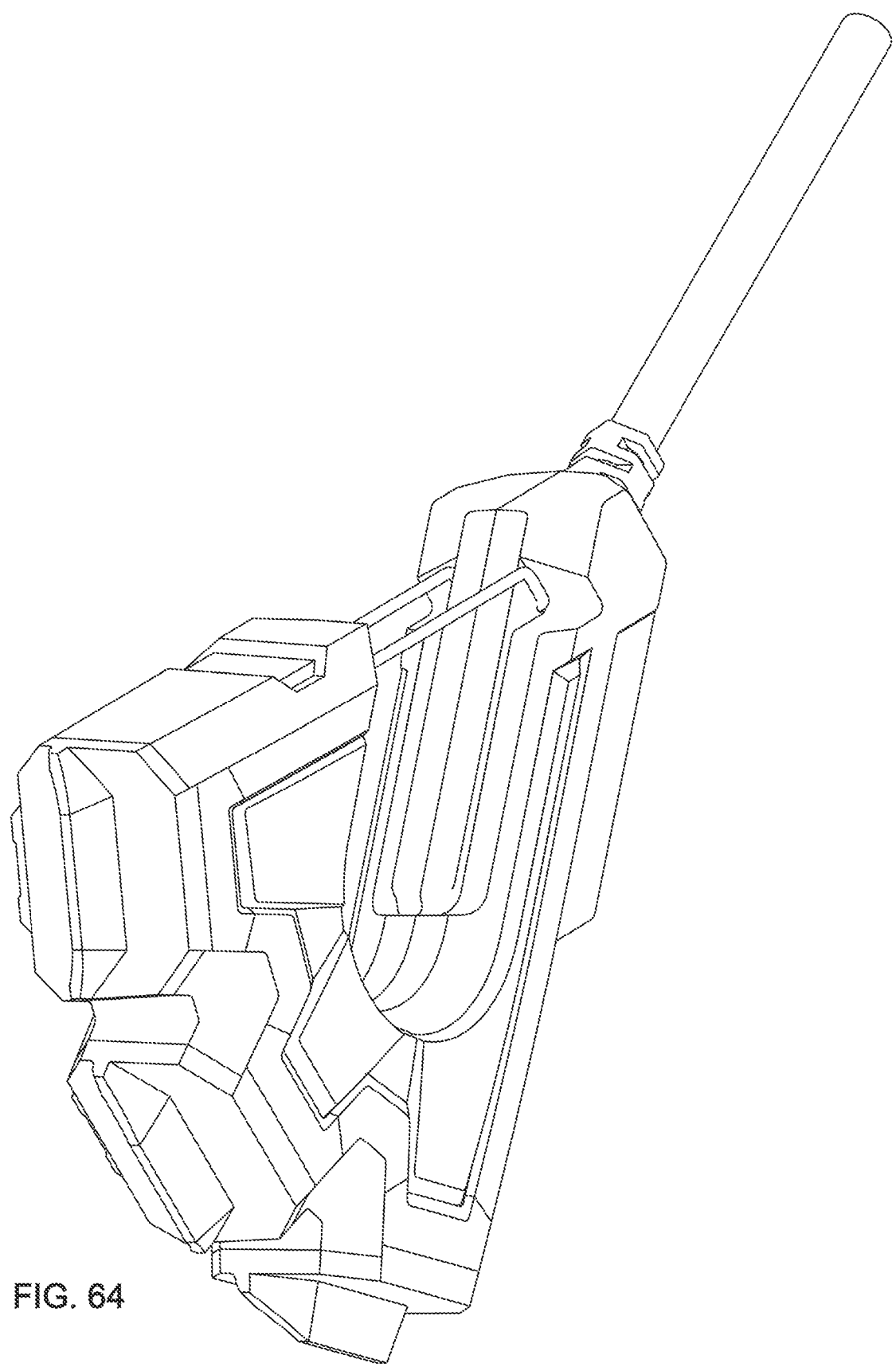
FIG. 64 is a perspective view of a second embodiment depicted with a gate and doors closed.
Figure 65:
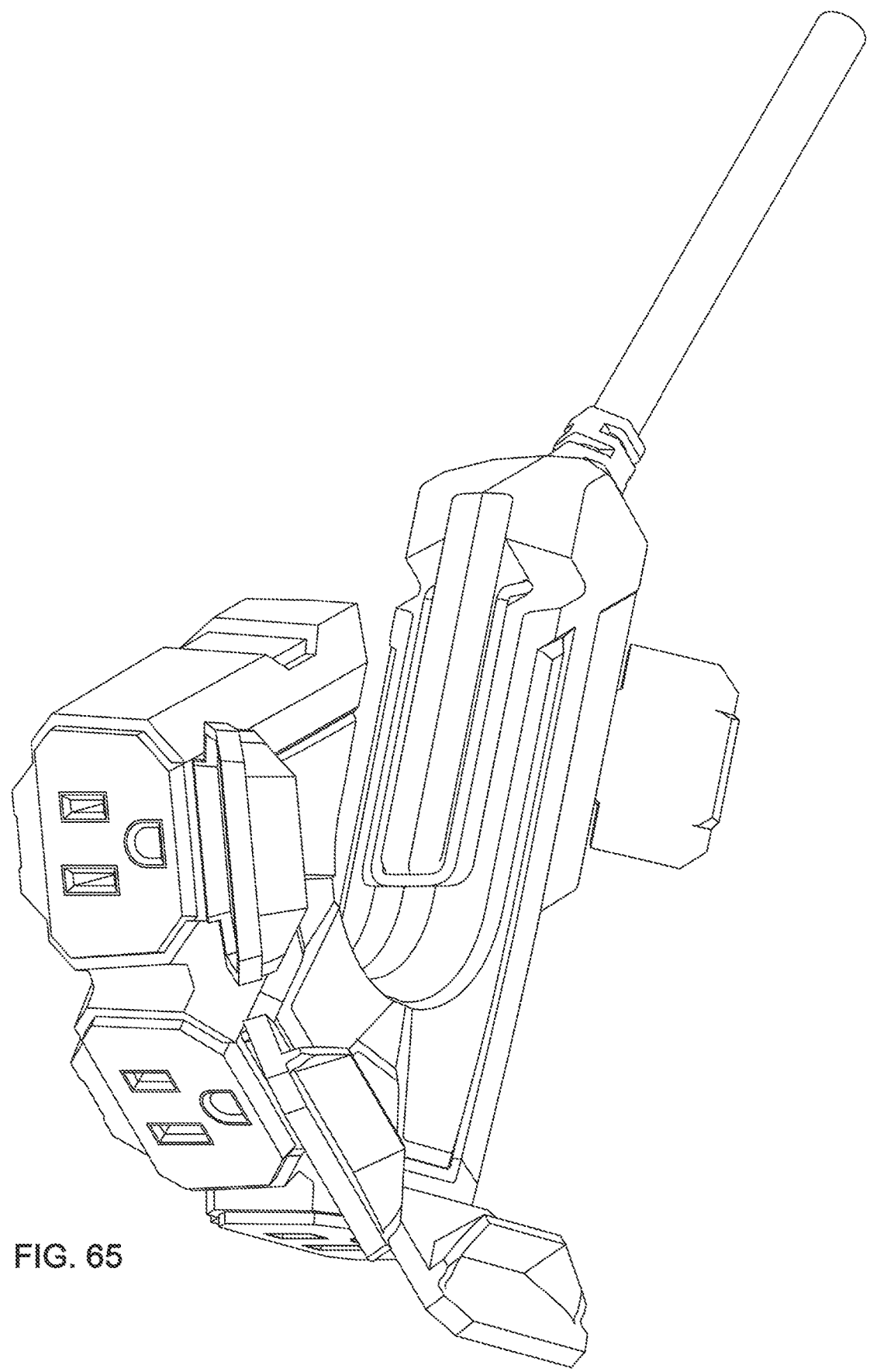
FIG. 65 is a perspective view of a second embodiment depicted with a gate and doors open.
Figure 66:
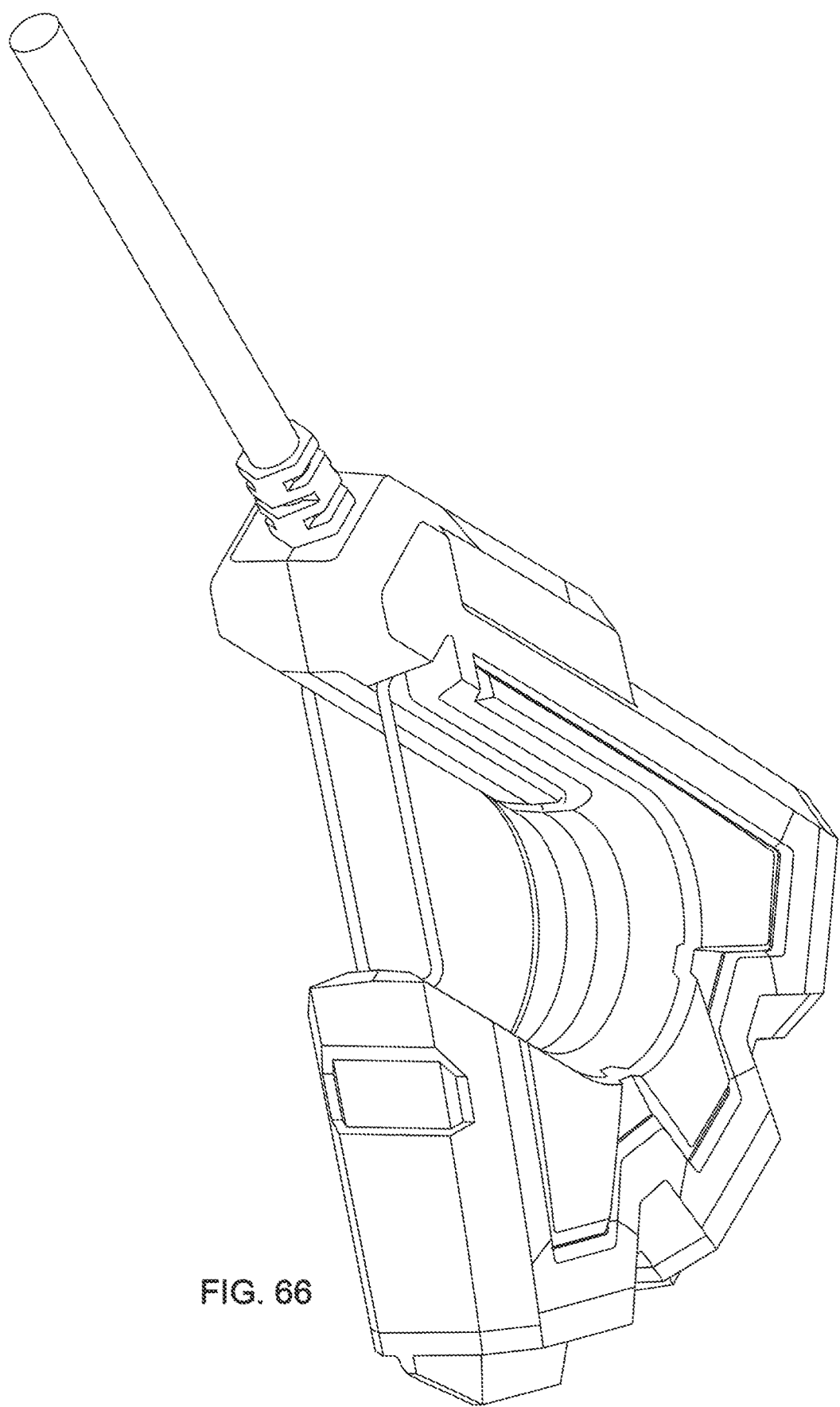
FIG. 66 is a perspective view of a second embodiment depicted with a gate and doors closed.
Figure 67:
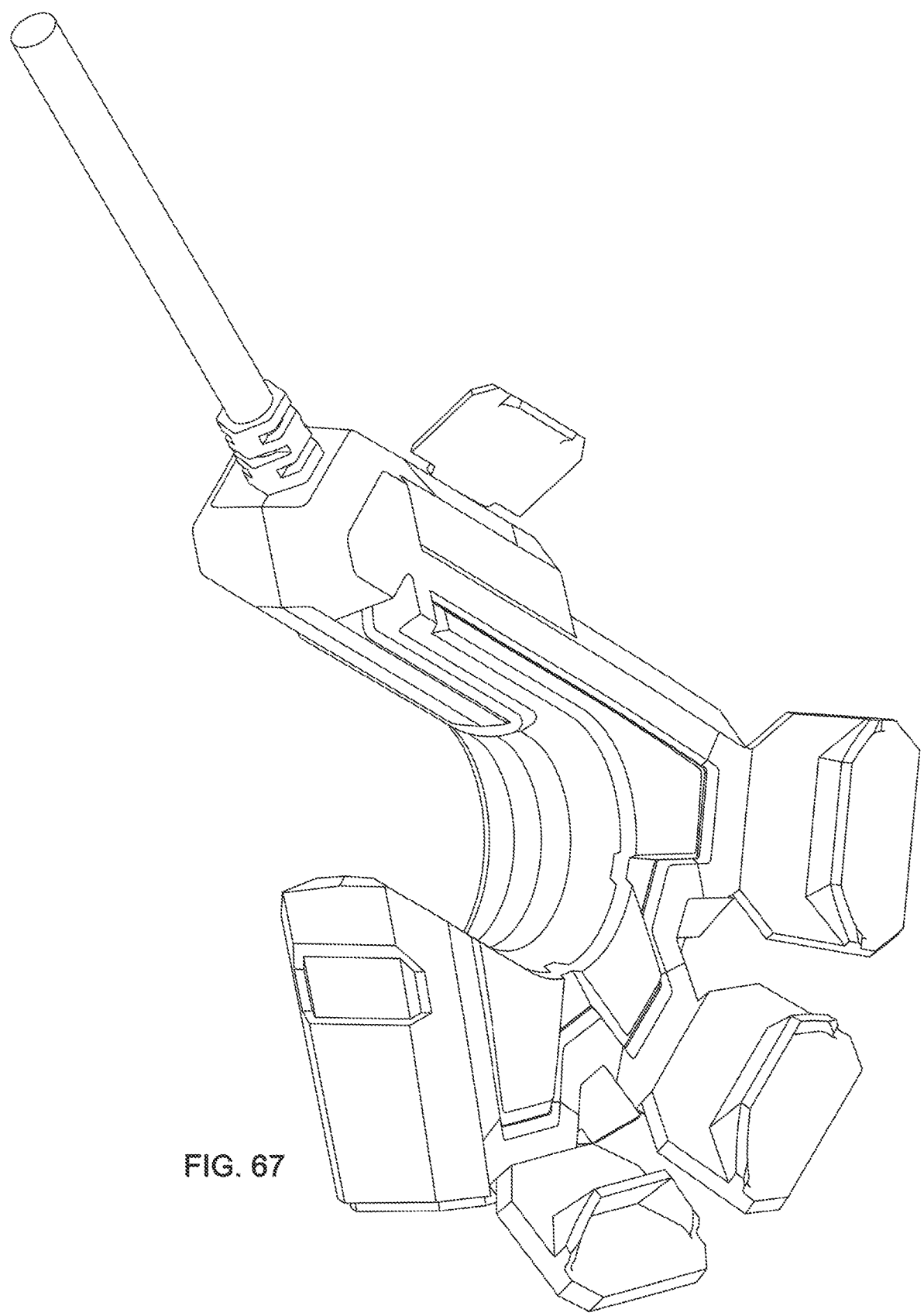
FIG. 67 is a perspective view of a second embodiment depicted with a gate and doors open.
Figure 68:
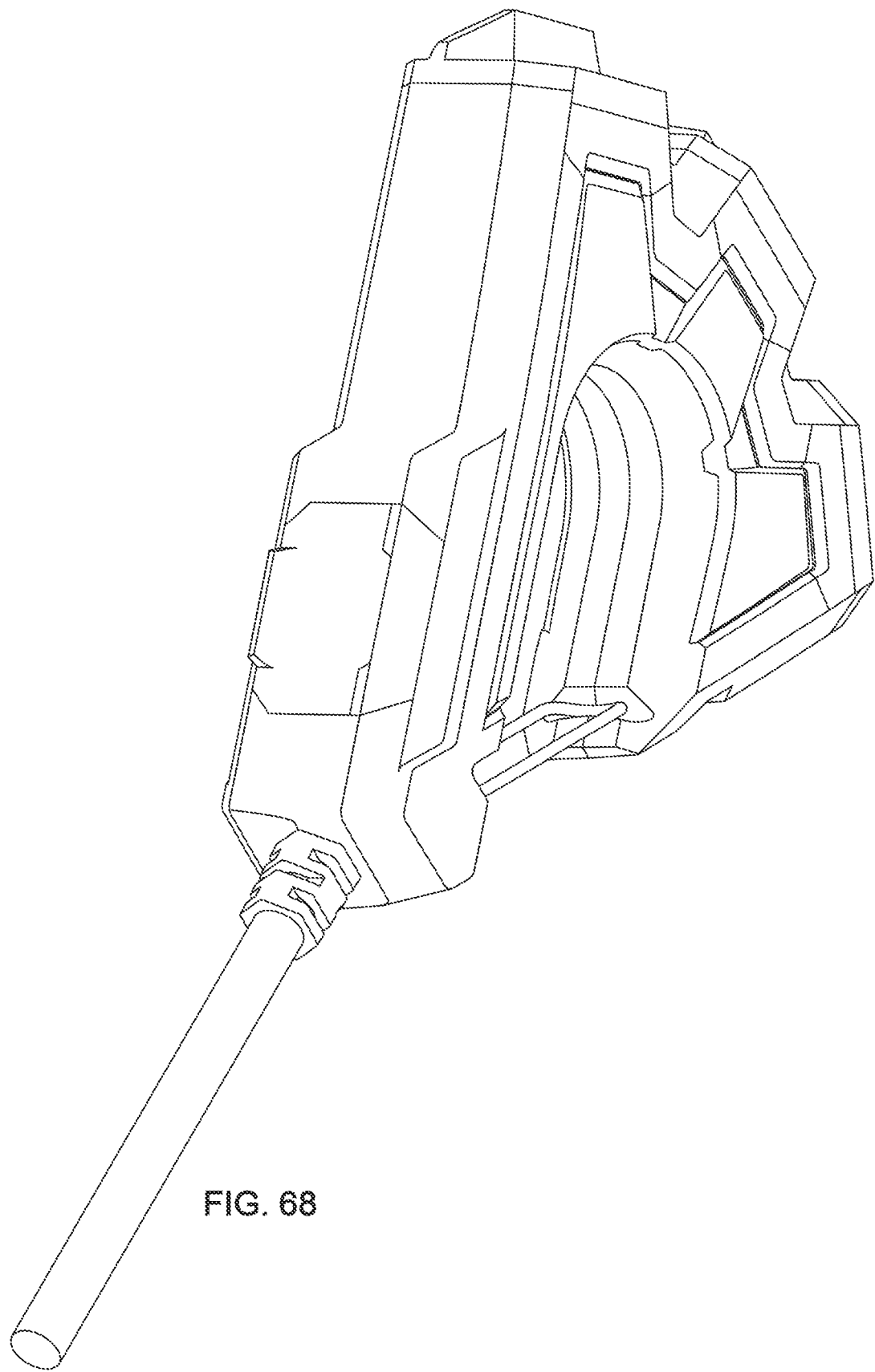
FIG. 68 is a perspective view of a second embodiment depicted with a gate and doors closed.
Figure 69:
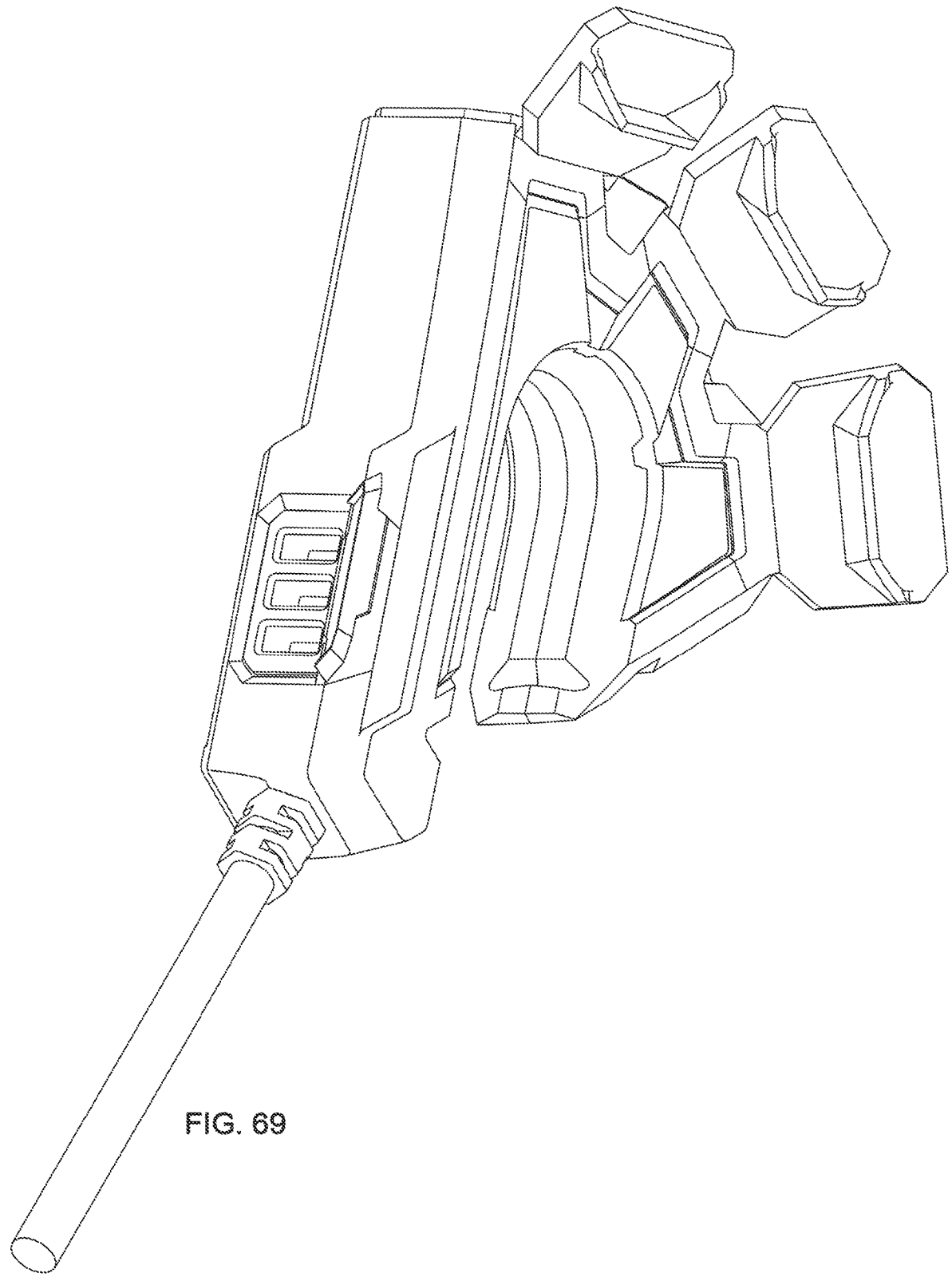
FIG. 69 is a perspective view of a second embodiment depicted with a gate and doors open.
Figure 70:
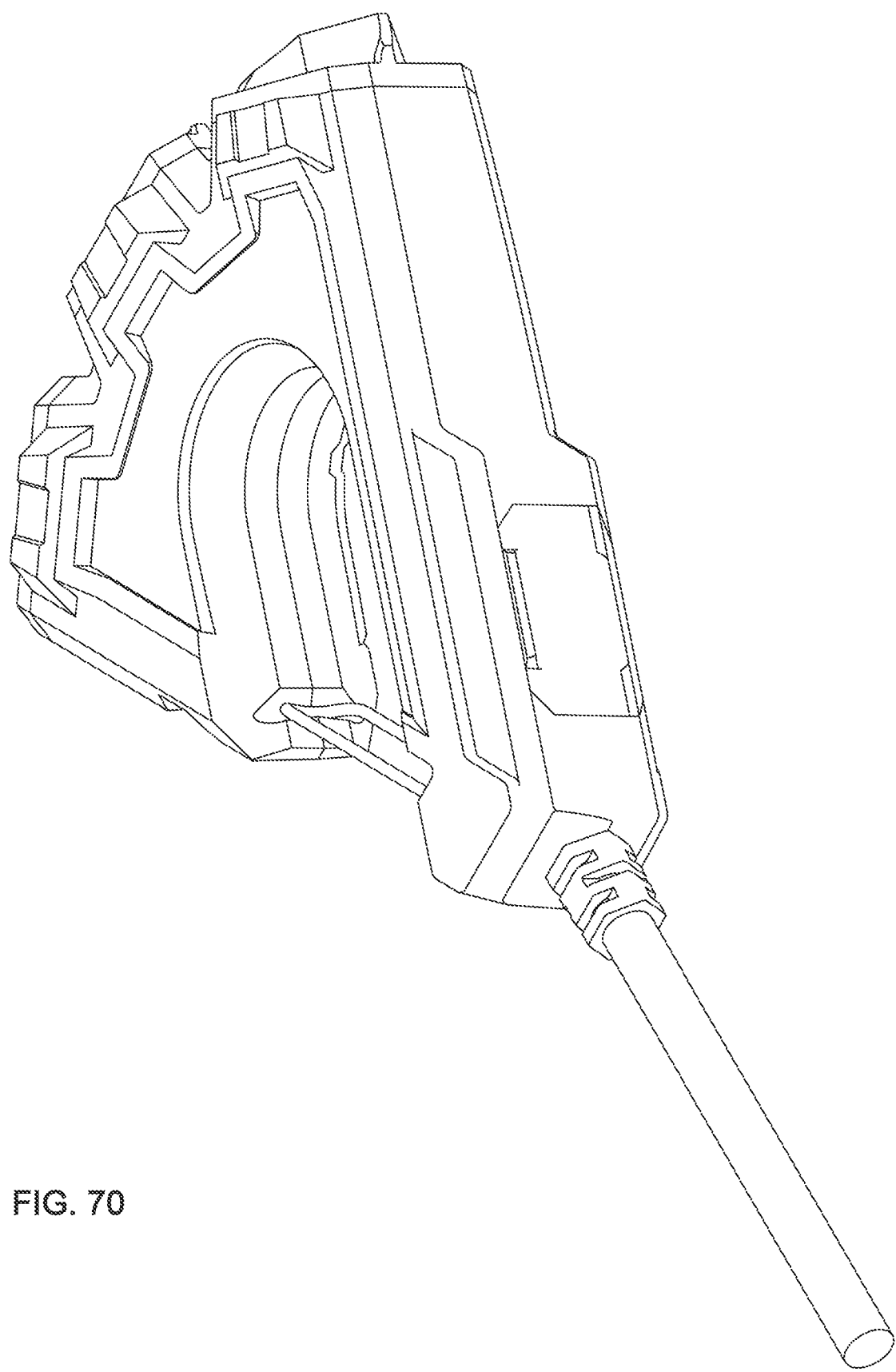
FIG. 70 is a perspective view of a second embodiment depicted with a gate and doors closed.
Figure 71:
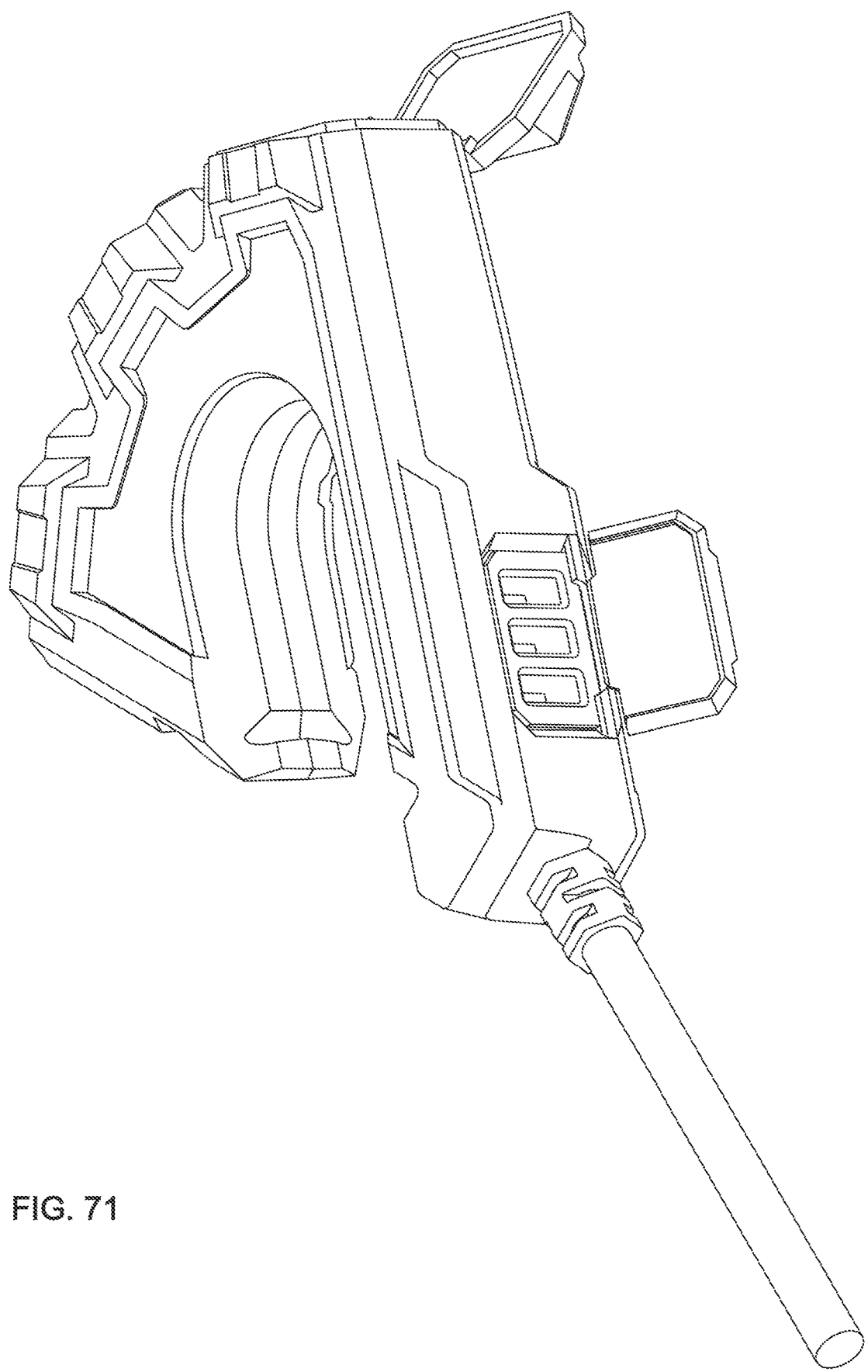
FIG. 71 is a perspective view of a second embodiment depicted with a gate and doors open.
Figure 72:
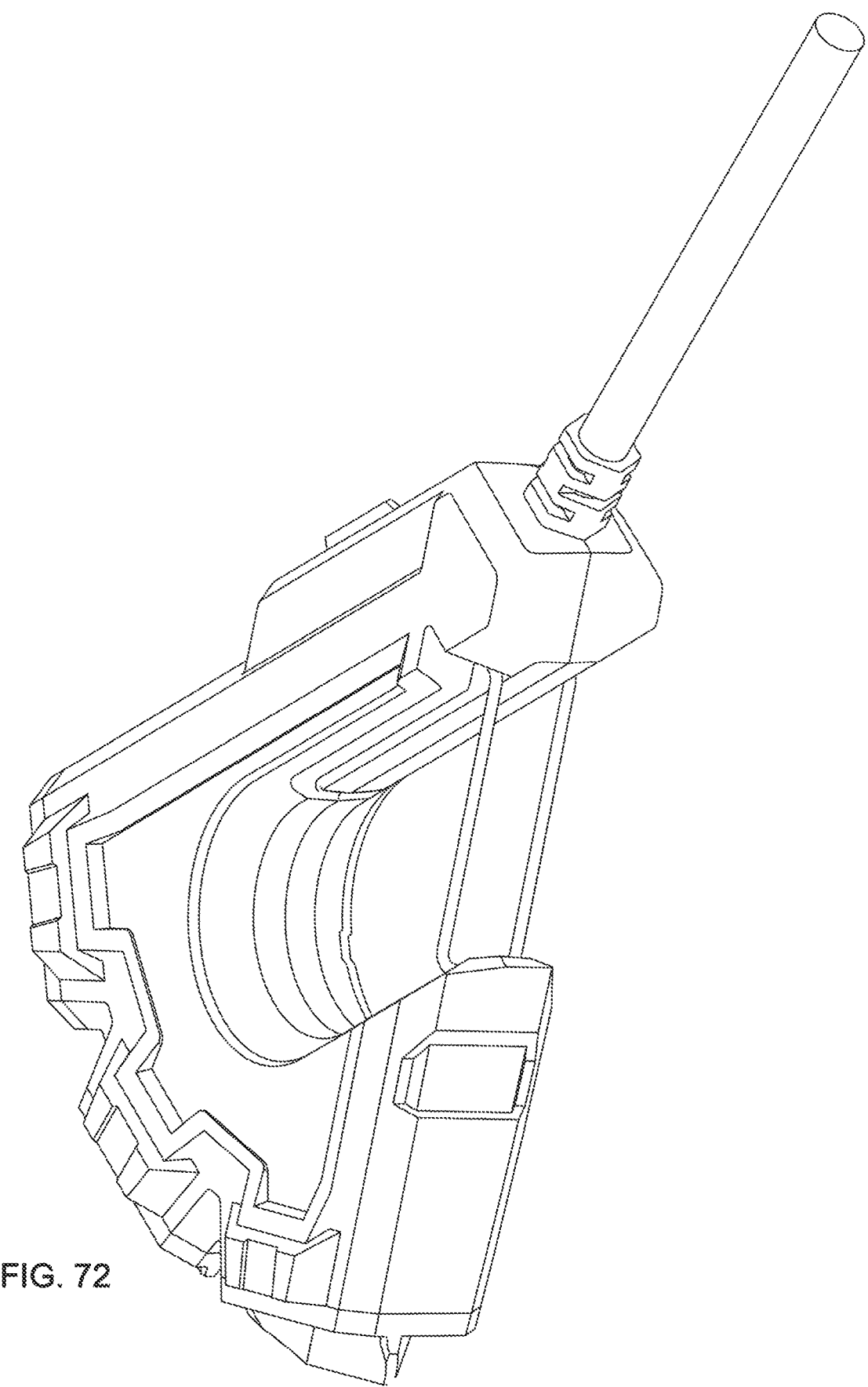
FIG. 72 is a perspective view of a second embodiment depicted with a gate and doors closed.
Figure 73:
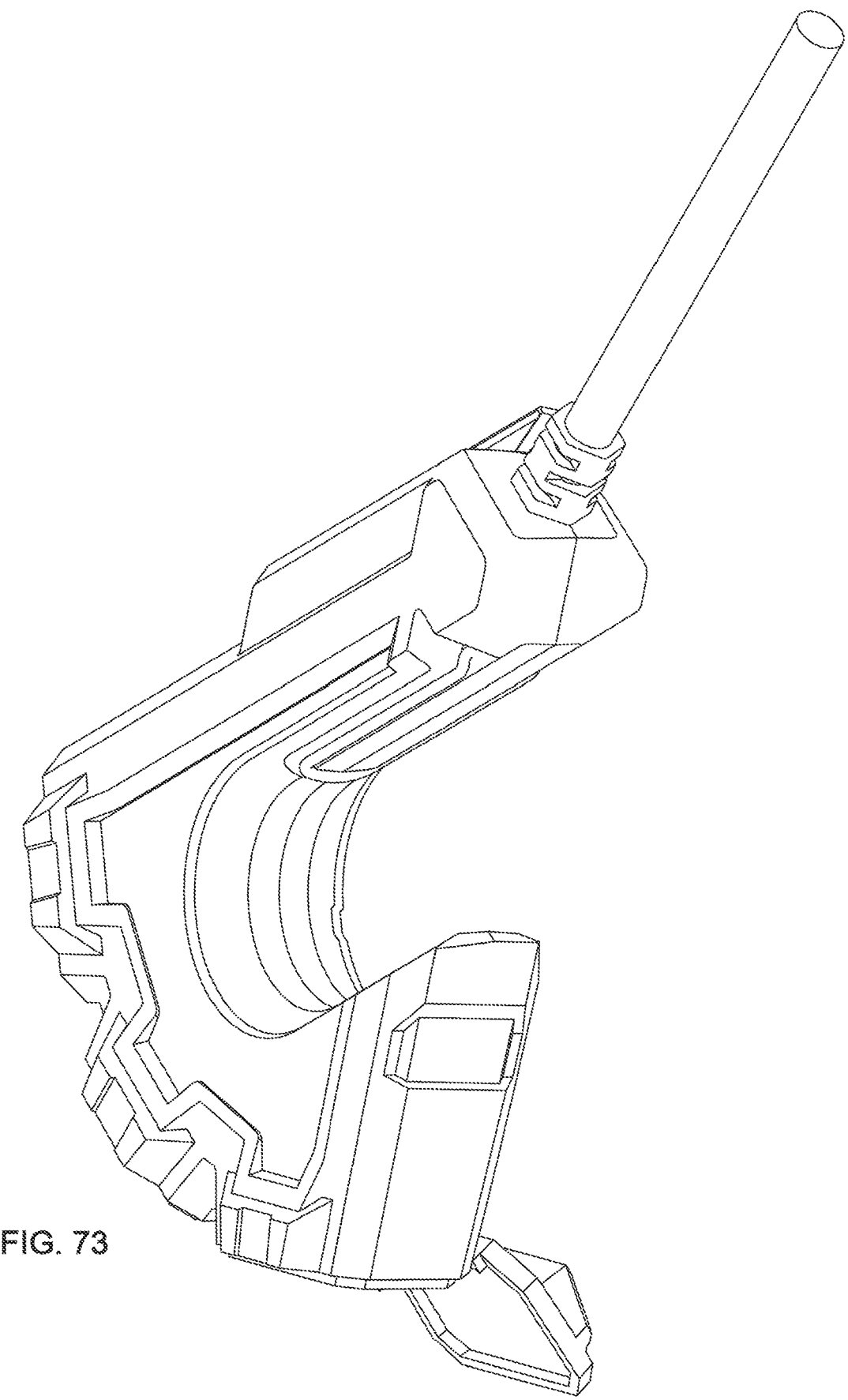
FIG. 73 is a perspective view of a second embodiment depicted with a gate and doors open.
Figure 74:
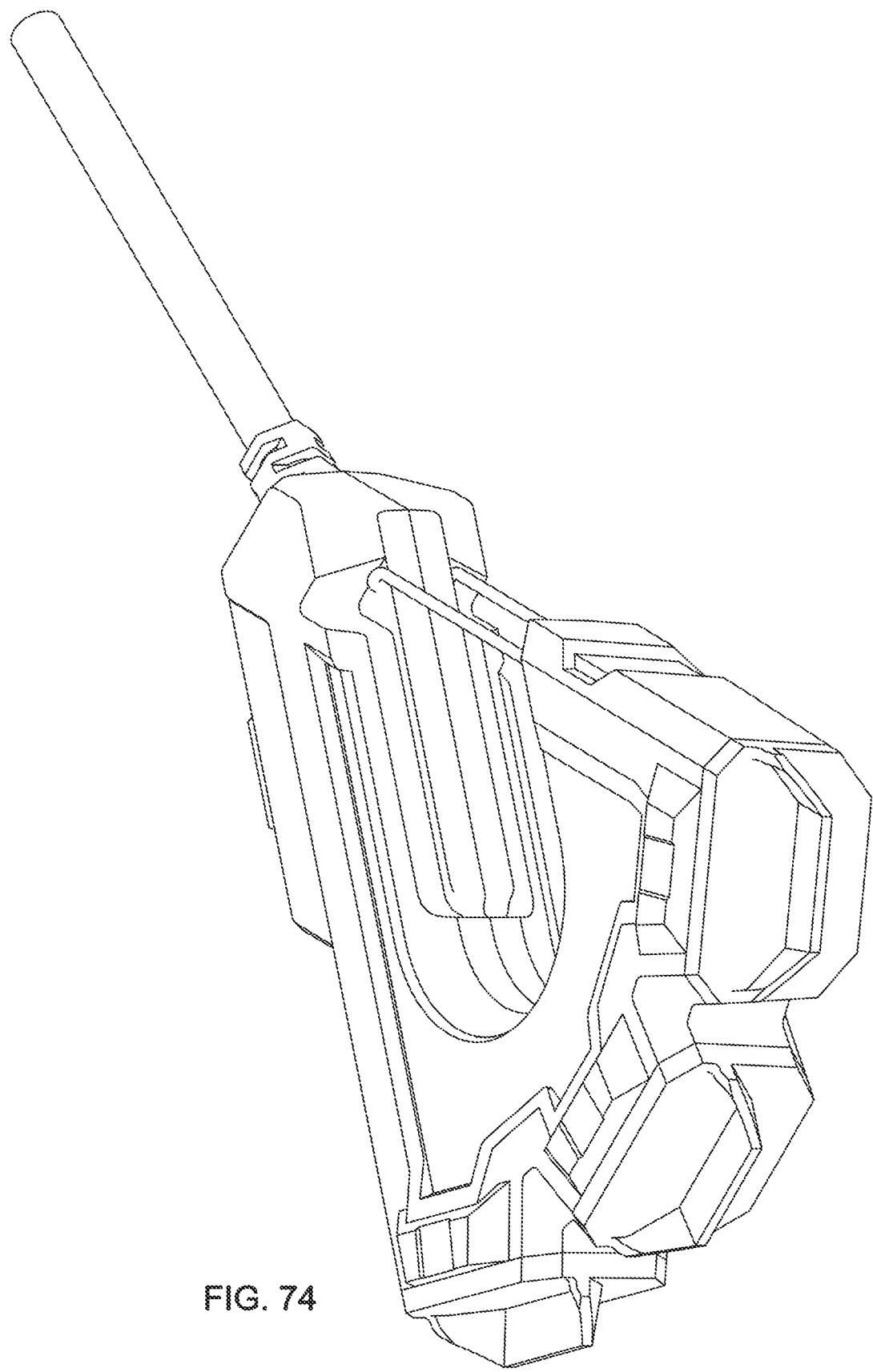
FIG. 74 is a perspective view of a second embodiment depicted with a gate and doors closed.
Figure 75:
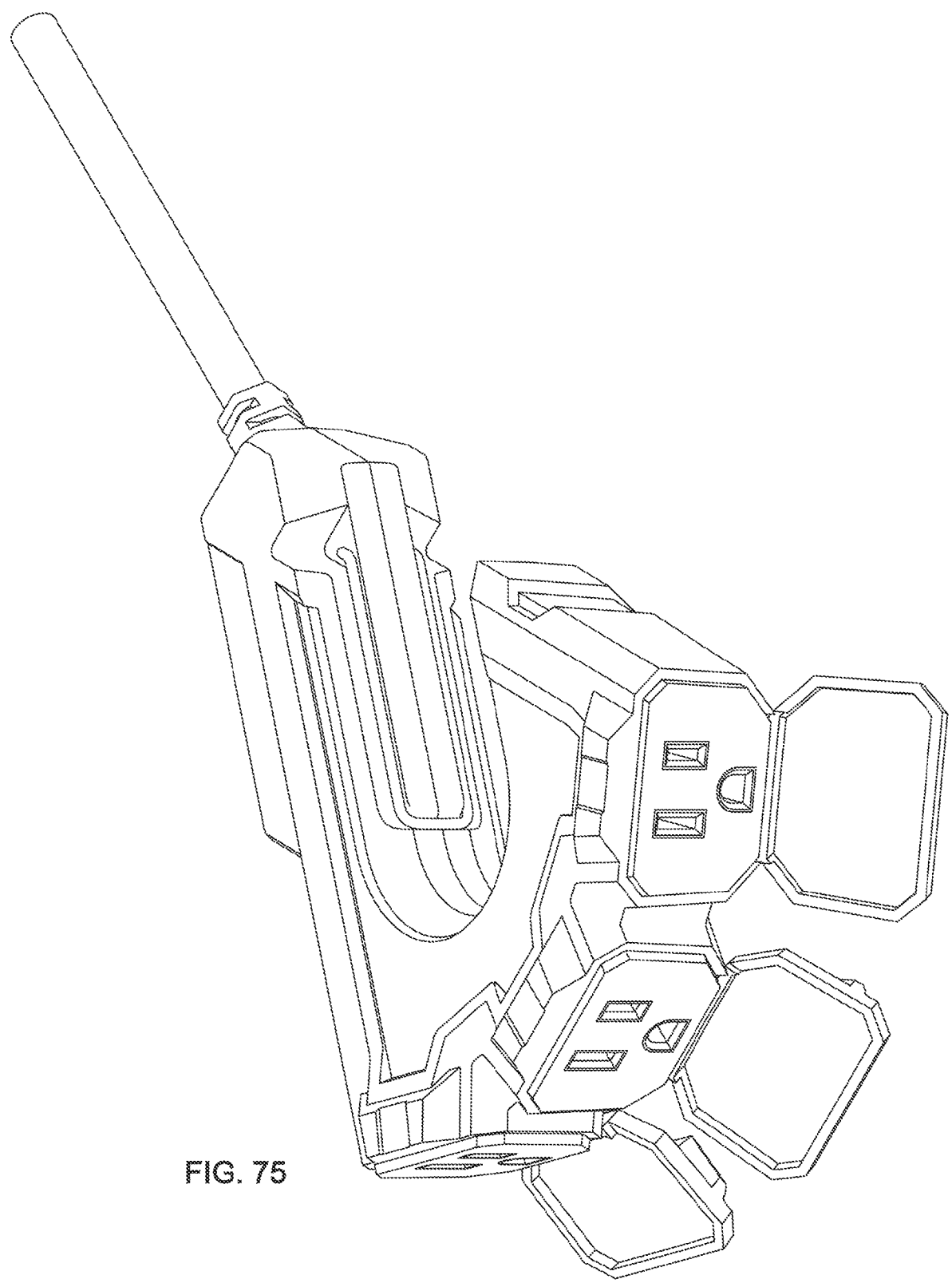
FIG. 75 is a perspective view of a second embodiment depicted with a gate and doors open.
Figure 76:
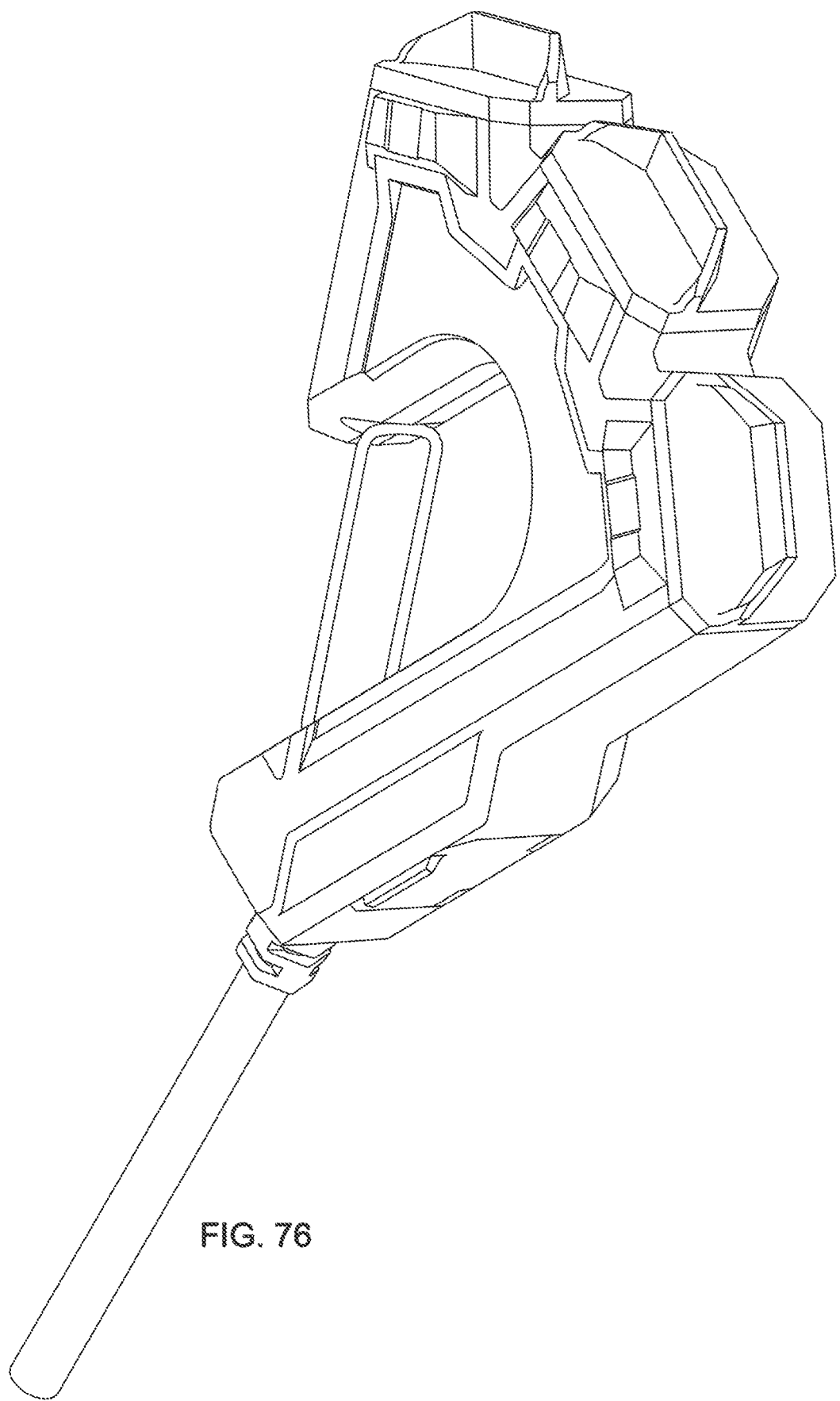
FIG. 76 is a perspective view of a second embodiment depicted with a gate and doors closed.
Figure 77:
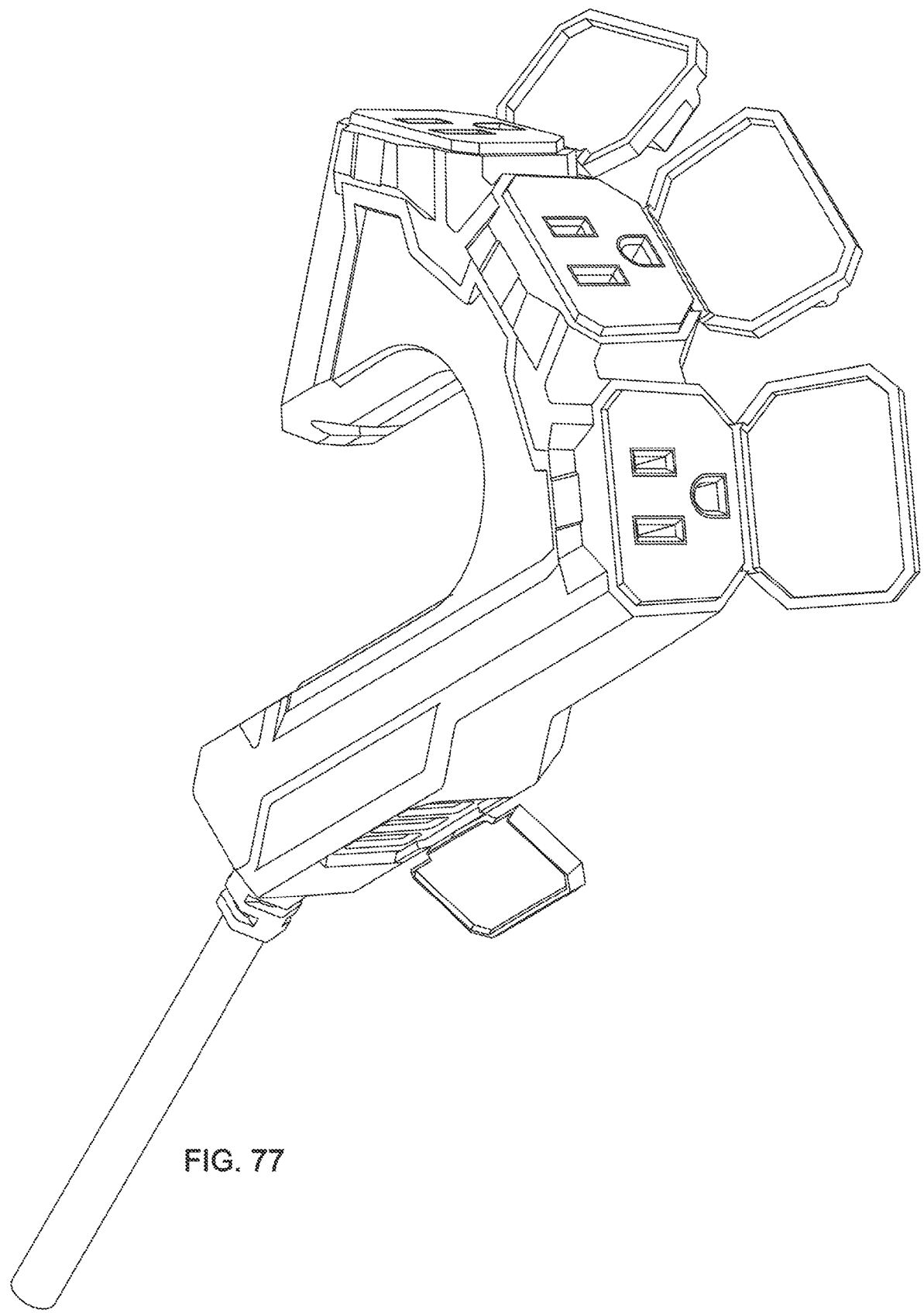
FIG. 77 is a perspective view of a second embodiment depicted with a gate and doors open.
Figure 78:
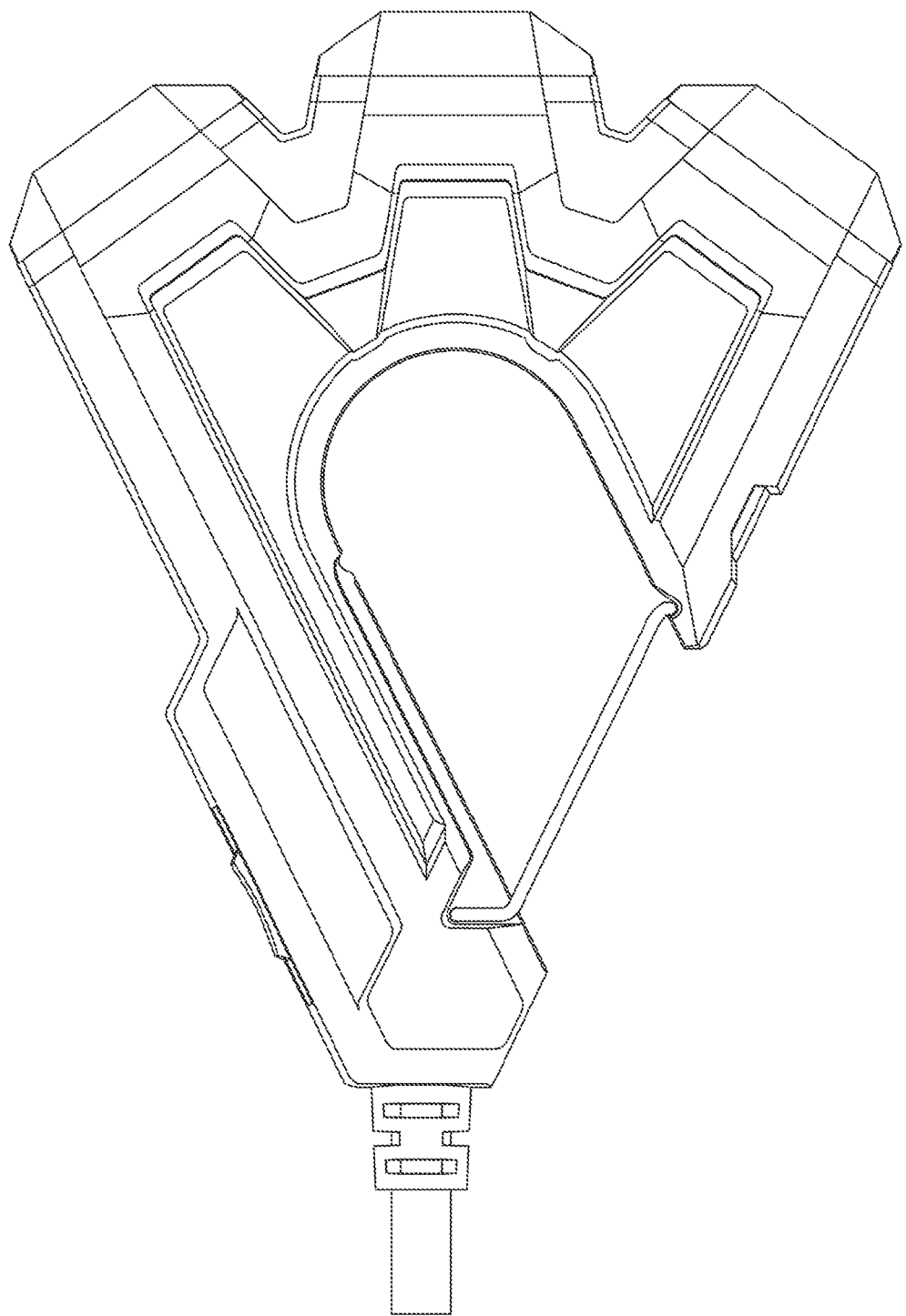
FIG. 78 is a top view of a third embodiment depicted with a gate and doors closed.
Figure 79:
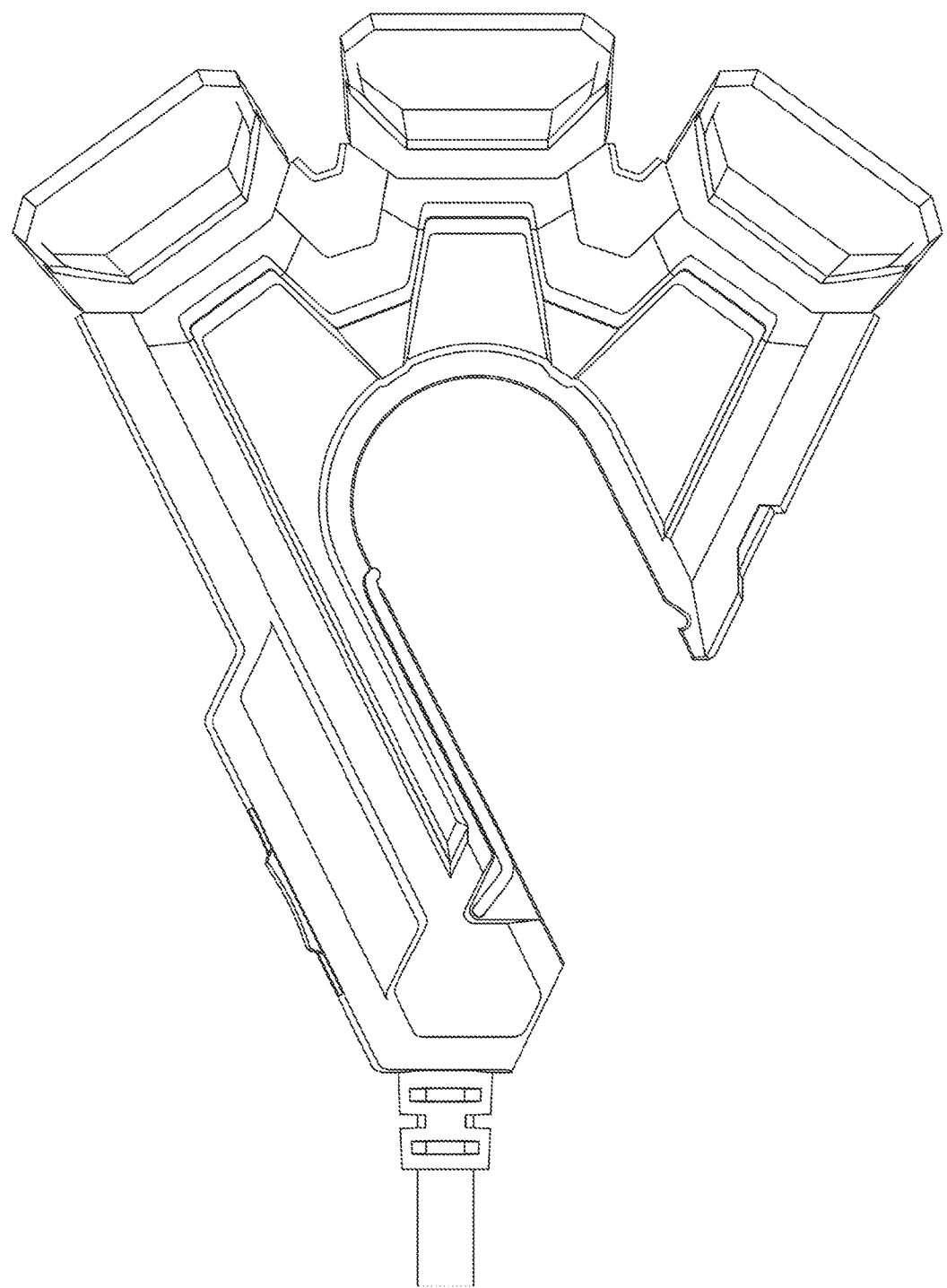
FIG. 79 is a top view of a third embodiment depicted with a gate and doors open.
Figure 81:
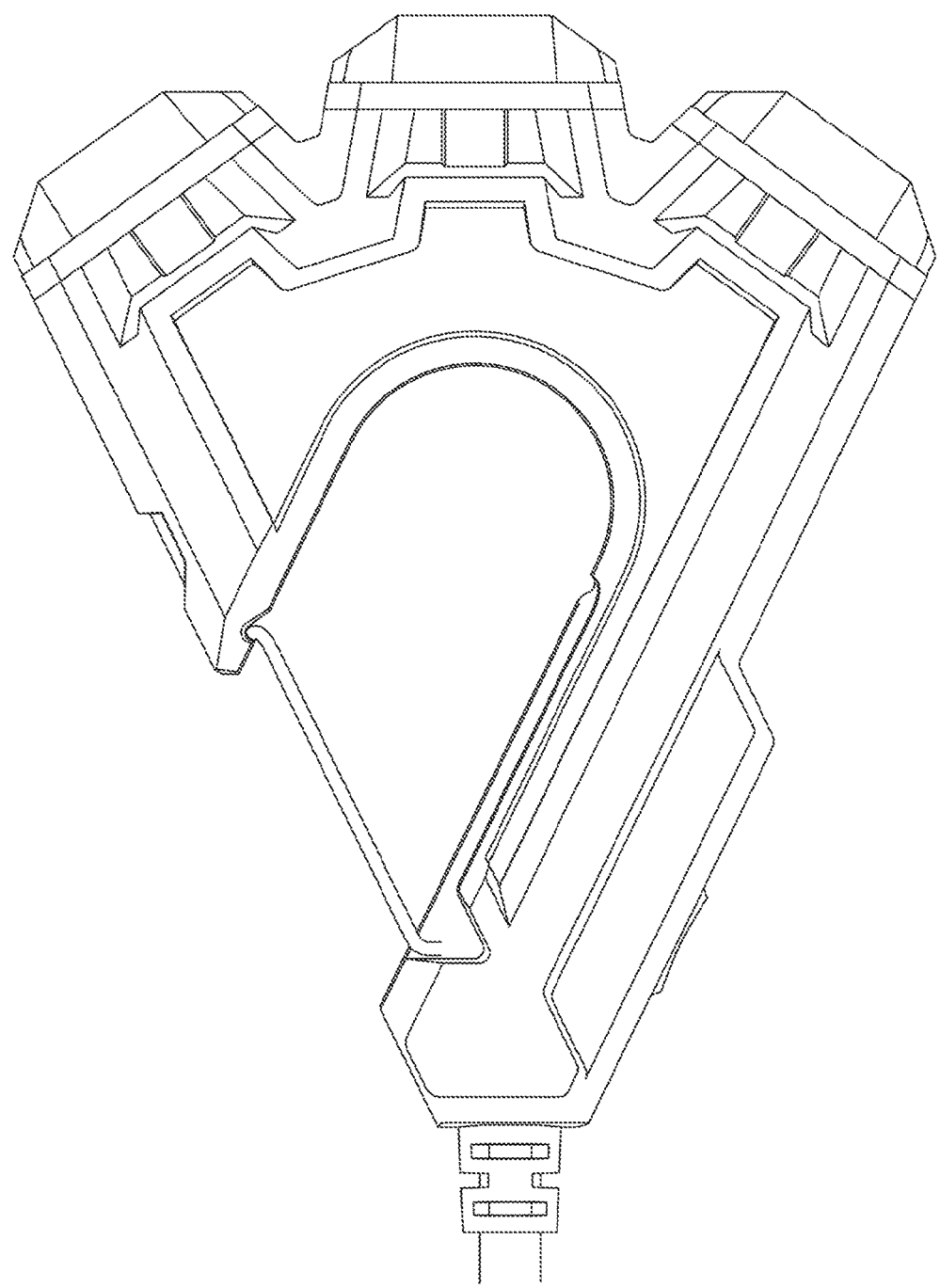
FIG. 81 is a bottom view of a third embodiment depicted with a gate and doors closed.
Figure 82:
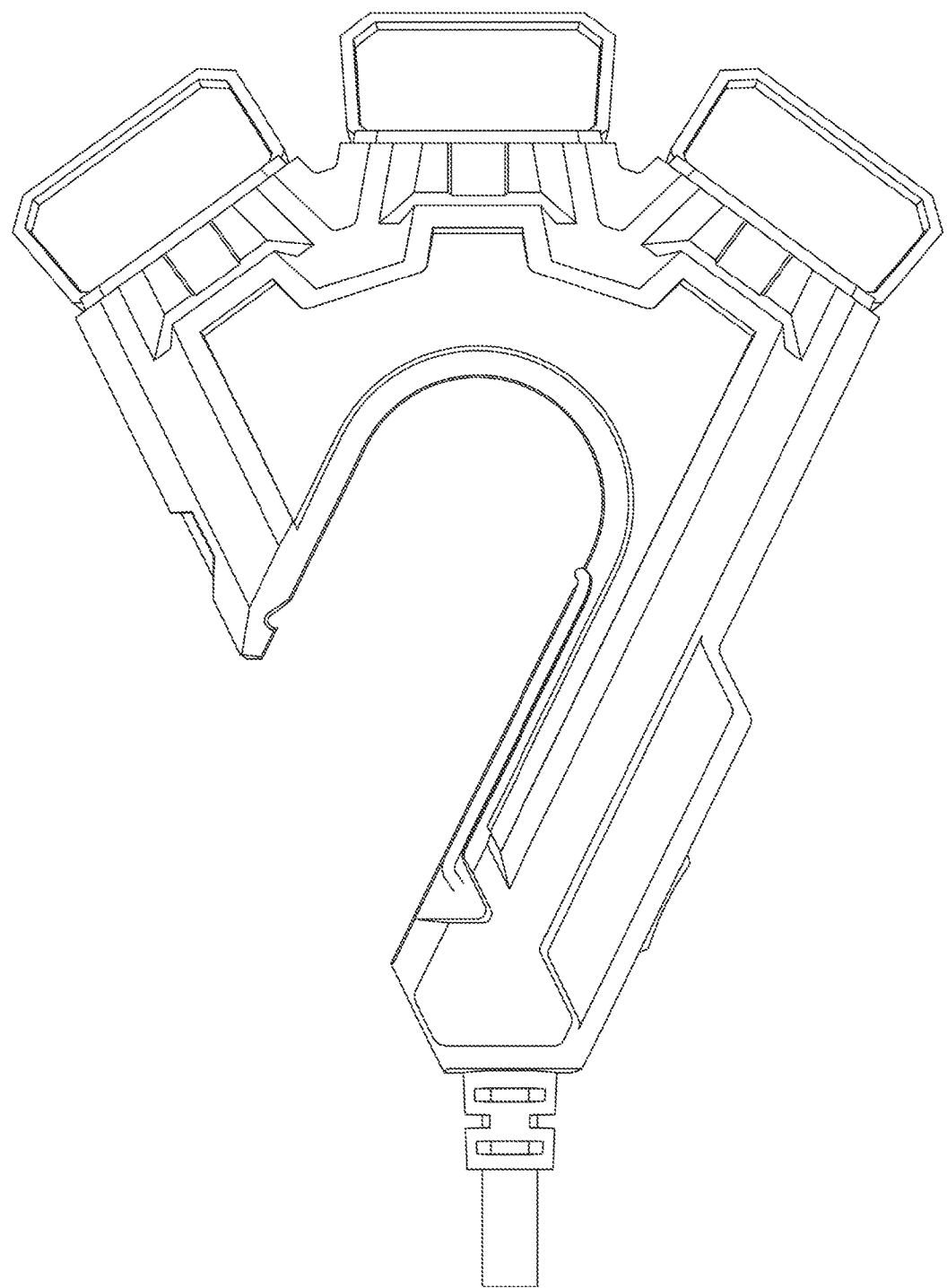
FIG. 82 is a bottom view of a third embodiment depicted with a gate and doors open.
Figure 83A:
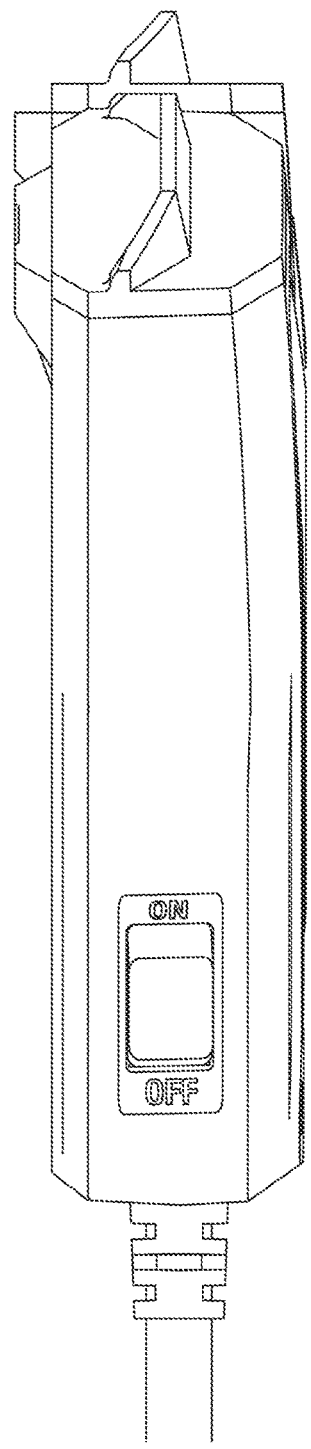
FIG. 83A is a side view of a third embodiment depicted with a gate and doors closed.
Figure 83B:
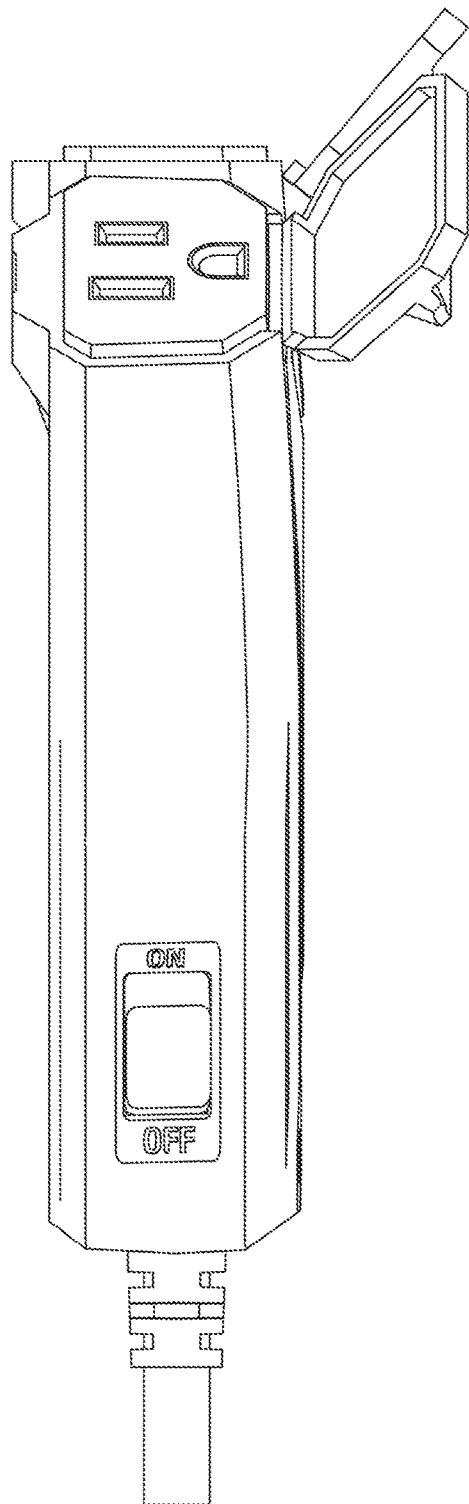
FIG. 83B is a side view of a third embodiment depicted with a gate and doors open.
Figure 85A:
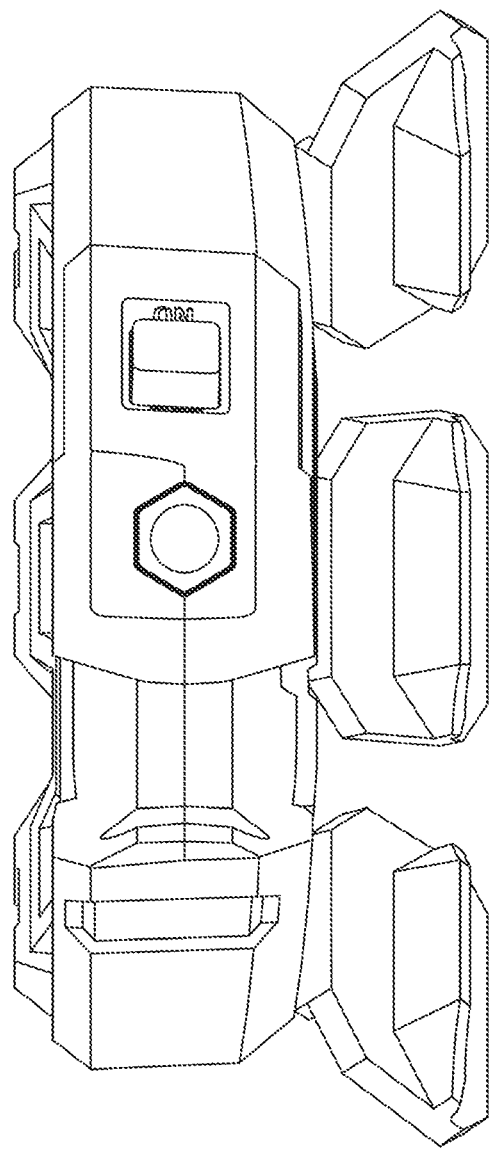
FIG. 85A is a back view of a third embodiment depicted with a gate and doors open.
Figure 85B:
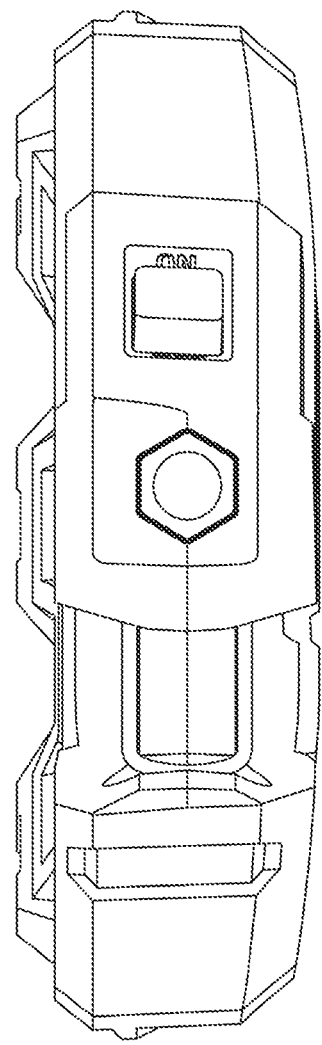
FIG. 85B is a back view of a third embodiment depicted with a gate and doors closed.
Figure 86:
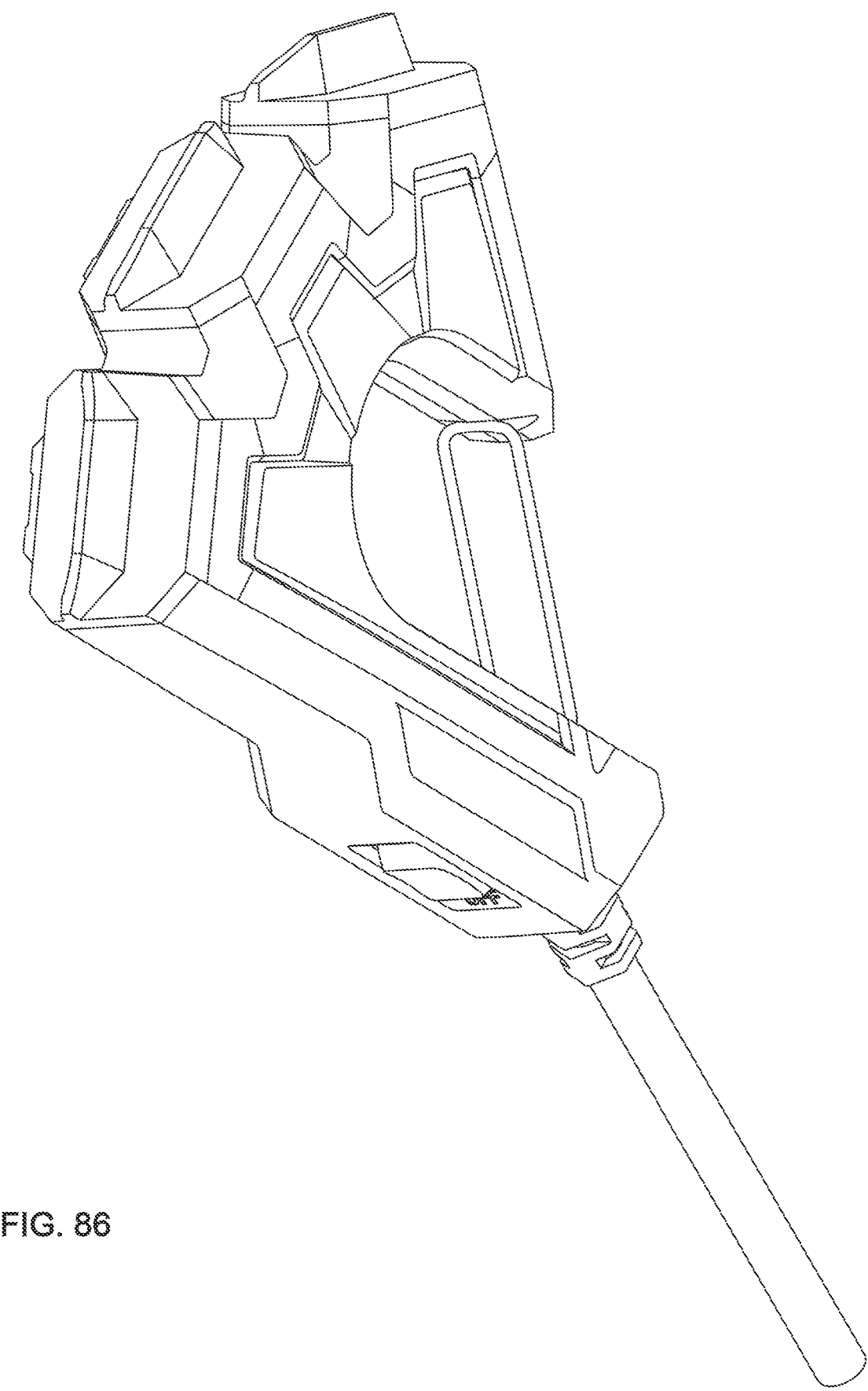
FIG. 86 is a perspective view of a third embodiment depicted with a gate and doors closed.
Figure 87:
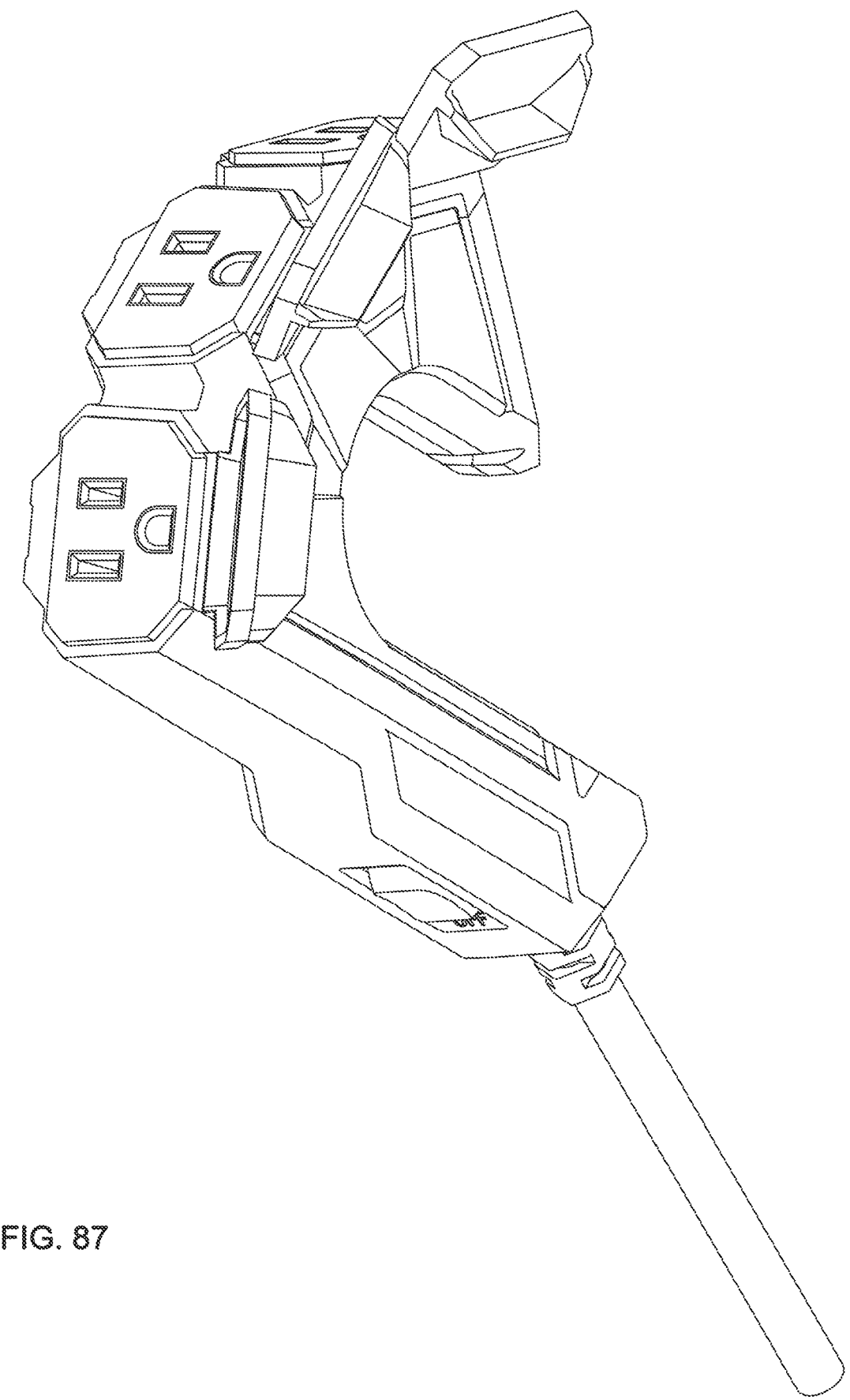
FIG. 87 is a perspective view of a third embodiment depicted with a gate and doors open.
Figure 88:
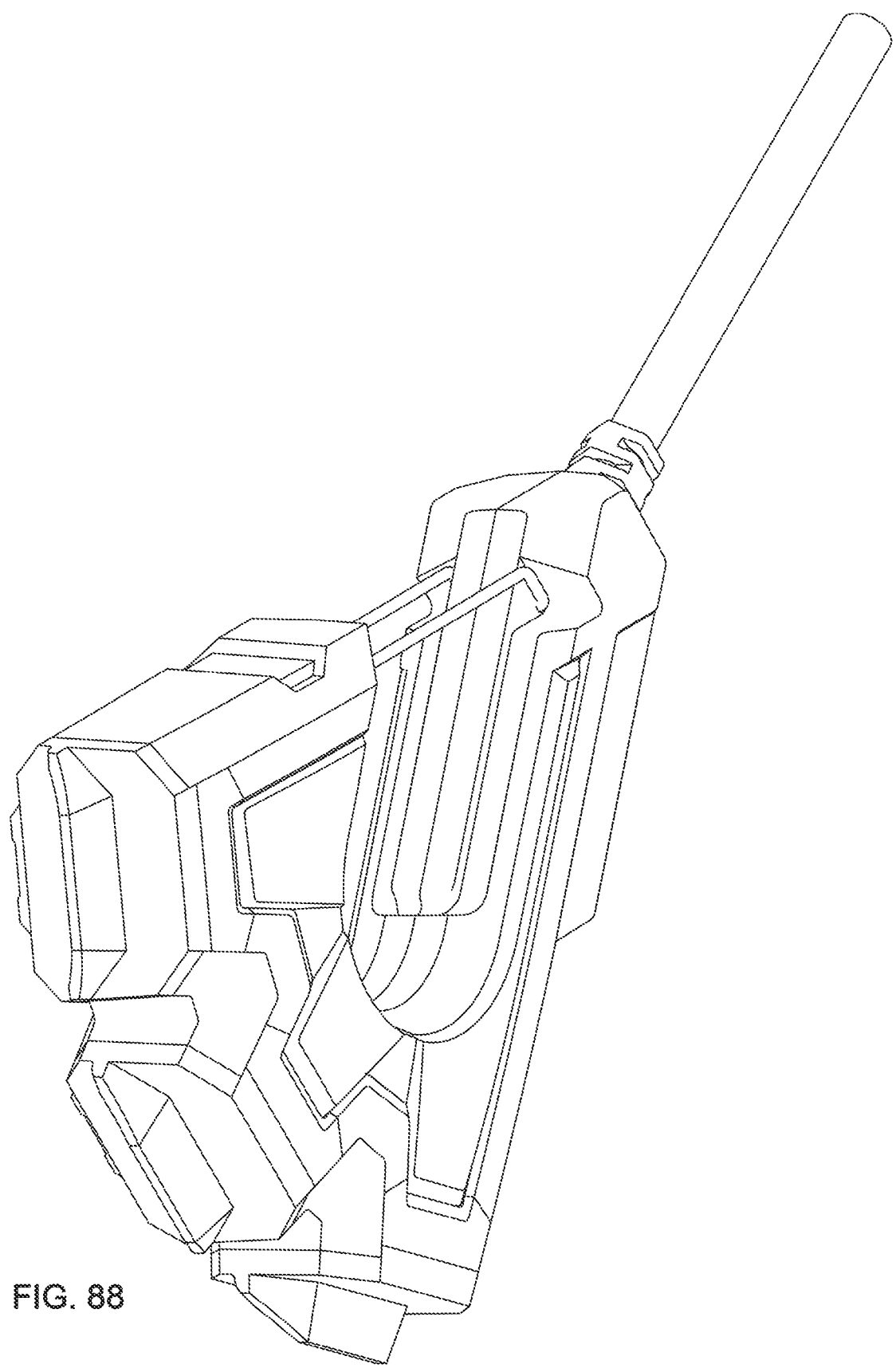
FIG. 88 is a perspective view of a third embodiment depicted with a gate and doors closed.
Figure 89:
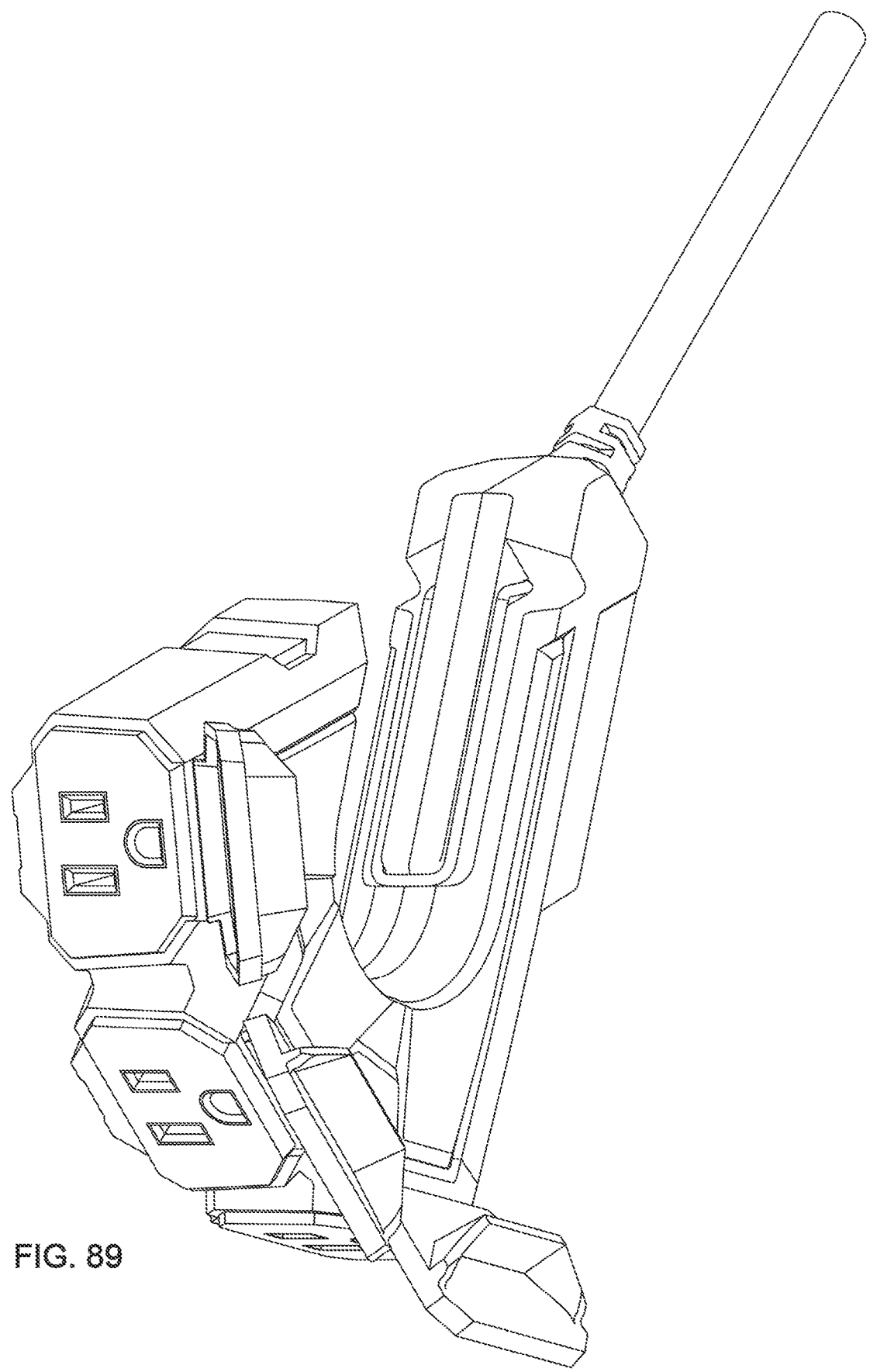
FIG. 89 is a perspective view of a third embodiment depicted with a gate and doors open.
Figure 90:
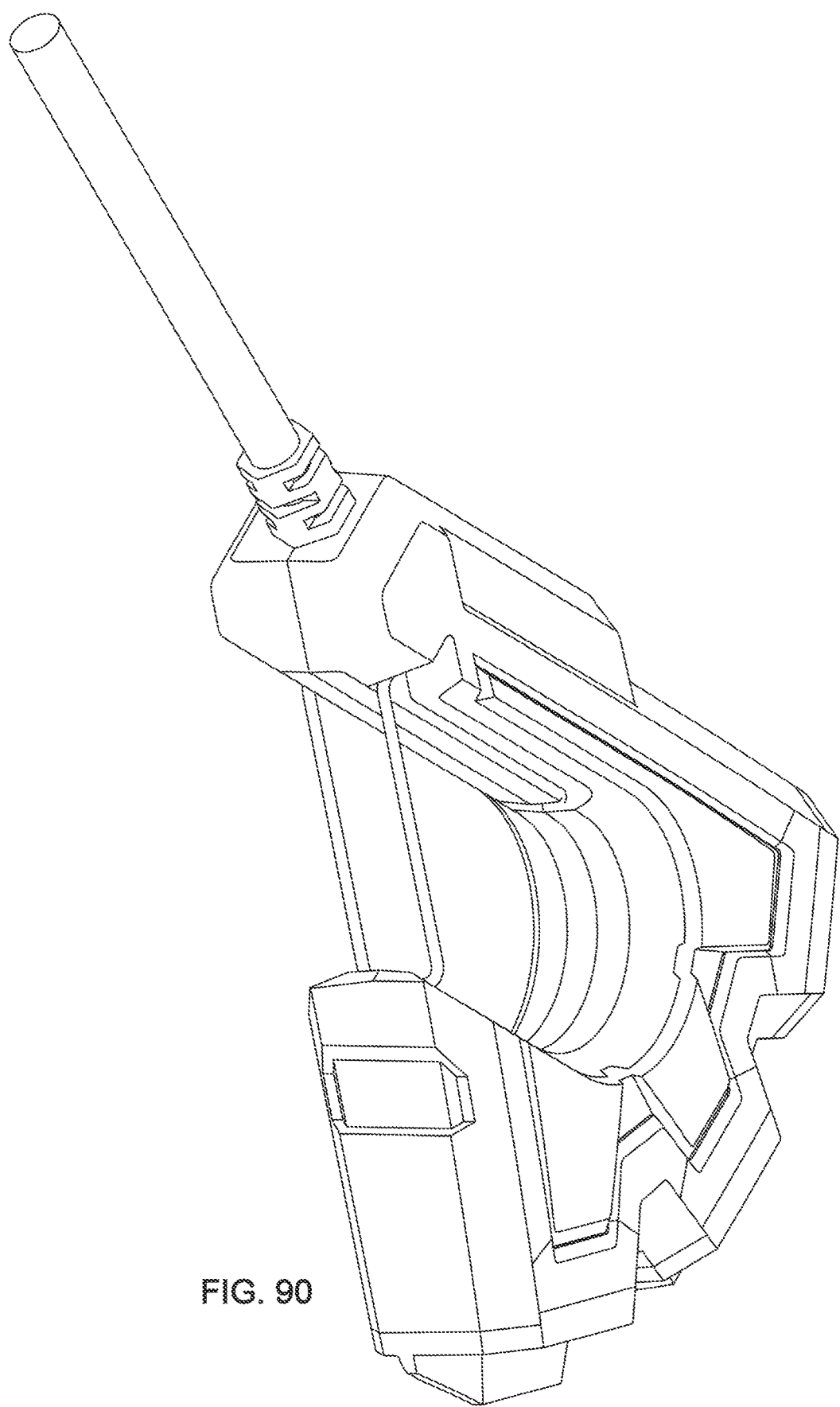
FIG. 90 is a perspective view of a third embodiment depicted with a gate and doors closed.
Figure 91:
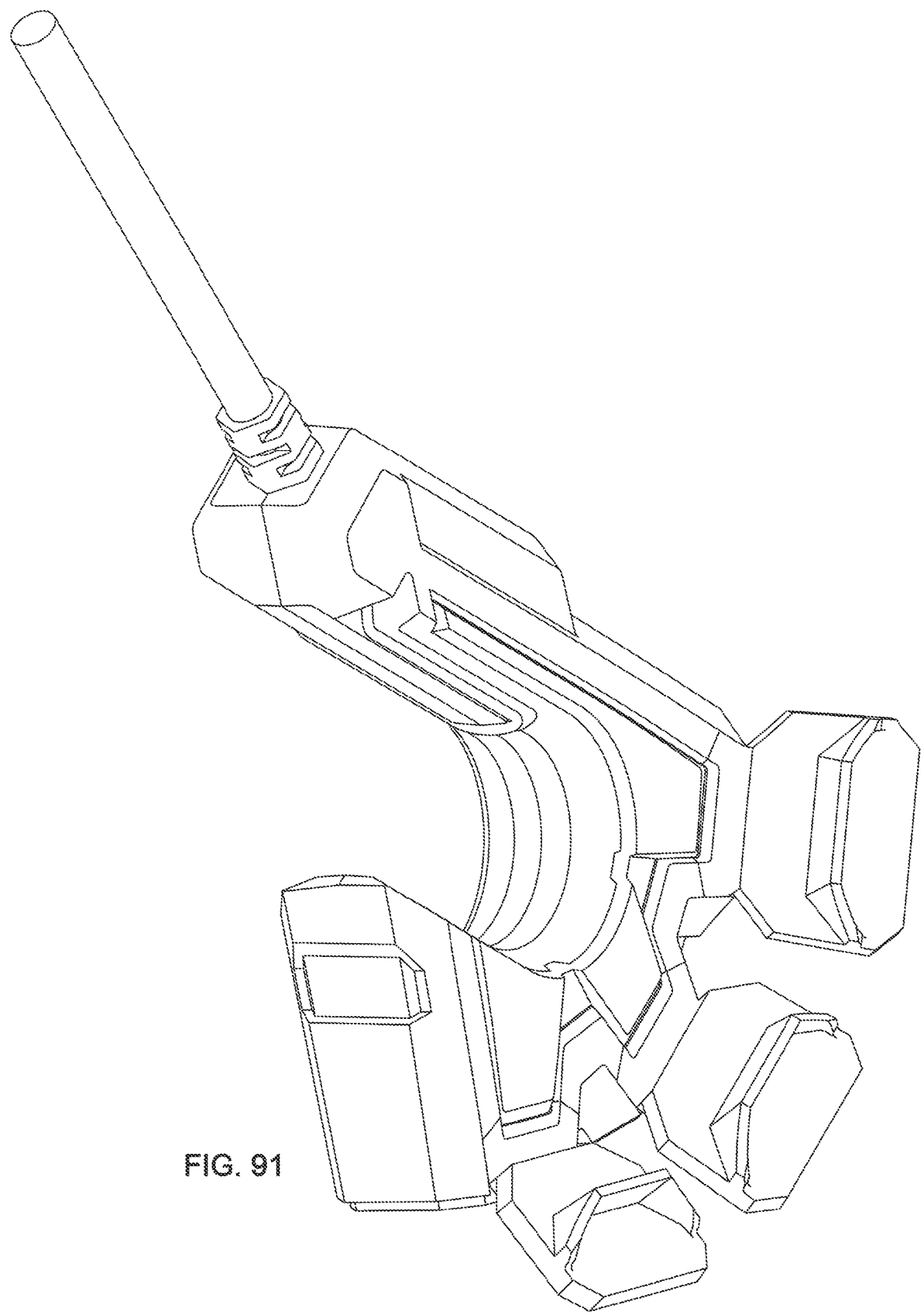
FIG. 91 is a perspective view of a third embodiment depicted with a gate and doors open.
Figure 92:
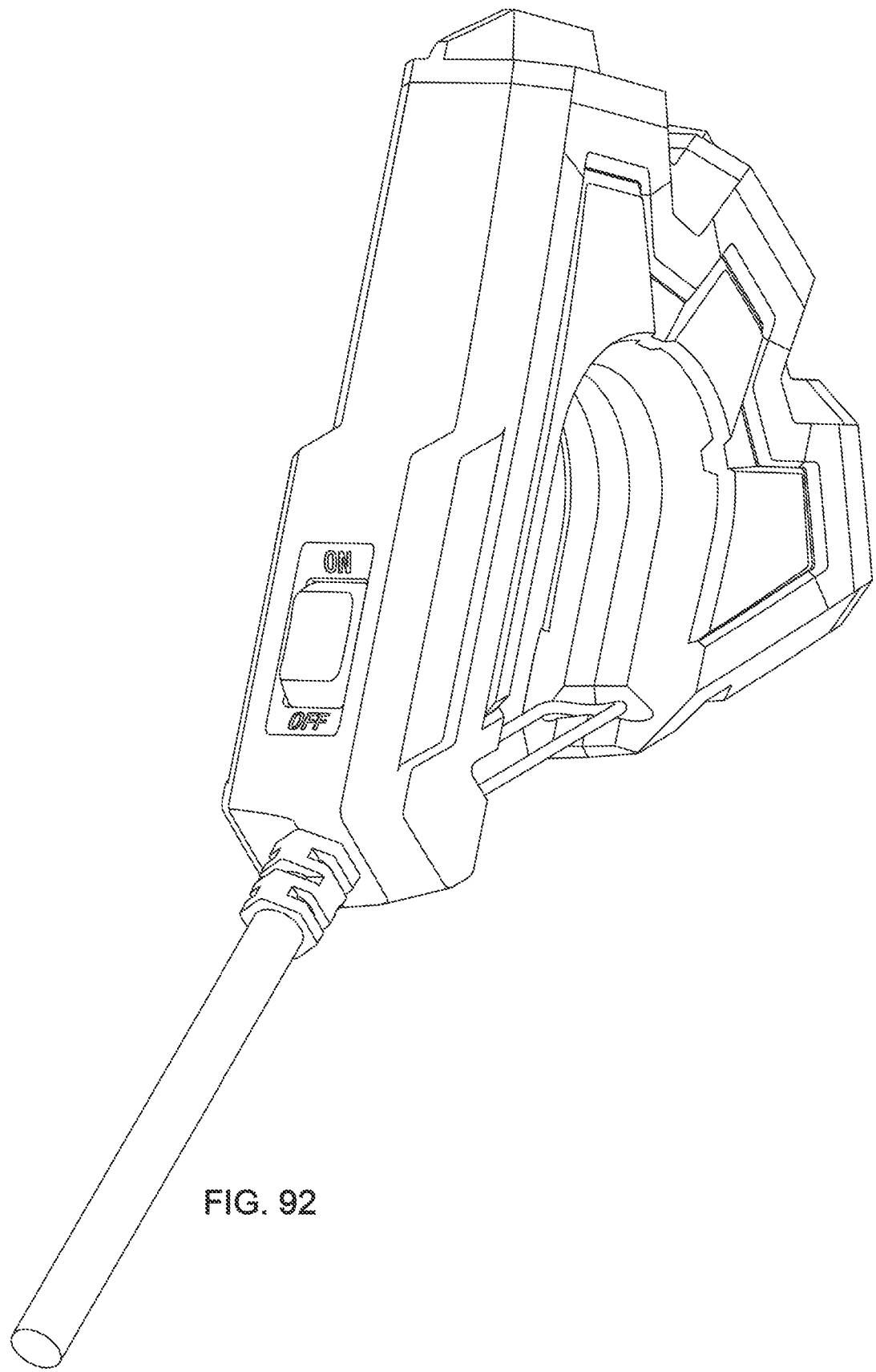
FIG. 92 is a perspective view of a third embodiment depicted with a gate and doors closed.
Figure 93:
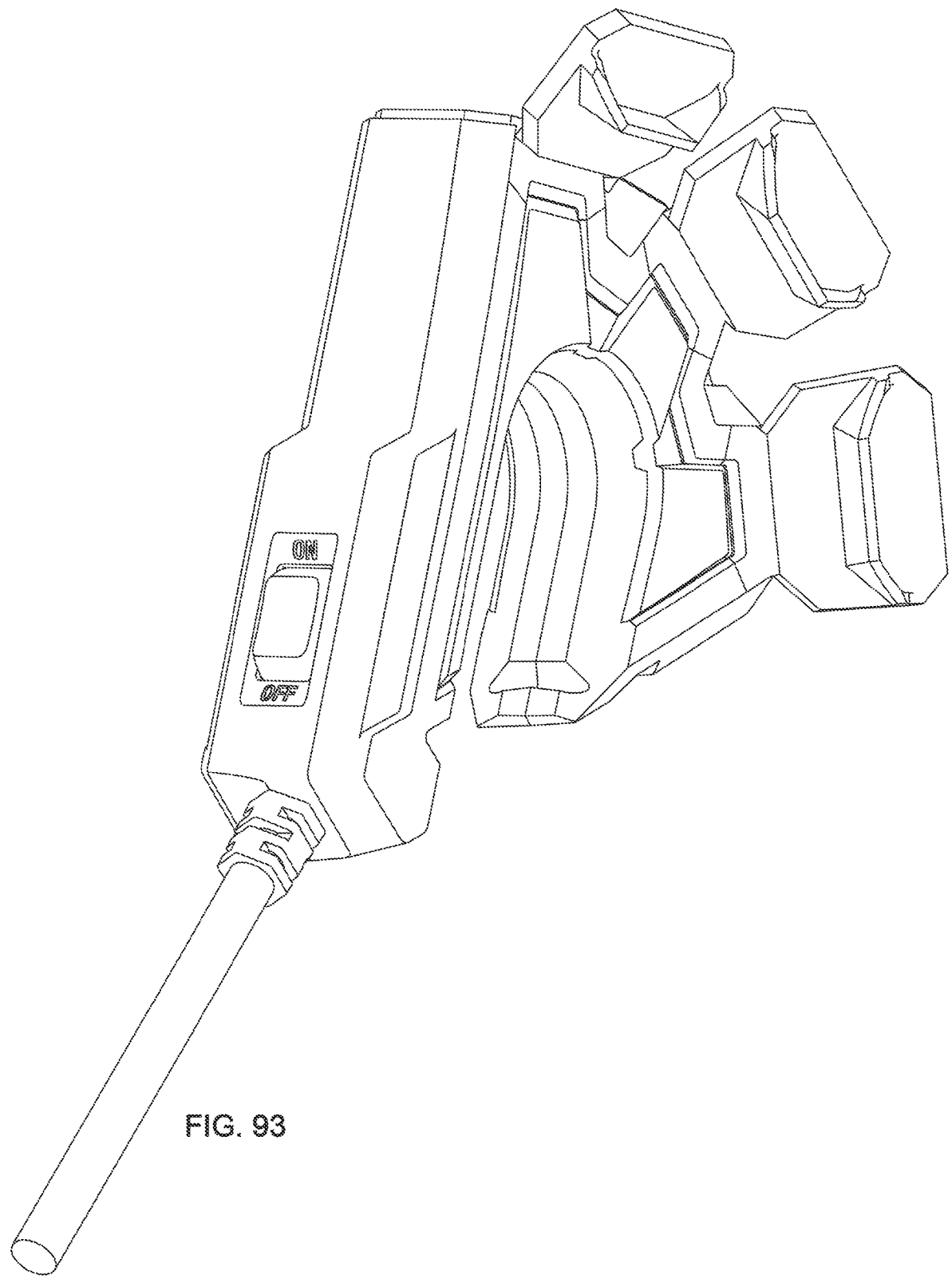
FIG. 93 is a perspective view of a third embodiment depicted with a gate and doors open.
Figure 94:
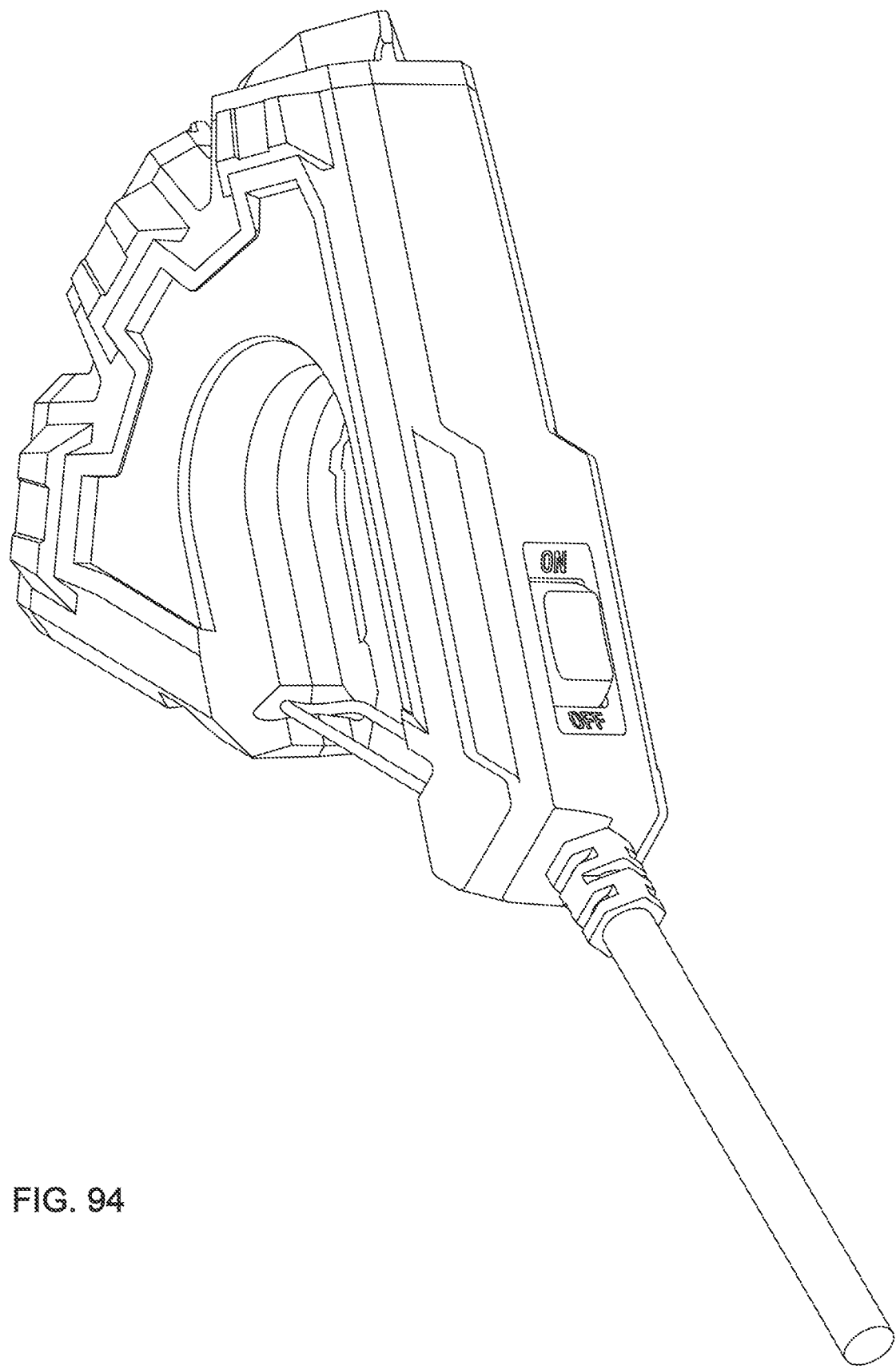
FIG. 94 is a perspective view of a third embodiment depicted with a gate and doors closed.
Figure 95:
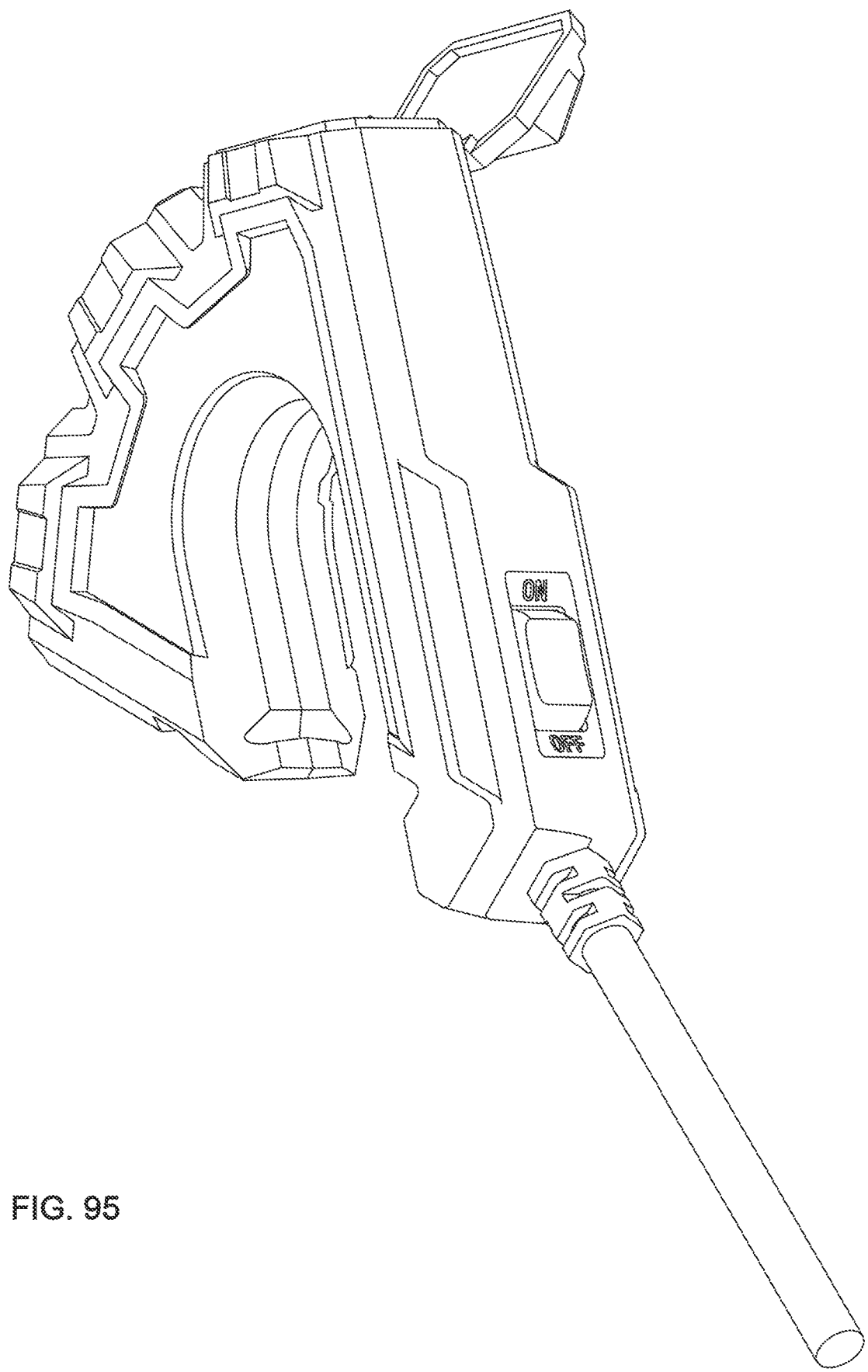
FIG. 95 is a perspective view of a third embodiment depicted with a gate and doors open.
Figure 96:
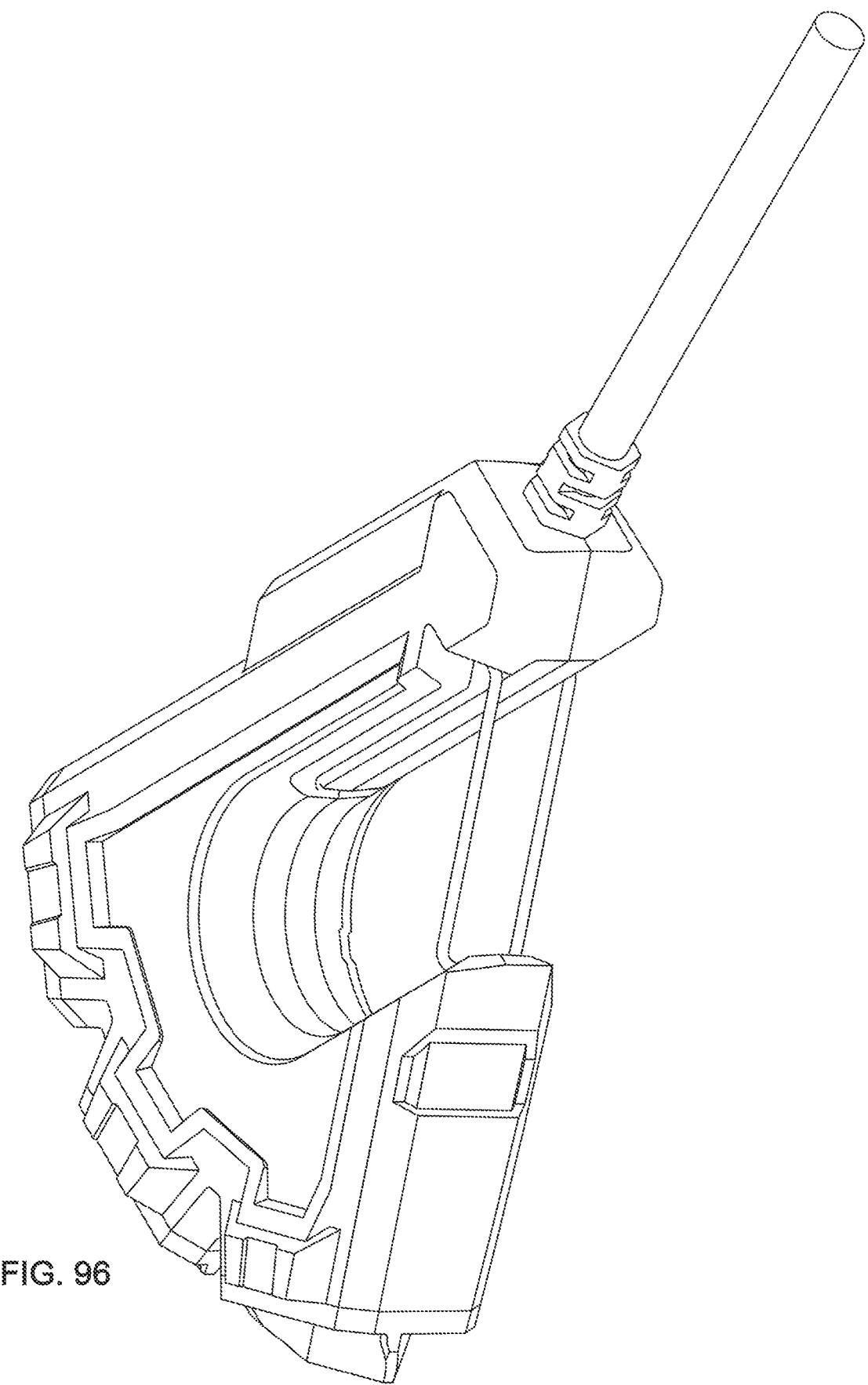
FIG. 96 is a perspective view of a third embodiment depicted with a gate and doors closed.
Figure 97:
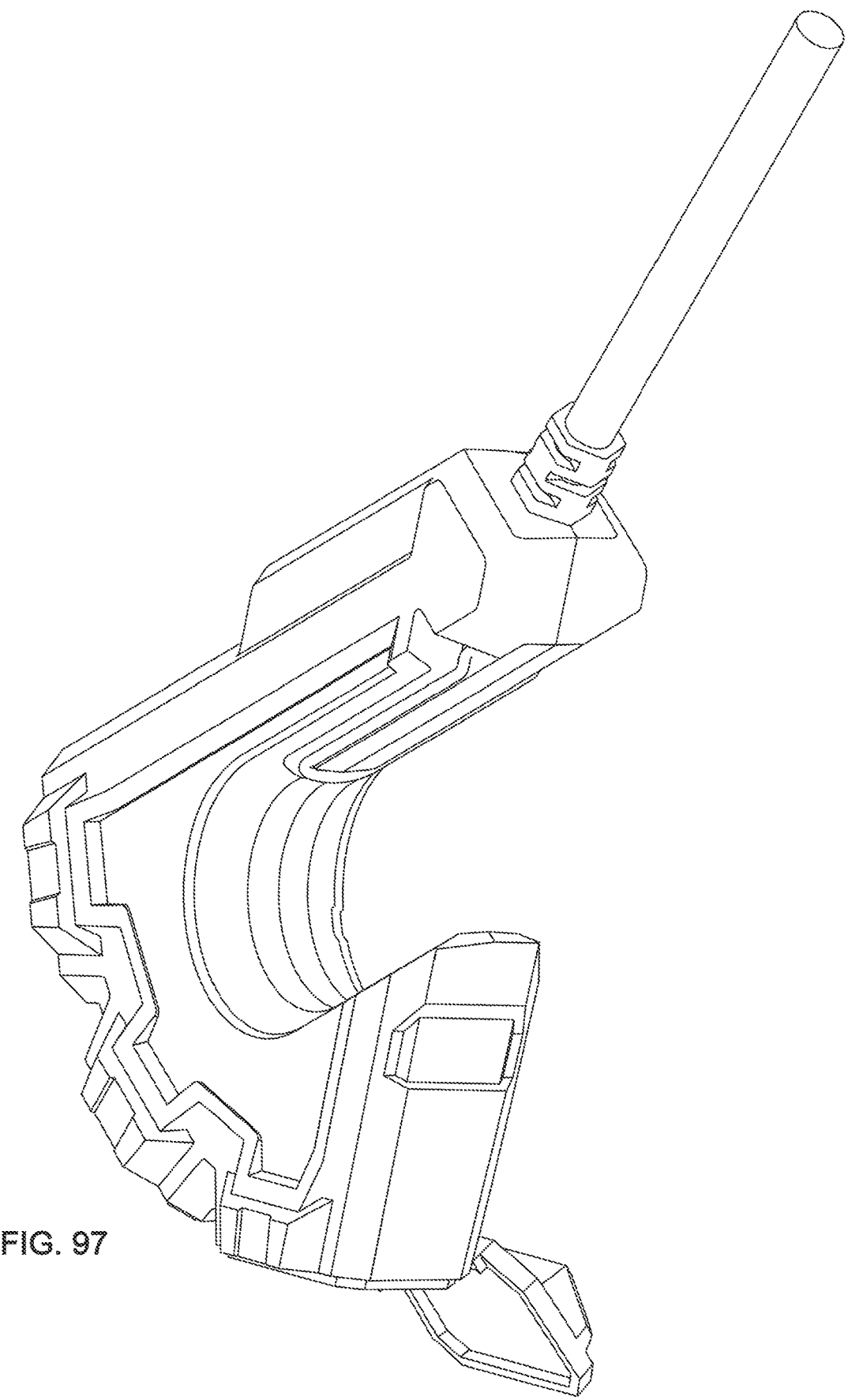
FIG. 97 is a perspective view of a third embodiment depicted with a gate and doors open.
Figure 98:
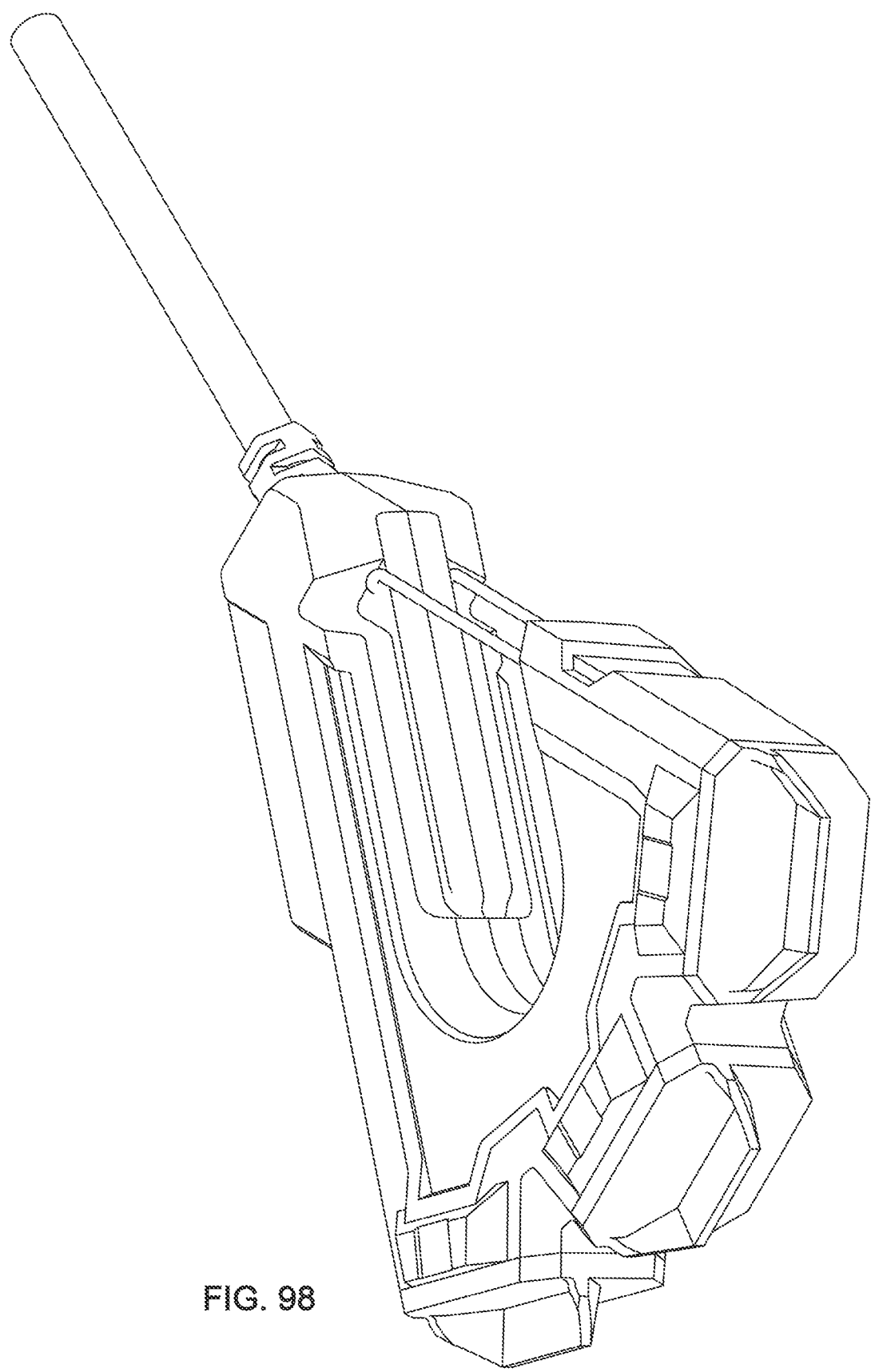
FIG. 98 is a perspective view of a third embodiment depicted with a gate and doors closed.
Figure 99:
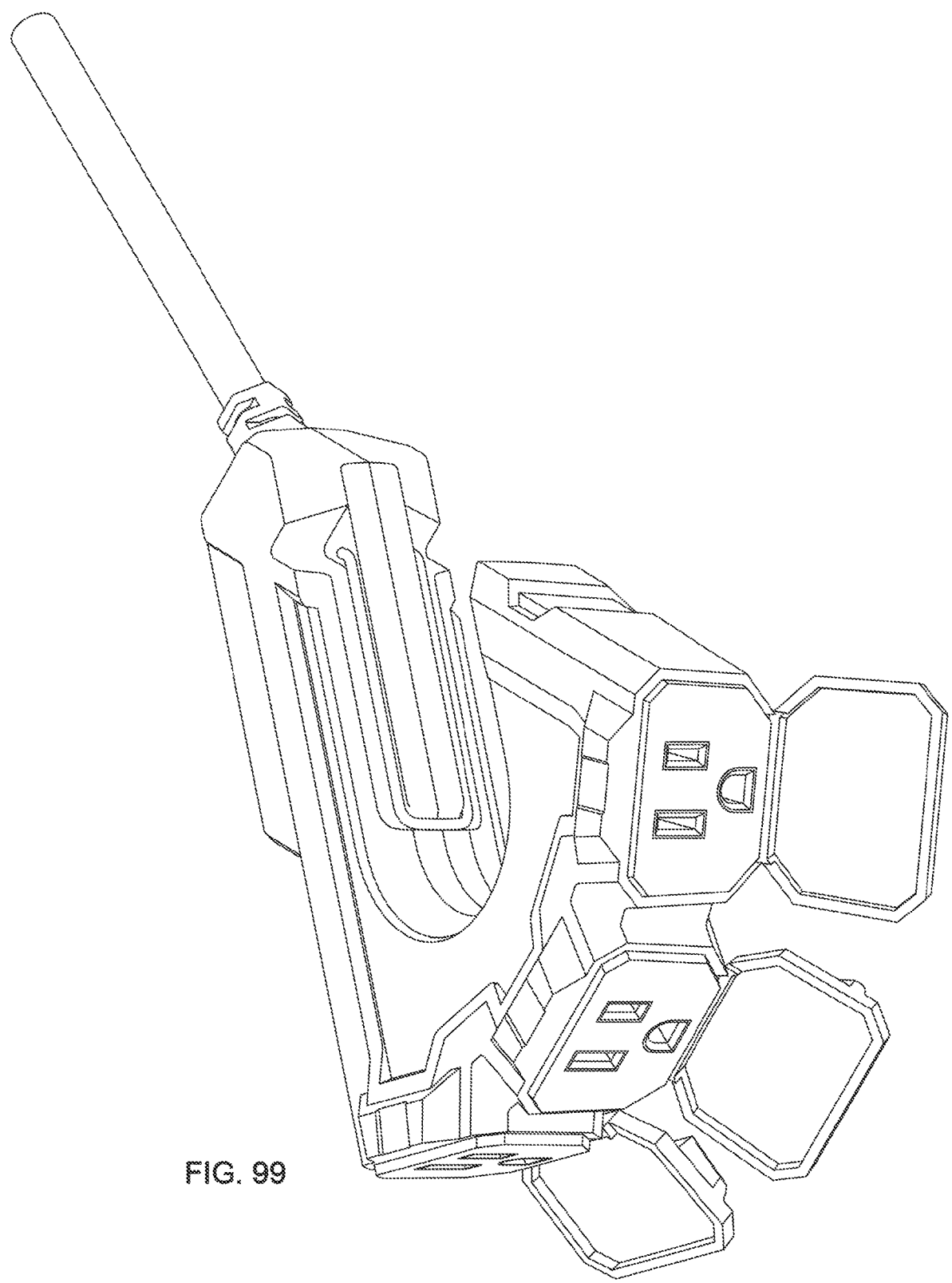
FIG. 99 is a perspective view of a third embodiment depicted with a gate and doors open.
Figure 100:
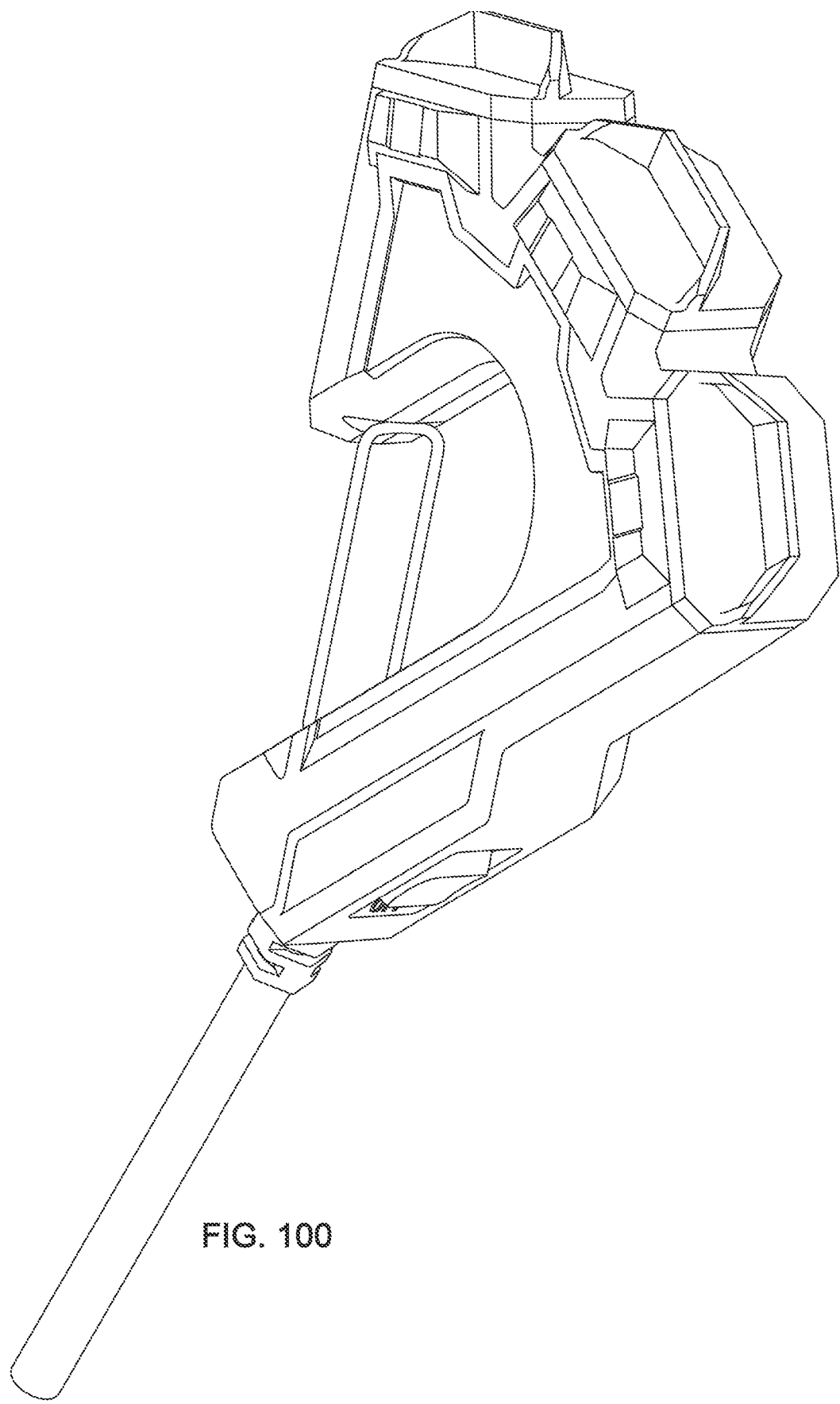
FIG. 100 is a perspective view of a third embodiment depicted with a gate and doors closed.
Figure 101:
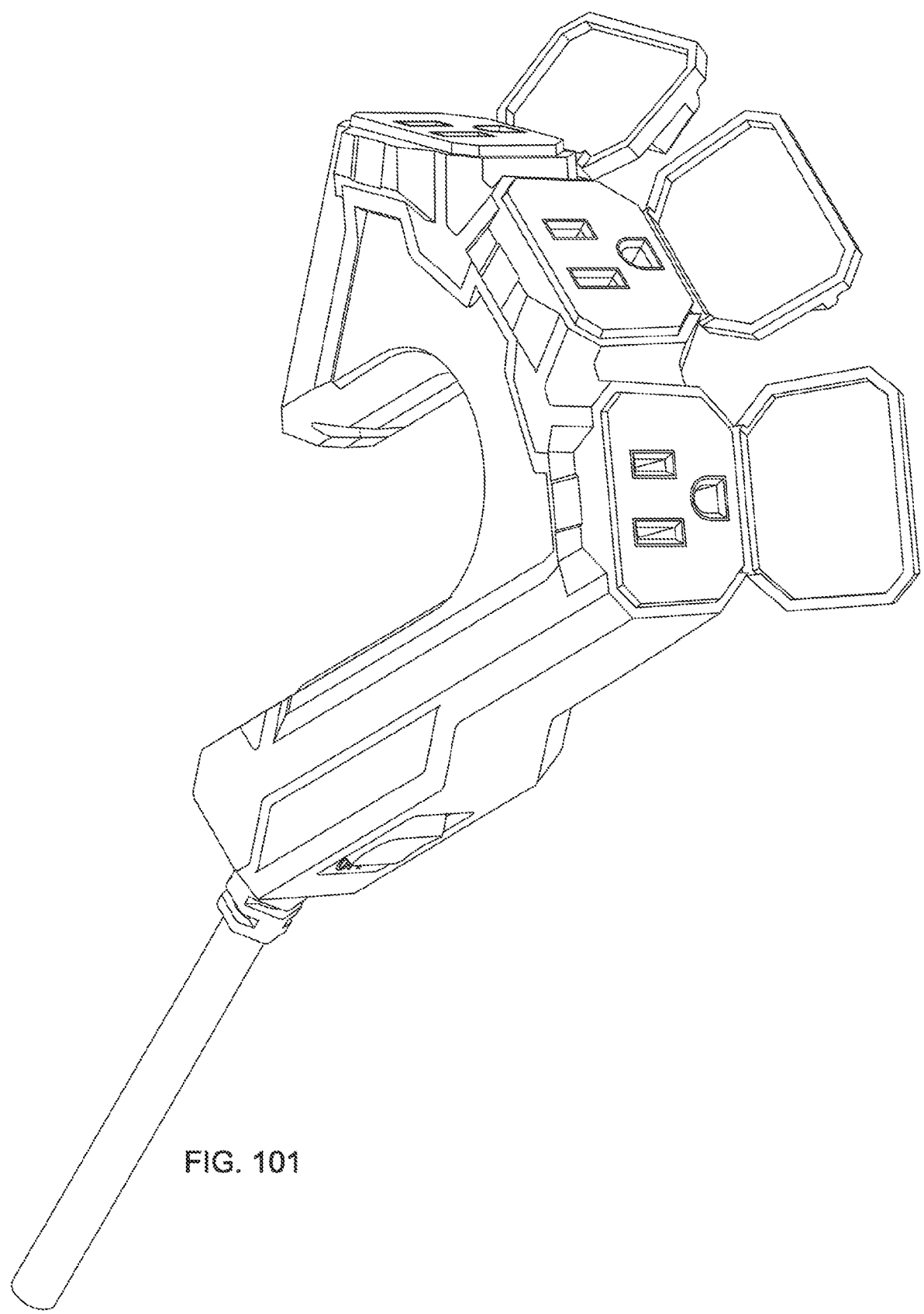
FIG. 101 is a perspective view of a third embodiment depicted with a gate and doors open.
Figure 102:
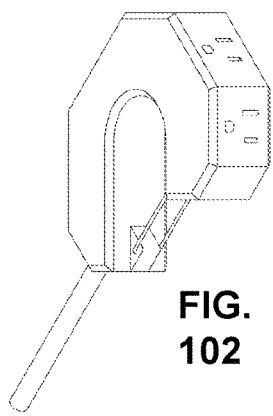
FIG. 102 is a perspective view of a forth embodiment.
Figure 103:
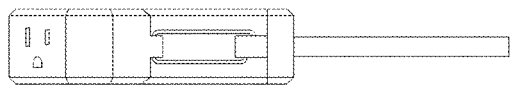
FIG. 103 is a side view of a forth embodiment.
Figure 104:
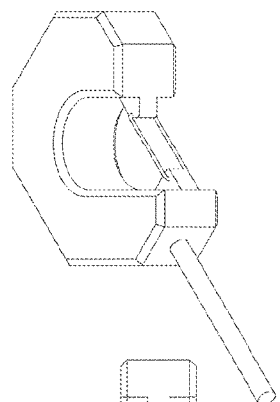
FIG. 104 is a perspective view of a forth embodiment.
Figure 105:
FIG. 105 is a front view of a forth embodiment.
Figure 106:
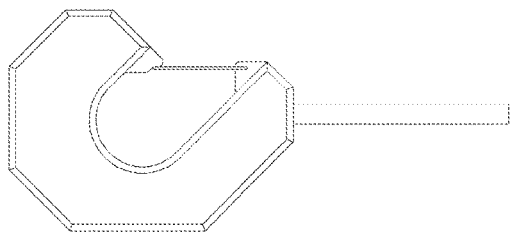
FIG. 106 is a top view of a forth embodiment.
Figure 107:
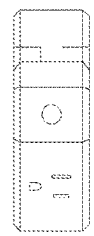
FIG. 107 is a back view of a forth embodiment.
Figure 108:
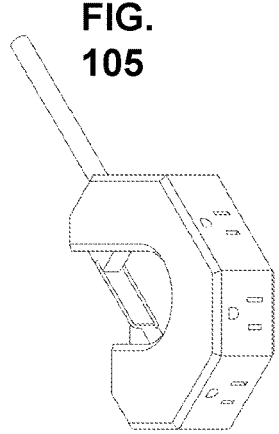
FIG. 108 is a perspective view of a forth embodiment.
Figure 109:
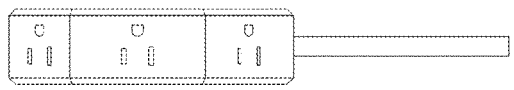
FIG. 109 is a side view of a forth embodiment.
Figure 110:
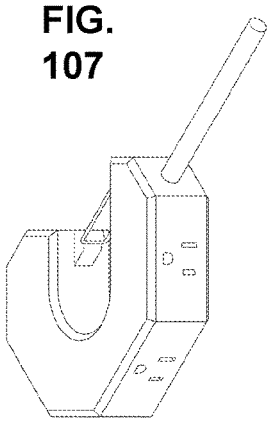
FIG. 110 is a perspective view of a forth embodiment.

As shown in FIGS. 1-5 and 8-11, this embodiment comprises gate 130. As shown in FIGS. 3, 10, 11, and others, gate 130 is configured to have an open position in which access to cavity 115 is available through an unobstructed gap 114. As shown in FIGS. 4, 8, 9, and others, gate 130 is further configured to have a closed position in which access to cavity 115 through gap 114 is obstructed by gate 130. In this embodiment, gate 130 is configured as a skeletonized tongue formed with small round bar stock or large gauge wire, and comprises upper arm 131 and lower arm 132, which are connected by catch 133 extending between upper arm 131 and lower arm 132. In other embodiments, however, other gate configurations may be deployed. For example, the embodiment depicted in FIGS. 18-23 deploys a tubular gate 330 articulating about a hinge pin 339 attached to body 310, which further deploys a hook-type striker 317 configured to engage a recessed catch disposed on the opposite end of gate 330 from hinge pin 339. Other embodiments may deploy other configurations of gates, for example, a planar tongue.

Gate 130 in the embodiment shown in FIGS. 1-5 and 8-11 attaches to body 110 via upper hinge 136 and lower hinge 138. In the closed position, gate 130 extends completely across gap 114 from the attachment of one end of gate 130 to body 110 at upper hinge 136 and lower hinge 136, to the engagement at the other end of gate 130 of catch 133 with striker 117. In the depicted embodiment, the lip of striker 117 is sufficiently elastic to compress for passage of catch 133 and resile when gate 130 is fully closed to provide a restraining force against catch 133 biasing gate 130 in the closed position. In the fully open position, gate 130 clears gap 114 and is substantially disposed in the recess 118 formed in an interior wall of cavity 115. In some embodiments, recess 118 may be formed with a lip sufficiently elastic to compress for passage of catch 133 and resile when gate 130 is fully open to provide a restraining force against catch 133 biasing gate 130 in the open position. Although configuring a receptacle head with a gate is preferred to enhance retention of the receptacle head to a supporting structure disposed in the cavity, other embodiments may be deployed omitting a gate. In embodiments which deploy a gate, configuration of the receptacle head with a gate recess and a gate striker are preferred to enhance retention of the gate in the open and closed positions, but are optional, and may be omitted, individually or in combination, in other embodiments.

In the embodiment depicted in FIGS. 1-5 and 8-11, upper hinge 136 extends angularly from upper arm 131 a first length before turning downward and entering a recess in the upper surface of body 110. Lower hinge 138 extends angularly from lower arm 132 a second distance before turning upward and entering a recess in the lower surface of body 110. In this embodiment, the first length of upper hinge 136 is greater than the second length of lower hinge 138, but other embodiments may reverse this configuration or configure the hinges with equal length. By configuring the hinges with unequal lengths for example as shown in FIGS. 1-5 and 8-11, however, gate 130 may be provided with a first force tending to bias gate 130 in the closed position when catch 133 is proximal to gate striker 117 and a second force tending to bias gate 130 in the open position when catch 133 is proximal to the recess 118. Other means of biasing gate 130 may be used, for example a coil, leaf, or other discrete type of spring, or the use of elastomeric material, for example by deployment of an elastomeric gate fixedly attached to the body. Although upper hinge 136 extends angularly from upper arm 131 and lower hinge 138 extends angularly from lower arm 132 in the preferred embodiment, angular extension is optional and may be admitted, for example in the embodiments depicted in FIGS. 12-17 and FIGS. 24-29, in which biasing forces are provided by the unequal lengths of upper arm 231 with respect to lower arm 232, and upper arm 431 with respect to lower arm 432, respectively.

The embodiment of FIGS. 1-5 and 8-11 deploys a USB receptacle array 150 along the outside perimeter of a second side 112 of generally triangularly shaped body 110. USB receptacle array 150 in this embodiment comprises three USB type A receptacles, but other embodiments may deploy only one, only two, or more than three receptacles. In yet other embodiments, other types of USB receptacles may be deployed, or multiple types of USB receptacles may be deployed, for example an array comprising a USB type A receptacle, a USB mini type A receptacle, and a USB micro type AB receptacle. Other embodiments may deploy one or more other non-NEMA types of receptacles, for example cigar lighter receptacles, EIAJ power receptacles, or IEC 60130-10 power receptacle, in any numbers or combinations. Yet other embodiments may combine one or more USB receptacles with one or more non-NEMA receptacles. In the preferred embodiment depicted in FIGS. 1-5 and 8-11, USB receptacle array 150 is deployed along the outside profile of body 110, where the "profile" of body 110 is understood to be the perimeter outline of body 110 when viewing directly through cavity 115, but other embodiments may deploy non-NEMA types of receptacles in other locations on the surface of body 110, for example the upper or lower surface or both.

In the embodiment of FIGS. 1-5 and 8-11, the outside perimeter of a third side 113 of generally triangularly shaped body 110 is trifurcated to deploy three NEMA 5-15R AC power receptacles 140. Other embodiments may deploy only one, only two, or more than three AC power receptacles. In yet other embodiments, other types of NEMA AC power receptacles may be deployed, for example NEMA 5-20R AC power receptacles, NEMA L5-30R AC power receptacles, or NEMA 6-30R AC power receptacles, in any numbers or combinations. In other embodiments in which the power plug and the power cord are properly configured, the receptacle head may be configured to comprise one or more 120 volt AC receptacles in combination with one or more 240 volt AC receptacles. In the embodiment of FIGS. 1-5 and 8-11, the furcations of the third side 113 are arranged arcuately, so that the faces of receptacles 140 are not coplanar, but other embodiments may range one or more AC receptacles along a strait side with or without furcations, and with or without the faces of receptacles 140 being coplanar. In the preferred embodiment depicted in FIGS. 1-5 and 8-11, AC receptacles 140 are deployed along the outside profile of body 110 (i.e., along the outside of side 113), but other embodiments may deploy AC receptacles in other locations, for example along a surface that is not along a profile perimeter of the body, for example as depicted in FIGS. 24-29.

Various embodiments such as that depicted in FIGS. 1-5 and 8-11 may comprise a master switch, such as switch 160, to activate one or more receptacles. In the embodiment depicted in FIGS. 1-5 and 8-11, in an off position switch 160 deactivates all AC receptacles 140 and all USB receptacles in USB receptacle array 150, and when switch 160 is in the on position all receptacles are live. In other embodiments, a switch may be configured to activate and deactivate only selected receptacles. In yet other embodiments, multiple switches may be deployed and configured to activate and deactivate various combinations of receptacles. Other embodiments may also deploy one or more switches comprising integral breaker elements to deactivate all or selected receptacles upon a power surge occurrence or voltage spike, or alternatively deploy one or more individual breaker elements.

The embodiment depicted in FIGS. 1-5 and 8-11 further comprises receptacle covers. As shown, AC receptacle doors 145 are hinged adjacent to respective AC receptacles 140, and maybe articulated upward for access to the receptacles or downward to cover the receptacles. Similarly, USB receptacle door 155 is hinged adjacent to USB receptacle array 150, and maybe articulated upward for access to the receptacles or downward to cover the receptacles. In the preferred embodiment, when closed doors 145 and door 155 seal tightly with body 110, preferably rendering receptacle head 100 weatherproof, but at least weather resistant. To enhance weatherproofing or weather resistance, switch 160 may be configured or augmented with a membrane cover rendering switch 160 weatherproof or at least weather resistant.

Various embodiments may be configured with different auxiliary features, i.e., structures other than a power cord, a strain relief, a gate, or receptacles. For example, FIG. 6 depicts an embodiment similar to that of FIGS. 1-5 and 8-11 but without a power switch. For further example, FIG. 7 depict an embodiment similar to that of FIGS. 1-5 and 8-11 but without USB receptacles. Yet other embodiments may comprise additional or different auxiliary features, for example a work light, a clock, an LP detector, or a small media player, or any combination thereof. Unless constrained by the position of other features, any auxiliary feature may be disposed anywhere on the body.

Although body 110 comprises a generally triangular shape, other embodiments may be deployed with bodies having yet other shapes, provided that the shape allows configuration of the body with a cavity (such as cavity 115) extending completely through the body and a gap (such as gap 114) disposed along a perimeter of the body that extends through to the cavity, with the cavity being accessible from the exterior of the receptacle head through the gap. For example the receptacle head 200 depicted in FIGS. 12-17 comprises body 210 having a "question mark" shaped profile. Body 210 comprises cavity 215 extending completely through body 210 and gap 214 disposed along the "question mark" shaped perimeter of body 210 that extends through to cavity 215. This embodiment further comprises gate 230 comprising upper arm 231, lower arm 232, catch 233, upper hinge 236, and lower hinge 238. In this embodiment, the length of upper arm 231 from hinge 236 to catch 233 is less than the length of lower arm 232 from hinge 238 to catch 233, with this configuration tending to exert a force biasing gate 233 in the closed position, with catch 233 engaged with striker 217. Similarly to striker 117 described above, striker 217 may be resilient and operate as a restraint holding gate 230 in the closed position. This embodiment comprises AC receptacles 240 disposed around the perimeter of the "question mark" shaped profile of body 210, but in other embodiments one or more AC receptacles may be deployed along upper surface 211 of body 210 or lower surface 212 of body 210, or both.

FIGS. 18-23 depict another embodiment not having a body with a generally triangular shape. As shown, receptacle head 300 comprises body 310 having a "C" or "U" shaped profile. Body 310 comprises cavity 315 extending completely through body 310 and gap 314 disposed along the "C" or "U" shaped perimeter of body 310 that extends through to cavity 315. This embodiment further comprises gate 330 comprising catch 333 and hinge pin 339. Gate 330 articulates around hinge pin 339 from an open position in which gap 314 is clear that provides access to cavity 315, to a closed position in which gap 314 is blocked by gate 330, with gate catch 333 of gate 330 engaging striker 317 disposed on body 310. In this embodiment, striker 317 comprises a hook shape configured to engage a recessed in catch 333, with the engagement of the hook shape in the recess mitigating any elongation of gap 314 caused by forces exerted along either or both arms of body 310. A coil spring, not depicted, is housed in a cavity of gate 330 and attached to body 310 proximal to hinge pin 339 and to gate 330 proximal to catch 333, with a coil spring exerting a force biasing gate 330 in the closed position. This embodiment comprises AC receptacles 340 disposed around the perimeter of the "C" or "U" shaped profile of body 310, but in other embodiments one or more AC receptacles may be deployed along upper surface 311 of body 310 or lower surface 312 of body 310, or both.

FIGS. 24-29 depict another embodiment not having a body with a generally triangular shape. As shown, receptacle head 400 comprises body 410 having a generally rectangularly shaped profile. Body 410 comprises cavity 415 extending completely through body 410 and gap 414 disposed along the generally rectangularly shaped perimeter of body 410 that extends through to cavity 415. This embodiment further comprises gate 430 comprising upper arm 431, lower arm 432, catch 433, upper hinge 436, and lower hinge 438. In this embodiment, the length of upper arm 431 from hinge 436 to catch 433 is less than the length of lower arm 432 from hinge 438 catch 433, with this configuration tending to exert a force biasing gate 433 in the closed position, with catch 433 engaged with striker 417. Similarly to striker 117 described above, striker 417 may be resilient and operate as a restraint holding gate 430 in the closed position. This embodiment comprises AC receptacles 440 disposed around the perimeter of the generally rectangularly shaped profile of body 410, but in other embodiments one or more AC receptacles may be deployed along upper surface 411 of body 410 or lower surface 412 of body 410, or both.

In the preferred embodiment, body 110 is formed by injection molding thermoplastic elastomers, thermoplastic rubbers, or liquid silicone rubber around the electrical components of the receptacles, the auxiliary features, and the interconnecting wiring. Other embodiments of the body also may be injection molded with those or similar compounds. Alternatively, yet other embodiments may have the body formed as a rigid or elastic shell housing, for example an upper shell housing and a lower shell housing, with the body assembled by placing the shell components around the electrical components of the receptacles, the auxiliary features, and the interconnecting wiring and securing the shell components in place to form a unitary housing, for example with fasteners, adhesives, or ultrasonic or thermal welding. Shells and shell components may be formed of many types of rigid or elastic materials, for example metals, plastic polymers, or other materials, provided the materials are suitable for forming a unitary body configured to house the electrical components of the receptacles, the auxiliary features, and the interconnecting wiring and provide access to the device connection structures of the receptacles and the operating controls of the auxiliary features.

The described embodiments are illustrative only and are not restrictive, and the scope of the invention is defined solely by the following claims.

The invention claimed is:

1. A receptacle head for a power extension cord comprising:
   a body, the body having a generally fixed arcuate shape and comprising
      a top,
      a bottom,
      a first end,
      a second end,
      a side extending along the perimeter edge of the body between the top and the bottom,
      a cavity extending through the body from the top to the bottom,
      a cord attachment point disposed at the first end, and
      a gap disposed along the side and extending from the first end to the second end, the gap extending through to the cavity such that the cavity is accessible from the exterior of the receptacle head through the gap; and
   a plurality of power receptacles disposed in the body and opening along the side.

2. The receptacle head of claim 1 in which the side comprises plural segments each containing at least one of the power receptacles.

3. The receptacle head of claim 1 in which the generally arcuate shape of the body has the general form of a question mark.

4. The receptacle head of claim 1 in which the generally arcuate shape of the body has the general form of the letter "C".

5. A receptacle head for a power extension cord comprising:
   a body having a generally fixed arcuate shape and comprising a first end and a second end and an outer edge face comprising plural planar segments;
   a cord attachment point disposed along the first end;
   a gap between the first end and the second end forming a cavity in the body, the cavity having a center; and
   plural power receptacles each having a plug-receiving opening array facing radially outward from the center, with at least two of the planar segments each comprising an opening array of at least one of the power receptacles.

6. A receptacle head for a power extension cord comprising:
   a body, the body having a generally triangular shape and comprising a top,
a bottom,
a first side, a second side, and a third side each extending along the perimeter edge of the body between the top and the bottom,
a cord attachment point disposed at a vertex formed by two of the first side, the second side, and the third side,
a cavity extending through the body from the top to the bottom, and
a gap disposed along the first side that extends through to the cavity such that the cavity is accessible from the exterior of the receptacle head through the gap;
a plurality of power receptacles each disposed in the body and opening along the second side; and
a gate attached to the body along the first side, the gate being configured as a skeletonized tongue formed with small round bar stock or large gauge wire, the gate comprising an upper arm and a lower arm connected by a catch extending between the upper arm and the lower arm, with the gate having an open position in which the cavity is accessible from the exterior of the receptacle head through the gap, and a closed position in which the gate blocks the gap and restricts access to cavity; with
the body comprising a recess having an elastic lip configured to compress for passage of the catch when the gate is moved from the closed position to the fully open position, and to resile for capture of the catch when the gate is in the fully open position, with the lip providing a restraining force against the catch to bias the gate in the open position.

7. The receptacle head of claim 6 in which the second side is straight.

8. The receptacle head of claim 6 in which the second side is arcuate.

9. The receptacle head of claim 8 in which the second side is furcated into segments.

10. The receptacle head of claim 9 in which each segment contains a power receptacle.

11. The receptacle head of claim 7 in which the third side comprises at least one auxiliary feature.

12. The receptacle head of claim 11 wherein an auxiliary feature is a work light, a clock, an LP detector, or a media player.

13. The receptacle head of claim 11 in which a first auxiliary feature is a USB receptacle array.

14. The receptacle head of claim 13 in which a second auxiliary feature is a power control switch.

15. A receptacle head for a power extension cord comprising:
a body, the body having a generally triangular shape and comprising
a top,
a bottom,
a first side, a second side, and a third side each extending along the perimeter edge of the body between the top and the bottom,
a cord attachment point disposed at a vertex formed by two of the first side, the second side, and the third side,
a cavity extending through the body from the top to the bottom, and
a gap disposed along the first side that extends through to the cavity such that the cavity is accessible from the exterior of the receptacle head through the gap;
a plurality of power receptacles each disposed in the body and opening along the second side; and
a gate attached to the body along the first side, the gate being configured as a skeletonized tongue formed with small round bar stock or large gauge wire, the gate comprising
an upper arm and a lower arm connected by a catch extending between the upper arm and the lower arm,
an upper hinge turning downward and entering an upper recess in the top of the body, the upper hinge extending angularly from the upper arm a first length, and
a lower hinge turning upward and entering a lower recess in the bottom of the body, the lower hinge extending angularly from the lower arm a second length, with
the first length and the second length being unequal and configured for the upper hinge and the lower hinge to exert
a first force tending to bias the gate in the closed position when the catch is proximal to the striker and
a second force tending to bias the gate in the open position when the catch is proximal to the recess, and with
the gate having
an open position in which the cavity is accessible from the exterior of the receptacle head through the gap, and
a closed position in which the gate blocks the gap and restricts access to cavity.

16. The receptacle head of claim 15 in which the second side is straight.

17. The receptacle head of claim 15 in which the second side is arcuate.

18. The receptacle head of claim 17 in which the second side is furcated into segments.

19. The receptacle head of claim 18 in which each segment contains a power receptacle.

20. The receptacle head of claim 19 in which the third side comprises at least one auxiliary feature.

21. The receptacle head of claim 20 wherein an auxiliary feature is a work light, a clock, an LP detector, or a media player.

22. The receptacle head of claim 20 in which a first auxiliary feature is a USB receptacle array.

23. The receptacle head of claim 22 in which a second auxiliary feature is a power control switch.

* * * * *